US009858712B2

(12) United States Patent
Stathis

(10) Patent No.: US 9,858,712 B2
(45) Date of Patent: Jan. 2, 2018

(54) SYSTEM AND METHOD CAPABLE OF NAVIGATING AND/OR MAPPING ANY MULTI-DIMENSIONAL SPACE

(76) Inventor: Sam Stathis, New York, NY (US)

( * ) Notice: Subject to any disclaimer, the term of this patent is extended or adjusted under 35 U.S.C. 154(b) by 1044 days.

(21) Appl. No.: 12/098,656

(22) Filed: Apr. 7, 2008

(65) Prior Publication Data

US 2011/0043515 A1 Feb. 24, 2011

Related U.S. Application Data

(60) Provisional application No. 60/910,791, filed on Apr. 9, 2007.

(51) Int. Cl.
| | |
|---|---|
| *G06T 17/00* | (2006.01) |
| *G06T 17/20* | (2006.01) |
| *G05D 1/02* | (2006.01) |
| *G01C 15/00* | (2006.01) |

(52) U.S. Cl.
CPC ............ *G06T 17/00* (2013.01); *G01C 15/002* (2013.01); *G05D 1/024* (2013.01); *G05D 1/027* (2013.01); *G06T 17/20* (2013.01); *G05D 2201/0207* (2013.01)

(58) Field of Classification Search
CPC ......... G06T 17/00; G06T 17/05; G06T 17/20; G05D 1/024; G05D 2201/0207; G01S 17/48; G01C 15/002
USPC .............. 345/418–420, 630–633; 434/72–79
See application file for complete search history.

(56) References Cited

U.S. PATENT DOCUMENTS

| | | | | |
|---|---|---|---|---|
| 5,305,091 A * | 4/1994 | Gelbart et al. ................ 356/620 |
| 5,673,377 A | 9/1997 | Berkaloff ..................... 395/130 |
| 5,966,132 A | 10/1999 | Kakizawa et al. ............ 345/419 |
| 6,651,240 B1 | 11/2003 | Yamamoto et al. .......... 717/108 |
| 7,219,097 B2 * | 5/2007 | Okubo |
| 7,800,758 B1 * | 9/2010 | Bridges et al. ................ 356/482 |
| 2002/0008870 A1 * | 1/2002 | Beliveau et al. ........... 356/152.1 |
| 2002/0023788 A1 * | 2/2002 | Torrie et al. .................. 180/9.26 |
| 2002/0149585 A1 * | 10/2002 | Kacyra et al. ................ 345/428 |
| 2002/0196250 A1 * | 12/2002 | Anderson et al. ............ 345/420 |
| 2003/0202089 A1 * | 10/2003 | Alhadef et al. ................. 348/42 |
| 2004/0233414 A1 * | 11/2004 | Jamieson et al. ............ 356/4.01 |
| 2005/0242332 A1 * | 11/2005 | Ueki et al. .................... 254/277 |
| 2006/0282235 A1 | 12/2006 | Thomas et al. .................... 703/1 |
| 2008/0009970 A1 * | 1/2008 | Bruemmer .................... 700/245 |
| 2008/0109126 A1 * | 5/2008 | Sandin et al. .................. 701/23 |

OTHER PUBLICATIONS

Y Meng, R Lemence, L Simons, E Schneider, "Target Searching using Cooperative Heterogeneous LEGO Robots", 9th International Conference on Engineering Education, Session R3F, San Juan, PR, Jul. 23-28, 2006.*
Dudek et al., "A Taxonomy for Multi-Agent Robotics", Autonomous Robots 3,375-397 (1996), Kluwer Academic Publishers.*
International Search Report based on PCT/US2008/59617 dated Jun. 8, 2009.

* cited by examiner

*Primary Examiner* — Daniel Hajnik

(74) *Attorney, Agent, or Firm* — Stanley H. Kremen

(57) ABSTRACT

A method and system that allows a user to perform automatic study, layout and verification of a multidimensional space in real time where the study can be displayed graphically, in 3-dimensions for example, via a handheld unit allowing the system to guide and/or navigate the user throughout the multidimensional space as the automatic study and/or layout is being performed.

49 Claims, 57 Drawing Sheets

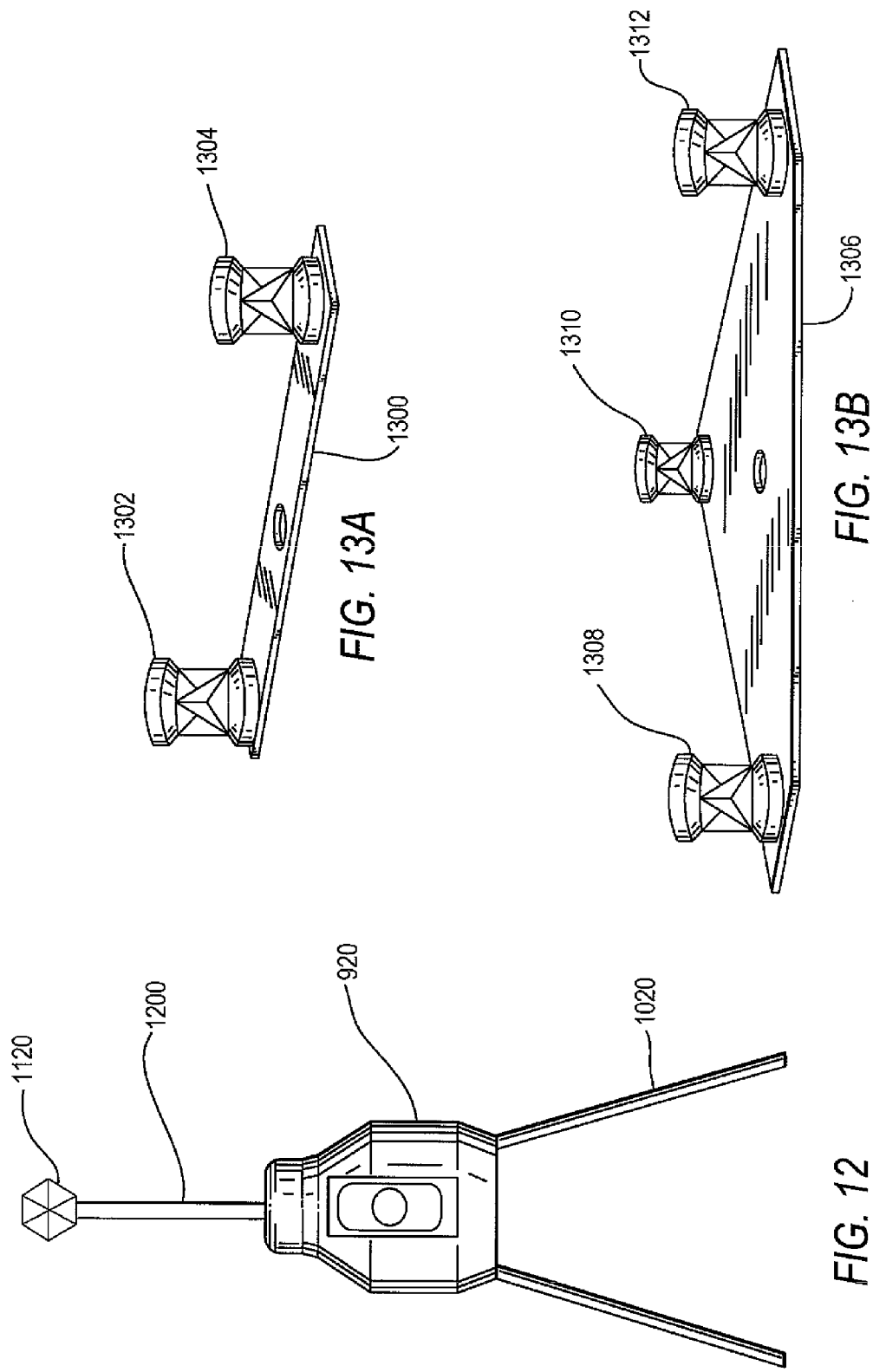

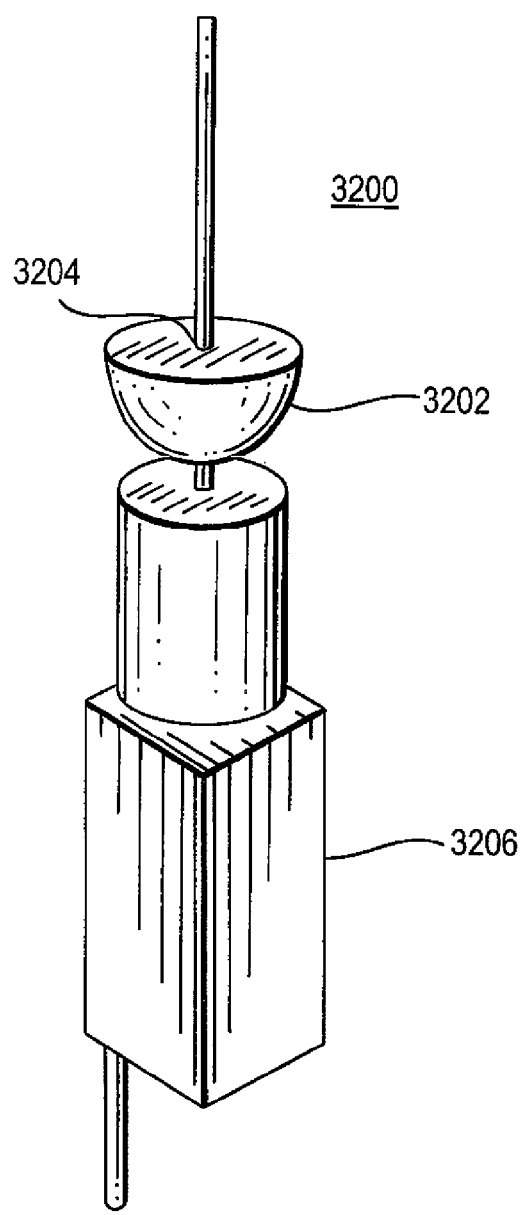
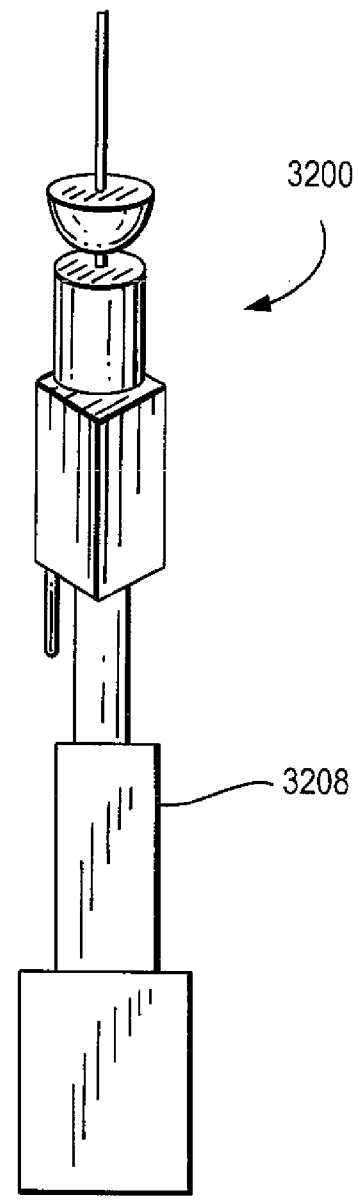
FIG. 32A
FIG. 32B

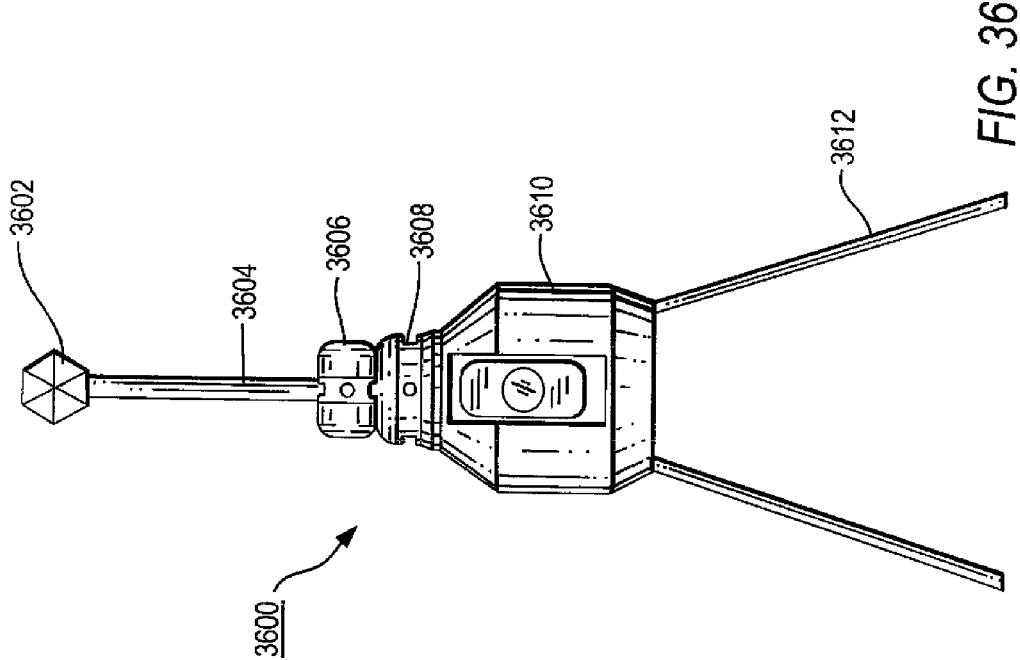
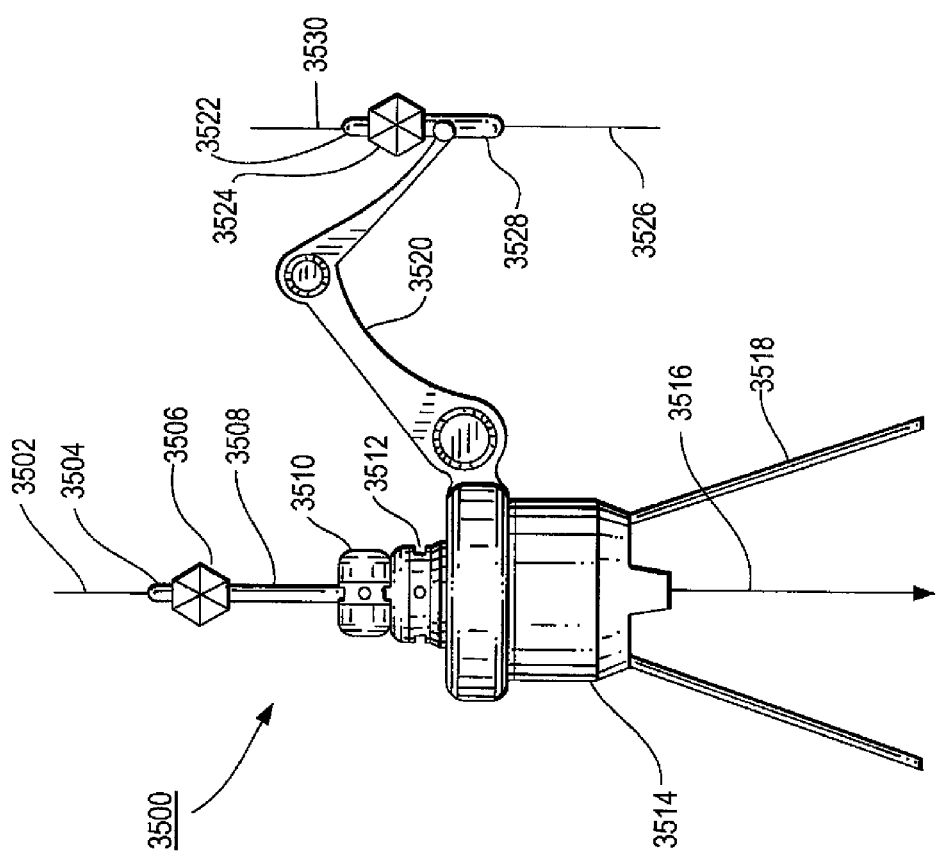
FIG. 36
FIG. 35

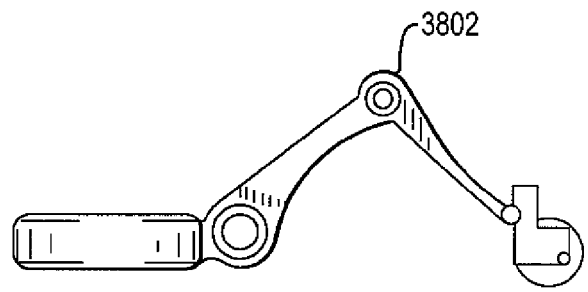
FIG. 38A
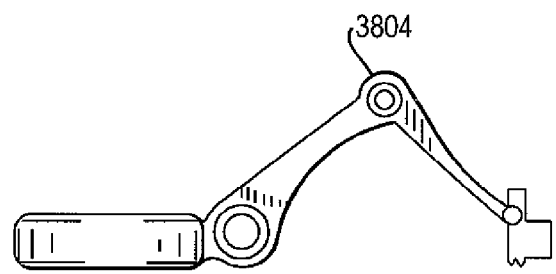
FIG. 38B
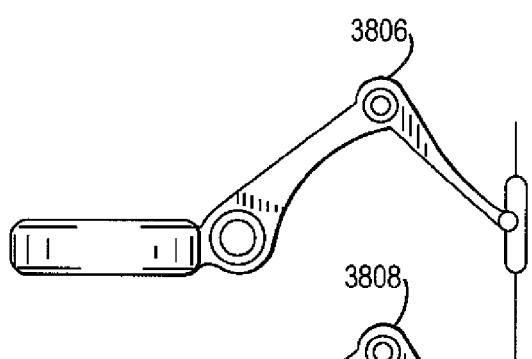
FIG. 38C
FIG. 38D
FIG. 38E
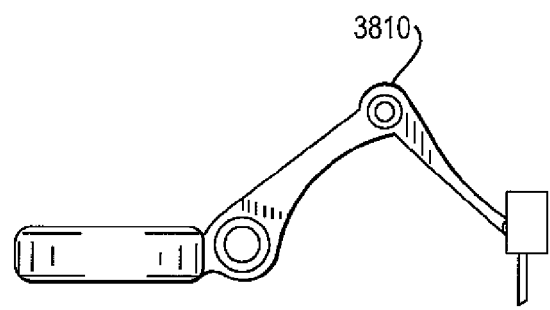

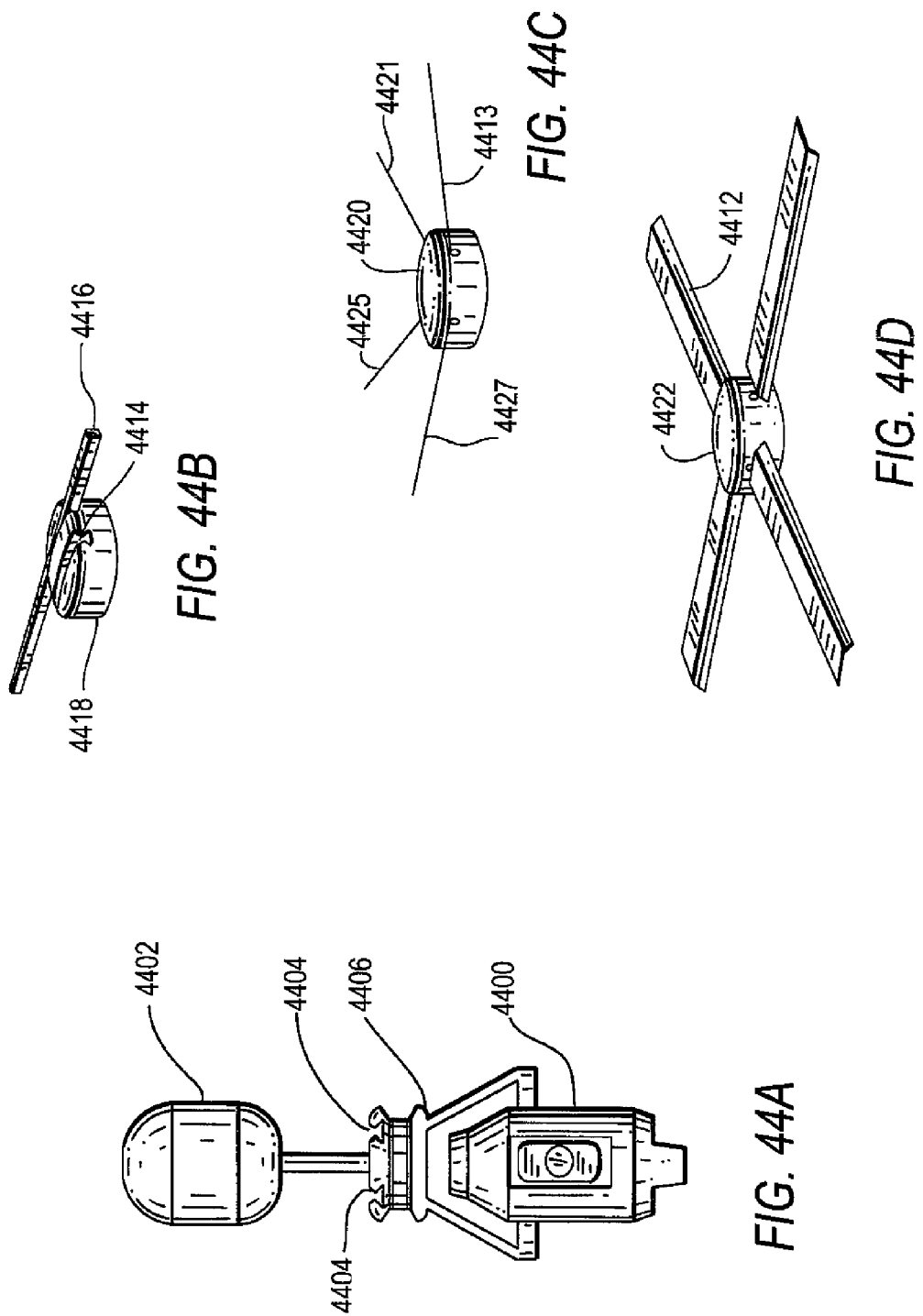

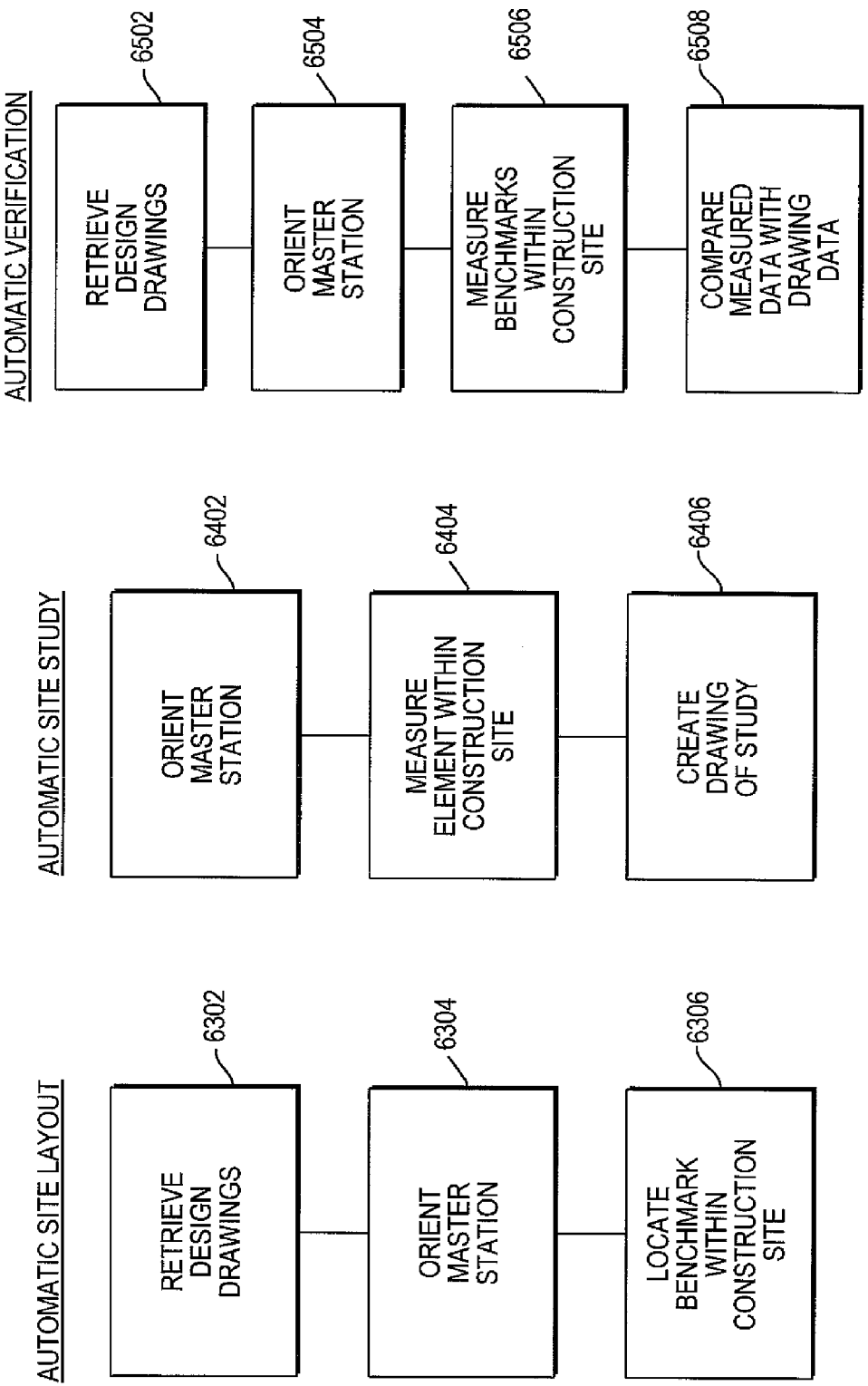

SYSTEM AND METHOD CAPABLE OF NAVIGATING AND/OR MAPPING ANY MULTI-DIMENSIONAL SPACE

This application claims the benefit of the filing date of a provisional having Application No. 60/910,791 titled "A System And Method Capable of Navigating And/Or Mapping Any Multi-Dimensional Space filed on Apr. 9, 2007.

FIELD OF THE INVENTION

The present invention relates to a system and method for the automatic study, layout and verification of a multidimensional space generating new industries of autonomous robotic task execution and architectural navigation.

BACKGROUND OF THE INVENTION

Realization of a design from concept to implementation is a challenge, particularly as it relates to the construction industry. In the construction industry, architects, planners, engineers and the like are charged with the task of conceptualizing ideas and reducing the concepts to tangible form such as design drawings, that can then be implemented by contractors in the field. The implementation or construction process can be an arduous task, the success of which relies heavily on the ability of a contractor to accurately replicate the dimensions and spatial relationships shown in the drawings or design documents pertaining to the particular project at hand. Errors by contractors in replicating what the design documents indicate are a common feature of construction practice and one that oftentimes results in costly corrective action. In some instances, the error is due to the lack of a real appreciation of the characteristics of a site at which construction is to take place. For example, if the design for a space to be renovated calls for a door to be placed in a specific location and that location at the construction site turns out to have a column in the exact location where the door is called for, a costly redesign of the design drawings may become necessary. Another common occurrence that leads to costly remedial measures is where inaccurate layout of a construction site leads to construction of major elements of the design in the wrong place leading to costly retrofitting when the error is ultimately discovered.

Generally, the success of any construction project relies heavily on good dimensional controls that can be relied upon so that the spatial relationships contemplated in a design can be accurately reproduced in the field. Dimensional controls are usually the province of architects, tradesman (e.g., electricians, plumbers, Drywall installers) or surveyors. Typical 'as built studies' or surveying tasks include measuring or surveying a site to determine existing conditions and the layout of benchmarks, reference points and other monuments that can be used to properly orient the contractors as they build out the design. When errors occur in the performance of these tasks, the type of errors described above result. Sometimes errors are not due to inaccurate measurements or 'as built studies', but rather to poor control of monuments such as when a monument or benchmark such as a stake is inadvertently knocked over or a pencil mark is inadvertently smeared in the field by a person or a piece of equipment. It is not entirely uncommon for a workman in a situation such as this to simply replace the pencil mark or stake in a location thought to have been its original location but which, is actually not the original location. When this occurs, any subsequent reference to this benchmark will result in errors resulting from the fact that a dimensional control is now in the wrong place but not known to be in the wrong place. Moreover, errors resulting from the use of the now inaccurate reference point can be further compounded by the fact that the errors may not be discovered for some time.

Errors in measurement or surveying, whether they are related to the study of a site or the layout of a design, can only be avoided by starting with a precise 'as built verification' and vigilant protection of benchmarks and monuments and their frequent re-verification. In practice, this task can be extremely time consuming and labor intensive typically requiring crews of personnel to revisit a site frequently and manually verify existing benchmarks and monuments or as needed, manually establish new benchmarks and monuments. There is a need, therefore, for a way to quickly and accurately measure or survey a construction site to determine its attributes, layout for construction or re-verify dimensional controls such as benchmarks and monuments.

SUMMARY OF THE INVENTION

The present invention provides a system and method for the automatic study, layout and verification of a multidimensional space. A multidimensional space is a space having at least two dimensions. The transition from design of a space to its construction is greatly facilitated by the system and method of the present invention.

The automatic study of a multi-dimensional space (e.g., a 3D space) in accordance with the present invention involves the measurement of distances from system equipment to one or more selected points of reference within the multi-dimensional space and the measurement of distances from system equipment to various existing objects and structures within the multi-dimensional space. These measurements are used by the system of the present invention to generate a drawing (which may be in digital format) or graphical representation of the construction site and thus automatically generating, in real time, an accurate depiction of the multi-dimensional space based on the measurements made by the system equipment. Moreover, in addition to creating a graphical representation, in real time, of the multi-dimensional space being studied, the system of the present invention can also show the position, in real time, of the user of the system performing the study relative to the measured attributes of the multi-dimensional space being studied. Thus, the present invention not only generates a study of the multi-dimensional space being studied in real time, but is able to guide the user within the multi-dimensional space while the study is being made.

The automatic layout of a construction site in accordance with the present invention involves establishing benchmarks and monuments in the multi-dimensional space to indicate the physical location, positioning, orientation and relative placement of objects and structures specified in a design for that multi-dimensional space. Typically, a design for the development of a multi-dimensional space is memorialized as one or more drawings that precisely depict the spatial relationship of all objects and/or structures of the multi-dimensional space to be constructed. The design, when depicted graphically, represents a virtual space having specific physical features. During the execution of the automatic layout of the multi-dimensional space by a user of the system of the present invention, the system, with reference to the design drawings, orients itself within the multi-dimensional space and then points out the precise location of selected objects and/or structures contained in the design drawings as they would translate to the multi-dimensional space. Thus, the present invention is able to guide the user within the multi-dimensional space to a single point (or area or volume or other higher dimensional region) enabling the user to make markings within the multi-dimensional space indicating the specific positioning of objects and/or structures to be constructed at or within the boundaries of the multi-dimensional space. In one embodiment of the present invention, the user is able to control equipment of the system of the present invention to automatically make the markings for structures and/or objects specified in the design.

Automatic verification of a multi-dimensional space in accordance with the present invention involves a comparison of the representation (e.g., graphical representation) generated from an automatic study with the representation (e.g., graphical representation) generated by the designers— i.e., the virtual space. The system and method of the present invention will advise the user of any discrepancies between the two representations. Any discrepancies are noted by the present invention and are shown to the user. The method and system of the present invention can use any one or more of various techniques to notify the user of the existence of discrepancies between the design and the actual layout and design for the multi-dimensional space.

The system of the present invention comprises at least one Master station module that may be in communication with one or more substations. The Master station module is coupled to a Controller module. The Controller module is coupled to an Input/Output (I/O) interface module which is coupled to both an actuator/User Interface Device (UID) module and a Display module. The Controller module is also coupled to a Data Storage module.

The Master station module comprises at least one multi-channel transmitter, at least one multi-channel receiver and at least one processor. The Master station module may further comprise one or more mechanical devices and/or mechanisms that are controlled by the controller based on commands generated by the Controller module in response to the operation of the actuator/UID by a user of the system of the present invention.

Each of the substations comprises a transmitter, a receiver and a processor. The processor is coupled to both the transmitter and receiver and is further coupled to one or more controllable mechanical devices and/or mechanisms used by a substation to execute commands received from the at least one Master station. A substation's transmitter may be used to transmit information about the multidimensional space to the Master station module and the receiver may be used to receive commands from the Master station module.

The system of the present invention is used to perform one or more of a layout of a multi-dimensional space, a study of a multi-dimensional space or a verification of a multi-dimensional space as described earlier. During the study, layout and/or verification processes, the system can guide a user within the multi-dimensional space by displaying the multi-dimensional space (e.g., a 3D graphics representation), including known or already studied objects and/or structures and the user's current physical location simultaneously effectively guiding the user within the multi-dimensional space and to indicate to the user where to make markings when the user is performing a layout or to indicate to the user where an object or structure or physical feature of the multidimensional space is located when the user is performing a study. The system of the present invention can further display the virtual space as an overlay to the multi-dimensional space depiction. Thus, as the user physically moves within the multi-dimensional space, the system of the present invention is able to track the user's location and display said location within the graphical representation of the actual and/or virtual space in real time.

Two new industries are created as a result of the system and method of the present invention: Architectural Navigation and on site Autonomous Robotic Task Execution. Architectural Navigation involves the provision of various services dealing with the various tasks performed by one or more persons to facilitate the transition from the design phase of a construction project to the actual construction. Architectural navigation also includes the training and/or certification—as per a standard developed by a provider of the services—of users of the system and method of the present invention. Thus, a user trained and/or certified in the automatic study, automatic layout and/or automatic verification of a multi-dimensional space using the method and system of the present invention is referred to as an Architectural Navigator. In addition to the method described above, the Architectural Navigator performs various functions that serve to coordinate the information generated by the designers (e.g., architects, engineers) of the virtual space with the specific tasks to be done by the builders (e.g., general contractors, field engineers, surveyors) of the multi-dimensional space. During the study, layout and verification processes, the Architectural Navigator operates the actuator/UID (e.g., joystick, stylus, touchpad, touchkeys, gyro, space or 3D mouse, keyboard) to send various commands to the Master station to control the Master station and the substations. The Master station also receives information from the substations and provides said information to the controller to allow the system to perform the necessary processing for the automatic study, layout and/or verification of the multi-dimensional space.

On site Autonomous Robotic Task Execution (ARTE) involves the use of system equipment for (a) the fabrication and/or assembly of materials into components for objects and/or structures to be used in construction at a multi-dimensional space and/or (b) the system equipment performing construction tasks (e.g., automatic study, layout and/or verification) autonomously or perform the tasks under the control of a user with the use of such components and other components.

Such autonomous devices or equipment perform the ARTE construction in accordance with a program or set of instructions. A Master station module, for example, may be configured to remotely control tools mounted or attached thereon and be controlled by a user to do ARTE construction or be programmed by one or more software packages to do ARTE construction autonomously. Any entity that manufactures devices that can perform ARTE construction for a system of the present invention in accordance with the method of the present invention is part of this new industry. Further, any entity that provides the training and/or certification of individuals to operate ARTE equipment (that is part of the system of the present invention) in accordance with the method of the present invention is also part of this new industry. Any entity that provides the service of ARTE construction in which such entity has personnel trained and certified to do ARTE construction in accordance with a contractual agreement is part of this new industry. A person trained and/or certified to do ARTE work is referred to as an ARTE worker.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures and methods for carrying out the same purposes of the present invention and that such other structures and methods do not depart from the spirit and scope of the invention in its broadest form.

BRIEF DESCRIPTION OF THE DRAWINGS

FIG. 4A is an isometric view, while FIG. 4B is a front elevational view;

FIG. 6A shows an isometric view of this device while FIG. 6B shows a left side elevational view. FIG. 6C shows a computer module for the Master station module;

FIG. 12 shows a Transportable Substation;

FIGS. 13A-B show prism substations. FIG. 13A is an isometric view of a two Prism embodiment of a substation. FIG. 13B is an isometric view of a three Prism embodiment of a substation;

FIG. 15A shows a Substation comprising a robotic vehicle having wheels. FIG. 15B shows a Substation having a tank-link movement. FIG. 15C shows a Substation where the robotic vehicle has insect or spider-like legs. FIG. 15D shows a Substation having hydrofoil type air suspension movement;

FIG. 17A shows a Master Station module mounted on a robot vehicle. FIG. 17B shows a Master Station module capable of performing work;

FIG. 27A is a front elevational view while FIG. 27B is a left side elevational view;

FIG. 28C is an isometric illustration. FIG. 28B is a front elevational view of the device;

FIGS. 32A-C show a 360° Camera Station;

FIG. 32A is an isometric view of the camera;

FIG. 32B illustrates the camera mounted atop a telescoping pole. FIG. 32C illustrates the camera dangling from a crane;

FIG. 34A isometrically illustrates the interior of the device which comprises accelerometers and electronics;

FIG. 35 is a side elevational view of a transportable arm station;

FIG. 36 is a side elevational view of a transportable station;

FIG. 38 illustrates the various robot arm tools;

FIG. 38A shows a robot arm having a cutting tool;

FIG. 38B shows a robot arm having a printing or plotting tool;

FIG. 38C shows a robot arm with a plumb visible laser pointer;

FIG. 38D shows a robot arm with CMM, laser scanner, or manual point reading tools;

FIG. 38E shows a robot arm with a drilling, engraving and burning tool;

FIGS. 44A-D show a gyroscopically stabilized, cable driven, rail driven, or hover driven suspended computerized transport system;

FIG. 46A shows a head with a spring loaded awl;

FIG. 46B shows a head with a spring loaded marker or paint stick;

FIG. 48A shows the entire prism pole;

FIG. 48B shows the stabilizer head;

FIG. 59B shows an enlarged view of the laser rangefinder and rotating prism;

FIG. 62A is an isometric view showing the essential components that are comprised within the interior of the handheld unit;

FIG. 62B is an isometric view of the exterior of the handheld unit;

FIGS. 63-65 show flow charts of the method of the present invention.

DETAILED DESCRIPTION

Figure 1:
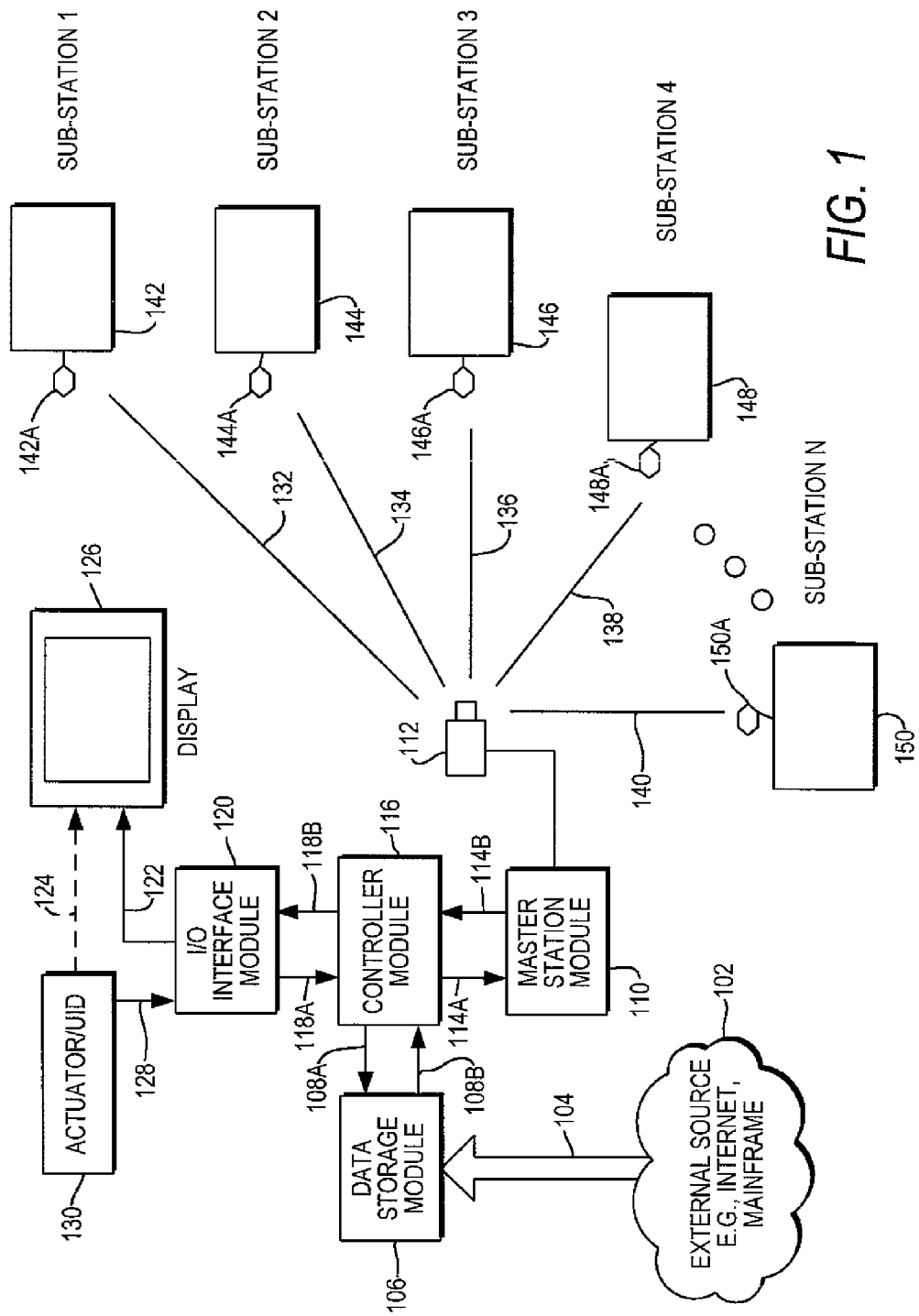
FIG. 1 shows a block diagram of the system of the present invention.

Reference will now be made in detail to the preferred embodiments of the present invention, examples of which are illustrated in the accompanying drawings.

As will be clearly shown throughout this specification, a task is done 'automatically' when some or all of the steps needed to complete the task are performed by the system equipment of the present invention in accordance with the method of the present invention. Some or all of the final steps for the various tasks discussed herein are performed by the system equipment which may be directed by firmware and/or software embedded in such equipment; such tasks are thus performed automatically.

The term "construction site" as used in this specification is understood to encompass any multidimensional space with defined boundaries within which construction of objects and structures and their positioning and orientation with respect to each other can be performed; the construction site also includes any multi-dimensional space in which part or all of the construction has been done.

Virtual space is visual representation or mathematical representation of a multi-dimensional space that can be depicted based on information (e.g., graphical and/or textual) describing the boundaries, particular objects and or structures of a design for the construction site, the positioning and orientation of the objects and/or structures with respect to each other and with respect to designated established points of references in the multi-dimensional space and the actual physical dimensions of the defined objects and/or structures. Information memorializing the design is referred to as virtual information. One example of virtual information is a set of drawings (e.g., 2D or 3D CAD (Computer Aided Design) drawings) generated by an architect or engineer for a construction project. Hereinafter, the terms "construction site" and "multi-dimensional space" will be used interchangeably.

The term "study" as used herein refers to the process of a user (preferably an Architectural Navigator) using the system of the present invention in accordance with the method of the present invention to locate reference points and other specified locations (e.g., monuments, benchmarks) in a construction site, measure distances between these specified points, identify existing structures and/or objects within the construction site, measure the actual physical dimensions of the existing objects and/or structures and measure distances between existing objects and/or structures located within the construction site to automatically generate a representation (e.g., graphical—2D or 3D CAD drawing or other type of representation) of the construction site in real time, i.e., as the study is being done. The reference points are specifically defined points or locations within the construction site that are designated as points from which measurements are initially done. Reference points are usually identified in the virtual information by the designers (e.g., architects, engineers) and are usually marked at the multidimensional space by an on-site surveyor of the multi-dimensional space. The information generated from the study may become part of the virtual information.

The term "layout" as used herein refers to the process of automatically identifying, in real time, the precise location of specific point and/or the location, orientation and arrangement of objects and structures within a construction site based on reference points and virtual information generated from a design and/or study. The layout process may also involve the guiding of the user of the system within the multi-dimensional space being laid out to a precise location. The precise location can then be marked by the user or the user of the present invention can use the equipment that is part of the system of the present invention to automatically mark the locations of the objects and structures within the construction site.

The system and method of the present invention enable a user to execute a layout of a construction site by performing a mapping between the construction site (i.e., multi-dimensional space) and the virtual space. A mapping refers to specifying a known point in one space and calculating or determining a corresponding point in another space where there is a well defined relationship (e.g., mathematical) between the two spaces. For example, as is done during the layout, a mapping from the virtual space to the multi-dimensional space (i.e., construction site) occurs when the method of the present invention applies the well defined relationship to a point within the designer's drawings to determine or calculate the location of the corresponding point in the actual multi-dimensional space.

The term "verification" as used herein refers to the process of comparing the virtual information with the study information to determine if any errors were committed during the layout process. The system signals the user of the location of the errors or discrepancies and the type of errors that occurred.

A user trained and certified in the automatic studying, laying out and/or verifying an multi-dimensional space using the method and system of the present invention is referred to as an architectural navigator. In addition to the methods described above, the architectural navigator performs various functions that serve to coordinate the information generated by the designers (e.g., architects, engineers) of the virtual space with the specific tasks to be done by the constructors (e.g., general contractors, field engineers, surveyors) of the multi-dimensional space. The designer/manufacturer of the system and method of the present invention may issue certain requirements and skill sets that a user needs to master prior to being recognized as a certified architectural navigator. For example, an architectural navigator, although not a surveyor, may benefit from an understanding of the fundamentals of surveying. During the study, layout and verification processes, the architectural navigator operates an actuator/UID to send various commands to the Master station to control the Master station and the substations.

A user trained and certified in the operation and/or programming and maintenance of equipment designed and constructed in accordance with the system of the present invention and operated in accordance with the method of the present invention to perform ARTE construction is referred to as an ARTE worker. An ARTE worker, at various times, will interface with the various tradesman at the site and professionals at the site to perform tasks designated for the ARTE equipment. The ARTE worker may confer with the on site general contractor to schedule certain tasks. Further, the ARTE worker may coordinate with the Architectural Navigator to strategize and plan the construction process for all or part of the construction site prior to the study of the construction site.

I. System of the Present Invention

Referring to FIG. 1, there is shown a block diagram of one embodiment of the system of the present invention. It should be noted that the system of the present invention can be built and/or implemented using various approaches and equipment. The system of the present invention is thus not limited to the particular embodiment shown in FIG. 1.

The system of the present invention is preferably implemented as an assembly of various combinations of modules which can be interconnected with each other to allow a user to perform the study, layout and/or verification of a construction site. The modules associated with the Master station module can be interconnected and/or coupled to each other to form a Master station assembly or a plurality of modules one of which is the Master station module. The term "Master station" when used herein refers to either a Master station module or a Master station assembly. Each module is a device that can perform one or more tasks and is capable of being coupled to one or more other devices which may or may not themselves be modules. Each of the substations is preferably configured as a combination of modules.

Still referring to FIG. 1, a user, such as an architectural navigator, may operate actuator/UID module 130 to send a command to Master station module 110 via I/O interface module 120 and Controller module 116. The command is transmitted with the use of propagation device 112 module to any number of N sub-stations (142, 144, 146, 148 and 150) located within the construction site where N is an integer equal to or greater than 1. Propagation device module 112 may also be used to receive signals from the substations. Propagation device 112 is shown as a laser that can transmit visible or invisible laser beams during layout, study and/or verification of an multi-dimensional space. The laser shown may also have a sensor for receiving reflected laser beams thus allowing device 112 to also receive signals. Device 112 may be any one or more devices used to transmit and receive electromagnetic signals, including RF (Radio Frequency) signals, microwave signal and other types of signals. As shown, the commands from Master station module 110 are transmitted over communication links 132, 134, 136, 138 and 140. The communication links may be, for example, laser signals of different wavelengths, or RF (Radio Frequency) communication channels (e.g., air, twisted wires, coaxial cables, optical fibers, microwave waveguides) occupying distinct frequency bands or other types of well known propagating signals, e.g., optical signals, microwave signals, radar signals, infrared signals.

The substations 142, 144, 146, 148 and 150, each having a corresponding propagation device (142A, 144A, 146A, 148A, and 150A) that can transmit and/or receive signals and strategically positioned throughout the construction site to allow for a proper study, layout or verification. Display 126 is used to depict textual information generated using the actuator/UID module 130 and/or graphical representations (i.e., CAD drawings) of the construction site or the virtual space. Under the control of the software resident in Controller module 116, Display 126 can show both the construction site and virtual space simultaneously and further can depict construction site information received by Master station module 110 from one of the N substations. Display 126 can also depict graphical information obtained from data storage 106 or Master station module 110. The graphics are generated by Controller module 116 from firmware or software loaded therein using the information from Data storage module 106 and information received from one or more of the N substations.

Master station module 110 is coupled to Controller 116 via connections 114A and 114B. Controller module 116 is coupled to Data storage module 106 via connections 108A and 108B. Controller module 116 is also coupled to I/O interface module 120 via connections 118A and 118B. I/O interface module is coupled to both actuator/UID 130 and Display 126 via connections 128 and 122 respectively. Display 126 is coupled to actuator/UID 130 via connection 124. Connection 124 allows text or the results of other user originated signal (i.e., from a mouse, joystick, stylus, touchpad) to be shown on Display 126. The term "couple" as used throughout this specification can refer to a mechanical connection, an electrical connection, an optical connection or a magnetic connection or any combination of these types of connection; the term generally refers to a certain pathway, channel or arrangement that allows signals (electrical, magnetic, mechanical, electromechanical, optical, electro-optic) to be transferred from one location to another or from one module to another. Therefore, the term "couple" is not necessarily limited to a physical connection; for example a magnetic coupling may be achieved between two components which are not physically connected to each other.

The information stored in Data storage module 106 may be virtual information which can realized as, for example, blueprints or CAD (Computer Aided Design) drawings generated by an architect and/or civil engineer of a construction project.

Data storage module 106 within which the virtual information is stored can be implemented as a memory unit containing digitally stored graphics and technical information generated by an architect or engineer or other designer of the multi-dimensional space. The virtual information may be generated in any number of well known fashion using software packages and such information can be transmitted over a communication link such as communication link 104 and/or through a communication network 102 such as the Internet. Communication link 104 can be a direct physical connection such as a coaxial cable, a telephone line, or a wireless link, an optical link or any combination thereof.

Master station module 110 is shown with signal propagation device 112 as one of several modules that are coupled or are in communication with each other. Signal propagation device 112 can be an antenna for propagating wireless signals. In short, signal propagator 112 allows for the propagation of electromagnetic signals including but not limited to radio UHF (Ultra High Frequency), VHF (Very High Frequency) signals and optical signals such as one generated by a laser. The propagation device 112 is detachably attached to the Master station so that depending on the particular type of signal being transmitted by the Master station, the proper and correct propagation device can be mechanically and/or electrically coupled to the Master station module. For example, a laser can be coupled to Master station module 110 to allow for the propagation of optical signals (e.g., one or more laser beams) generated by a laser that is part of the Master station module circuitry and equipment. For the propagation of radio signals (RF or radio frequency signals, UHF, VHF signals) an antenna can be coupled to the Master station module. Master station module 110 can thus transmit optical and/or radio signals. The Master station module 110 is a module that is able to transmit commands to any one or more of the N substations.

One embodiment of the Master station assembly (i.e., a plurality of coupled modules with the Master Station module) shown in FIG. 1 can be constructed from a well known measuring instrument called a "theodolite" or a total station instrument. Such an instrument can be fitted with laser beams to project a visible beam or measure distances as well as horizontal and vertical angles at construction sites. As such a theodolite can be retrofitted with a computer (having a display, a controller, an actuator/UID device) and controllable mechanical mechanisms and devices wherein the computer operates in accordance with the method of the present invention (implemented as one or more software programs). Another embodiment of the Master station assembly can be a retrofitted robotic vehicle that can be remotely controlled via Radio signals or other types of signals to perform various tasks. The Master station assembly shown in FIG. 1 can be coupled to such a robotic vehicle to allow an architectural navigator or a trained user of the system and method of the present invention to perform automatic study, automatic layout and automatic verification of an multi-dimensional space. Yet another embodiment of the Master station assembly can be implemented with a docking station which can be used to receive any type of portable computing device (e.g., pocket PC, Personal Digital Assistant (PDA)) that performs the function of Controller 116, Display 126, I/O 120, actuator 130 and Data storage unit 106.

A. Master Station Module

The Master station module comprises at least one multi-channel transmitter, at least one multi-channel receiver and at least one processor. The Master station module may further comprise one or more mechanical devices and/or mechanisms that are controlled by the Controller (i.e., controller 116 of FIG. 1). The Controller generates commands in response to the operation of the actuator/UID by a user of the system of the present invention; such commands are used to control the mechanical devices and/or mechanism coupled to the Master station module. The multi-channel transmitter is a signal transmission device that is able to transmit one or more distinguishable signals to the substations via a propagation device such as an antenna or laser generator. A more detailed diagram of the Master station module is shown in FIG. 3.

Figure 3:
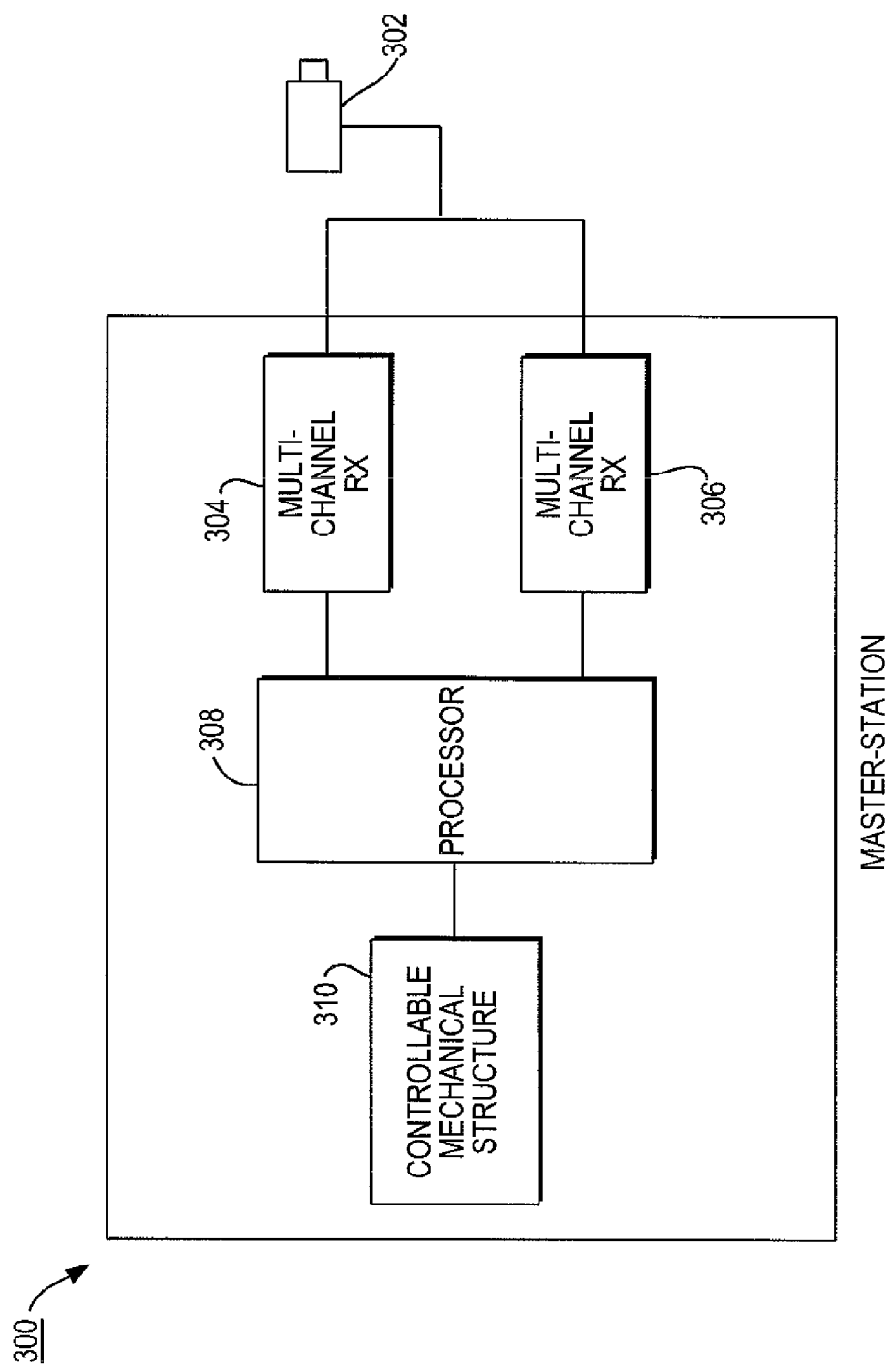
FIG. 3 shows a block diagram of a Master station module of the system of the present invention.

FIG. 3 depicts a block diagram of a Master station module 300 comprising processor 308 coupled to multi-channel receiver 304 and multi-channel transmitter 306. Processor 308 is also coupled to controllable mechanical structure 310; Master station module 300 is a more detailed block diagram of Master station module 110 shown in FIG. 1. Controllable mechanical structure 310 may be one or more mechanical or electromechanical devices or mechanisms (e.g., radio controlled vehicle, robotic system) that can be controlled by processor 308 based on commands received by Master station module 300. Signal propagation device 302 may be implemented as an antenna or may be a laser generator for projecting laser beams to one or more substations or a surface. Signal propagation device 302 is also used to receive signals in addition to using it as part of signal transmission equipment. In the example of a laser, a sensor may be mounted on a signal receiving portion of device 112 to allow for reception of signals. In the case of an antenna, the antenna will be used at various times to receive signals transmitted from substations and/or other master stations. Master station module 300 may comprise more than one type of signal propagation device (e.g., one antenna and one prism coupled to the same Master station module). Processor 308 can be implemented as a microprocessor that is capable of processing the contents of received signals to cause Master station module 300 to perform tasks with the use of controllable mechanical structure 310. Processor 308 can also generate responses and/or commands for transmission to one or more of the N substations and/or to controller 116 (see FIG. 1).

One of the tasks to be performed by Master station module 300 is to locate its position within a construction site and correlate that position to its corresponding location in the virtual space; this process is commonly referred to as triangulation wherein the distance of an object from two known points is used to accurately locate the position of the object. More than two known points can be utilized for even more accurate position location. In the present invention, Master station module 300 can also locate reference points defined in the virtual space and identified in the multi-dimensional space (usually by a surveyor). Master station module 300 is positioned so as to have a proper direct line of sight to both reference points. Master station 300 can have as its transmitter a laser-prism device that can direct a beam of laser to a first reference point and measure the distance to that reference point. The laser beam can then be directed to the second reference point and the distance to that second reference point is measured. The use of laser beams (typically invisible beams) to measure distances at a construction site is a well known technique. Alternatively, a substation with a laser beam reflectable prism can be correctly positioned at each of the reference point locations and the Master station can determine the distance between it and both substations. Also, optical reflective material or devices and/or electromagnetic signal reflective material or devices can be placed at the reference points and other points within the multi-dimensional space to allow for measurement of distances and objects and structures within the multi-dimensional space. Master station module 300 can then transfer the distance information for both reference points to Controller 116 (see FIG. 1) for execution of the triangulation process to determine the current location of Master station 300 with respect to identifiable references, objects and/or structures in the multi-dimensional space and in the virtual space.

In addition to transmitting signals to substations and receiving signals from substations, various components of Master station module 300 or the entire module can be controlled by Controller 116 to perform various tasks during the process of laying out an multi-dimensional space or performing a study of a construction site. For example, the signal propagation devices (e.g., lasers, antennas) coupled to Master station module 300 can be rotated or repositioned or, in the case of a vehicular or mobile Master station, the entire Master station can be caused to move to a new location and new measurements taken. A user of the system can, for example, control the Master station module 300 through the manipulation of actuator/UID 130.

It should be noted that the method of the present invention including performing a study, a layout and a verification can be executed with a Master station assembly such as the one shown in FIG. 1. The master station assembly comprises Master station module 110, signal propagation device 112, Controller module 116, I/O interface module 120, actuator/Interface module 130 and Display module 126. The Data storage module 106 may or may not be part of the master station assembly.

B. Controller Module

Referring back to FIG. 1, Controller module 116 is a processing device that can be implemented with one or more microprocessors or microcontrollers. Controller module 116 can be a stand alone laptop, desktop computer, a mainframe computer or a network of interconnected computers. Computer module 116 can be co-located with Master station module 110 or maybe located a relatively long distance from Master station module 110. Controller module 116 has access to Data storage module 106 in which virtual information is stored. Controller module 116 is capable of accessing some or all of the virtual information during or prior to a layout, study or verification of a construction site.

The method of the present invention, which can be implemented with one or more software programs controlling one or more controllers, is stored in the memory portion of Controller module 116. Controller module 116 can thus execute any one or more of the steps of the method of the present invention and all steps necessary to control the Master station, the substations, and generate, in real time, a graphics representation of the multi-dimensional space and virtual space. Most importantly, Controller module 116 can execute one or more steps of the method of the present invention to perform automatic studies, automatic layouts and automatic verifications of construction sites. Controller module 116 can control one or more Master stations to perform the triangulation technique. Further, Controller module 116 can cause one or more Master station modules to control one or more substations to perform triangulation, measurement of distances and measurement of objects and structures in the multi-dimensional space. Controller module 116 thus controls the Master station modules directly and controls the substations indirectly (via the Master station modules) to measure distances, horizontal and vertical angles, and dimensions of identifiable objects and/or structures. Further, Controller module 116 can generate a graphics representation of the virtual space and/or the multi-dimensional space and display such spaces in 2D or 3D on Display 126. When the virtual space and multi-dimensional space are shown simultaneously, either one can be shown as an overlay on the other. It should also be noted that Controller module 116 can perform various mapping operations to allow the system of the present invention to automatically generate, in real time, graphical representations of a multi-dimensional space during a study and/or layout as per the method of the present invention. Controller module 116 directs the execution of various tasks based on the system software residing therein.

System Software

The System Software is a Computer Aided Design (CAD) software system having a graphical user interface (GUI) built for ease of use within the construction and architectural marketplace. The software is geared to performing specific location, navigation, reading and writing construction tasks rapidly. The System Software mimics the look and feel of GPS (Global Positioning Systems) systems that are utilized in automobiles or other vehicles for navigation. The user is guided within a worksite drawing that represents a building under construction, for example. The software is used in conjunction with Master Station modules, Substations to create dimensionally correct as-built studies of existing architectural conditions in appropriated formats (e.g., 2D or 3D CAD drawings) in real time.

The System Software can be located within a handheld, laptop, tablet or desktop computer or other computer with the ability to communicate with (send commands to or receive telemetry from) Master Station modules and/or Substations. The System Software thus can function as distance measurement, navigation and documentation control software. The System Software sends commands to and receives telemetry back from the Master Station module. The System Software sends commands to the Master Station module firmware telling it to perform specified tasks on demand (e.g., turn in a specified direction or move up or down to a particular angular position, turn the visible laser pointer on or off, measure distance or angle etc.). The Master Station module responds by executing the requested functions and then sending performance or measurement telemetry back to the System Software. See functions listed below.

The software in Controller 116 enables the Controller module to control various mechanisms of the Master station assembly to perform tasks associated with executing a study, a layout and/or verification. Some of the features of the system software are as follows:

- position control and zoom control are "ghosted" (displayed over the drawing and somewhat transparent or diaphanous).
- Select locations graphically within the displayed drawings.
- Visual reference of point being measured and location of prism transmitting laser beam to target displayed on the computer display (e.g., display 126).
- A transmitter such as a prism is tracked by the software; when the prism is moved, its new location is shown in the Display.
- Display of target prism (substations used at a reference point) location with respect to the graphics representation of the multi-dimensional space and the virtual space.
- Routing of user through a series of selected points during the layout process.
- Measurements can be displayed in feet and inches.
- Multi-prism offset function
- Automatic monument recognition (a monument is a specially identified structure or object within the multi-dimensional space).
- Location of User; YOU ARE HERE displayed on the screen.
- Tracking mode in which position of Master station and one or more sub-stations are continuously monitored (using invisible laser beams); locations are expressed in terms of xyz coordinates.
- Visible laser beam used during layout; locations are displayed in xyz coordinates.
- Position of actuators/UID device (e.g., mouse, keyboard, 3D mouse, joystick, touch pad, stylus, digitizer, gyro, are tracked in space by the laser and allows a user to point the laser at a desired location; this is called Active Laser pointing mode.
- Once a target (e.g., a reference point) or point in space is selected the "Distance to target" from present location is displayed on screen display 126.
- Transfer seamlessly between reflectorless mode and prism tracking mode
- Shoot a visible laser in prism tracking mode
- Access to alternate drawings or drawing layers is available.
- Power search function: Master station will follow a procedure to actively search for the prism location.
- Automatic detection and location of substation.
- A complete drawing overview is "ghosted" (displayed over another drawing and somewhat transparent or diaphanous); this represents the position of the Master station(s), substations and prisms (at various points) in relation to the entire multi-dimensional space.
- A CAD drawing of the project is referenced to the construction site based on control points and fixed reference stations. This activity can be done manually or automatically by the software.
- As you approach the target, the graphic zooms in to deliver greater detail and more precision.
- The software delivers precise xyz coordinates while in transit from one position to another.
- Creation of a document that represents what work has been done, what has been laid out, recorded or altered with a time, date and user stamp for quality control and documentation purposes. The file can be a deliverable.
- Control coordinate measurement information, including images of control point locations are recorded or associated with a particular file and layer within each document.
- Ability to record and associate images or video of an architectural space with a particular coordinate.
- Ability to use video feed received from any Master station, substation, vehicular stations, vehicular Master stations, Fixed reference stations or Transportable stations to train the device accurately on a target without having to be standing at the device.
- Precision control of Master station module motor movement for any one or more motors that may be used in the Master station module.

C. I/O Interface Module

Input/Output Interface module 120 is a device typically connected to user interface devices (UID) to receive signals from such devices and properly convert such signals for processing and then transfer such converted signals to a processing unit such as a microprocessor or microcontroller. Conversely, signals from a microprocessor to one or more UIDs are received by I/O interface module 120 and converted for use by a UID. For example, a graphics representation is processed by Controller 116 which sends signals to be displayed by Display 126. The signals prior to reaching Display 126 are properly converted by I/O Interface module 120 so that they can be properly processed by Display 126. I/O interface module 120 typically acts as a device that allows the processing portion of a computer or computing system to properly interact with human or user operated devices.

D. Actuator/UID Module

Actuator/UID (User Interface Device) 130 represents one or more user operatable devices that are used to communicate with a core processor of a computer or computing system to send commands, responses and otherwise operate the computer system or computer. Examples of actuator include but are not limited to keyboards, mouse, spatial or 3D mouse, stylus, touch pad, roller ball, and joystick.

E. Display Module

Display module 126 can be any one or more of well known display devices such as CRT (Cathode Ray Tube) monitors, Liquid Crystal Displays (LCD displays), plasma displays, or type of displays used to depict video, graphical, text and any other type of information that can be visually displayed.

F. Data Storage Module

Data storage module 106 can be any memory space using any type of well known storage media to store information in digital, analog form in any well known format. The module can store information using magnetic media, optical media, semiconductor media or any combination thereof.

G. Master Station Assembly (1) FIG. 1A

Figure 1A:
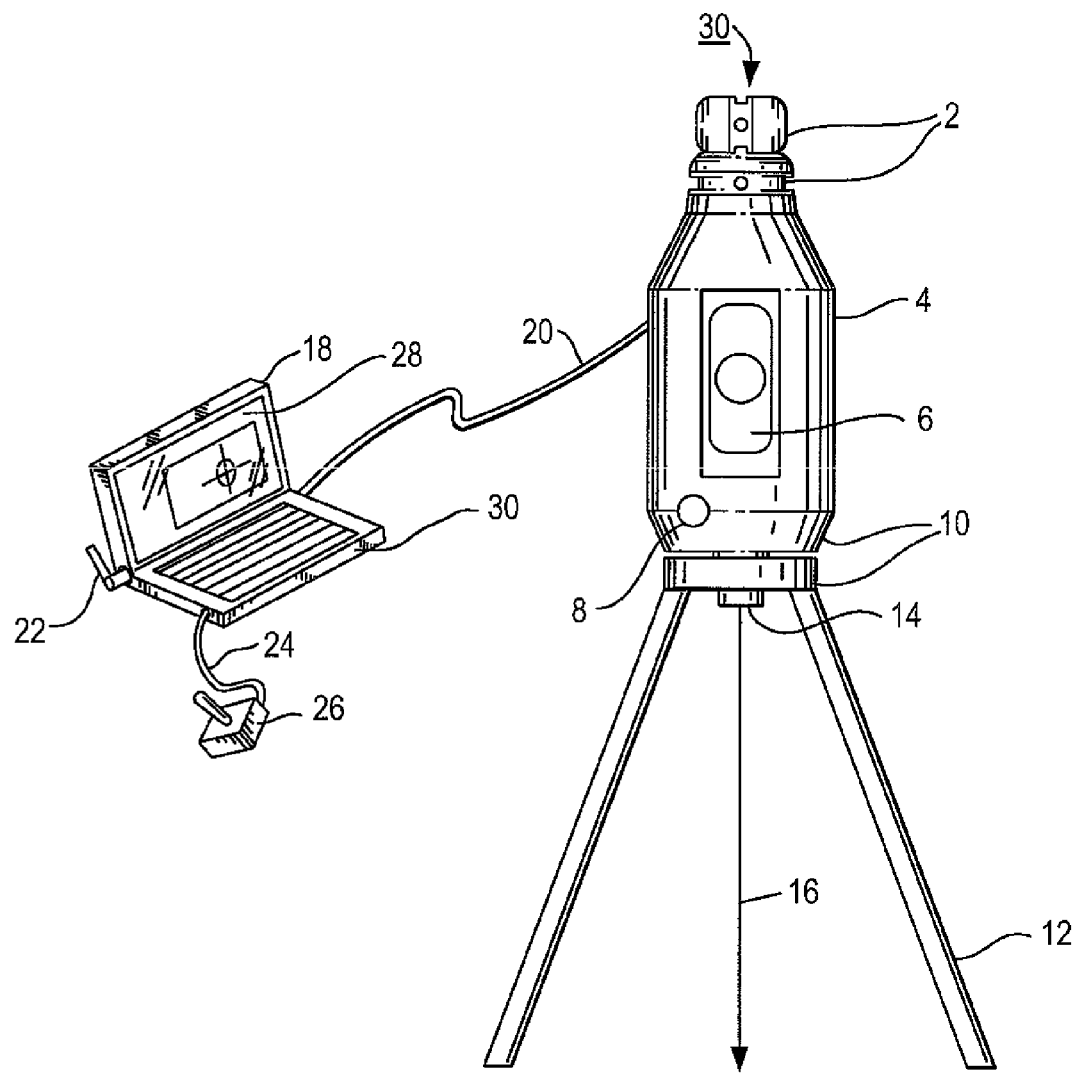
FIG. 1A shows a particular implementation of the system of the present invention.

The Master Station assembly shown in FIG. 1A is one specific embodiment of the system of the present invention that can be operated in accordance with the method of the present invention. The Master station assembly comprises Master station module 30, laptop 18 and Actuator/UIDs 26 and 30 shown here as a joystick (26) and keyboard (30) respectively. An antenna 22 is shown as part of a wireless modem (not shown) that can be used to access virtual information (e.g., architect drawings for the multi-dimensional space) stored in a remotely located data storage module (not shown) via the Internet, for example. Alternatively, the data storage module may be part of the memory (not shown) in the laptop.

Still referring to FIG. 1A, the Master station assembly can perform any and all of the steps of the method of the present invention to achieve automatic study, layout and verification of a construction site. Master station module 30 has rotating and/or spinning lasers 2 for directing visible or invisible beams of laser to objects, points of references, bench marks, monuments or other defined point in a multi-dimensional space. Preferably, a visible beam is generated during the layout process and an invisible beam is directed during the study process. A sensor 8 is properly positioned on the module housing 4 to receive and/or detect beams reflected from objects or structures within the multi-dimensional space. A scope 6 is used to measure vertical and/or horizontal angles within the multi-dimensional space. Self leveling mechanism 10 is used to properly level the module; laser 14 shown directing a laser beam 16 for leveling or plumbing the module. The module housing 4 is mounted on a tripod 12. Within the module housing 4 are various controllable mechanical mechanisms and devices (not shown) that can be controlled by the operation of joystick 26 in conjunction with software residing in the controller of the laptop 18.

Laptop 18 comprises and I/O interface module, a controller module and a data storage module none of which are shown in FIG. 1A. Thus, with virtual information stored in the data storage module and software complying with the method of the present invention installed in the Controller module of laptop 18, the Master station assembly shown in FIG. 1A can perform the automatic study, layout and verification of a construction site. Depending on the particular physical features of the construction site, additional components such as substations may be used to perform the automatic study, layout and verification of the construction site.

(2) FIG. 1B

Figure 1B:
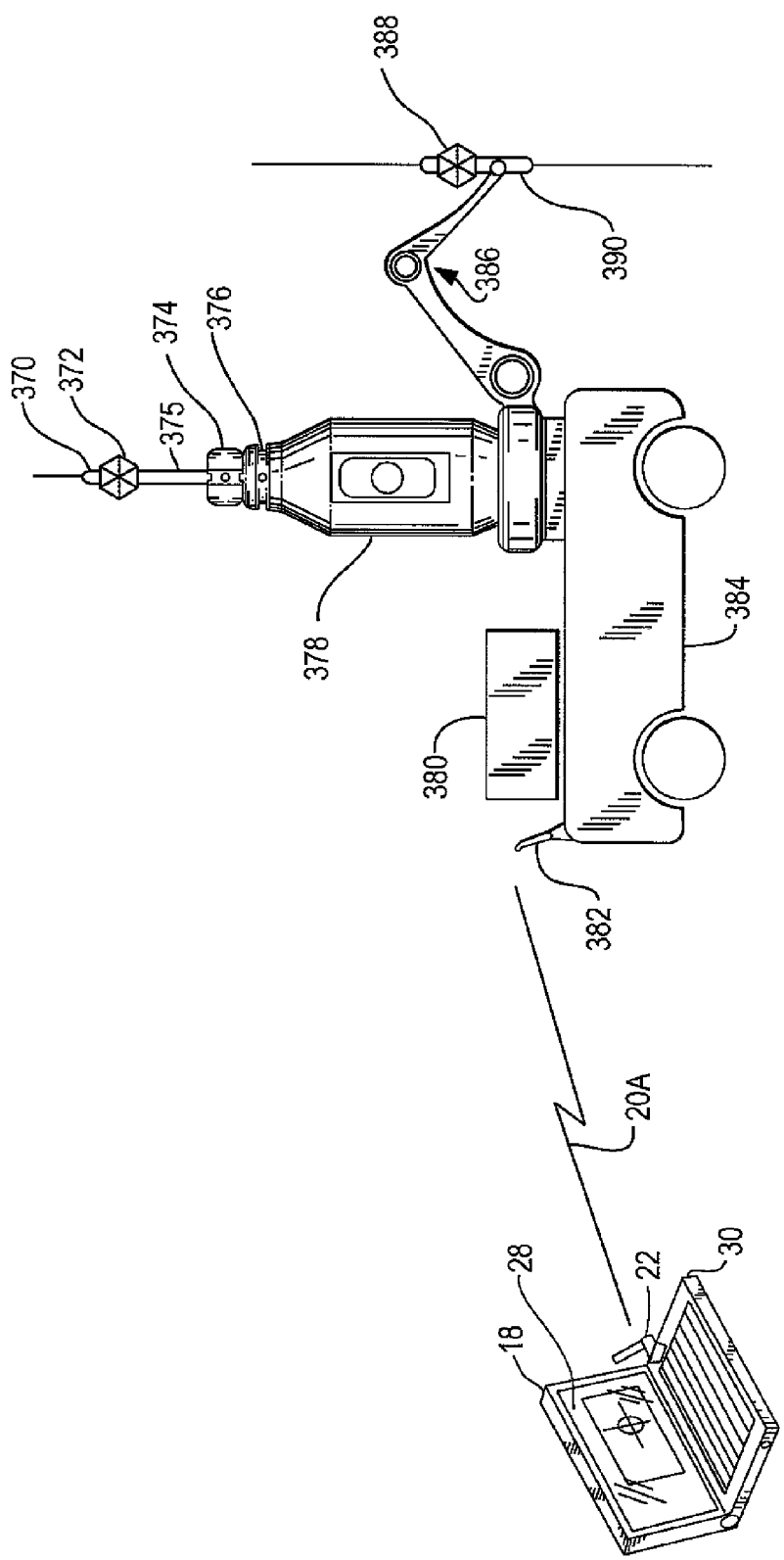
FIG. 1B shows another embodiment of the system of the present invention.
Figure 37:
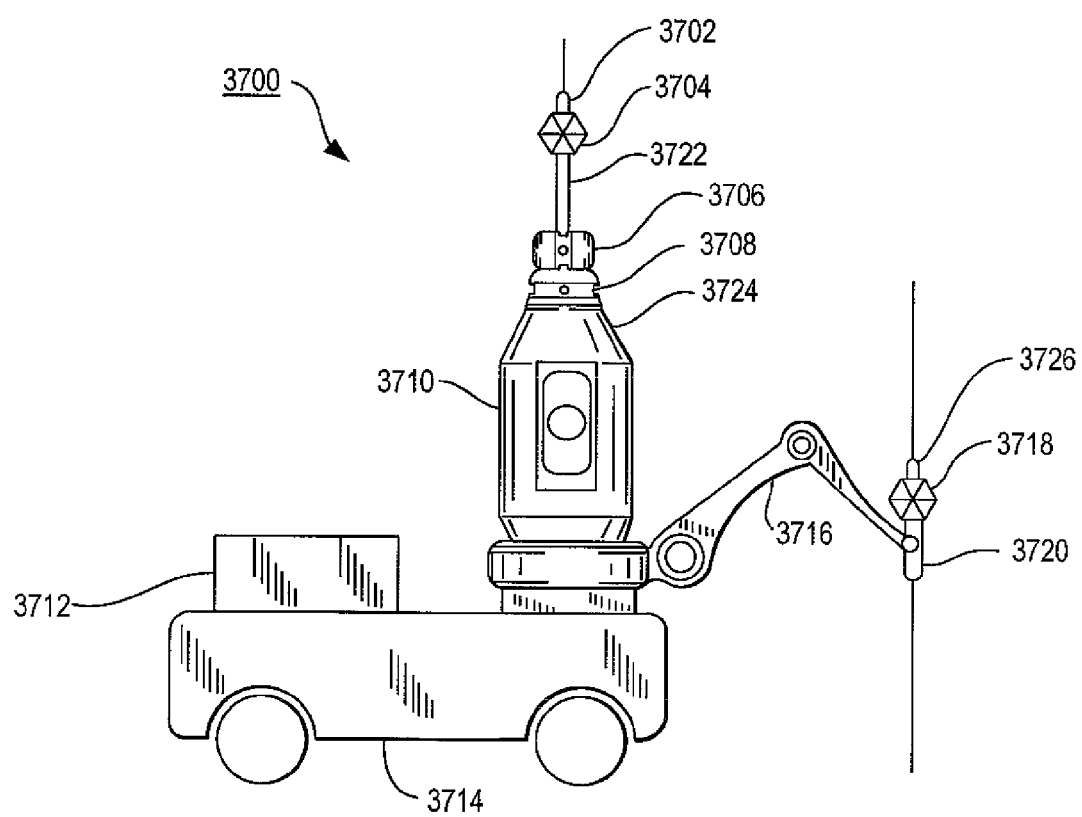
FIG. 37 is a side elevational view of a vehicle mounted Master station, having a tool arm, horizontally and vertically scanned visible lasers, and electronic distance measurement devices.

The Master Station assembly shown in FIG. 1B is the Master station assembly as discussed with respect to FIG. 37 (Vehicle Mounted Master Station) discussed infra, wherein such Master station module can be directly controlled by a user of the present invention (i.e., an ARTE worker or an Architectural Navigator or someone skilled in both industries). The Master station assembly shown in FIG. 1B can also operate autonomously. The Master station assembly can perform fabrication and/or assembly of components to be used at a construction site (i.e., multidimensional space) and use the fabricated and assembled components and other components to also perform construction at the site. An ARTE worker can wirelessly download a program from the laptop to the Master station processor to allow the Master station assembly to operate autonomously (as per the instructions in the downloaded program) without any direct control by the ARTE worker and/or architectural navigator. Autonomous operation refers to one or more pieces of system equipment operating and performing one or more tasks while not under the control of a user; such equipment can operate as per the software programs downloaded therein. As shown, the Master station has an antenna 382 and associated electronics (not shown) to receive signals from the laptop 18 to allow the laptop to download programs to the Master station module. The laptop has keyboard 30, display 28 and antenna 22 which may be coupled to internal communication equipment (not shown) to generate signals via communication link 20A. Master station module comprises toolbox 380, master station housing 378 on top of which are mounted a horizontal spinning laser 376 and horizontal spinning laser 375. A pole 375 emanates from the top of the master station housing 378 where said pole 375 has attached to its end prism 372 and laser pointer 370. The Master station module 384 further comprises robotic arm 386 at the end of which are laser pointer 390 and prism 388. All of the above described components, except for the laptop and its components are mounted on top of vehicle 384 which can also be controlled by a user operating laptop 18 or autonomously by laptop 18 executing a program consistent with the method of the present invention.

H. Substations

Figure 2:
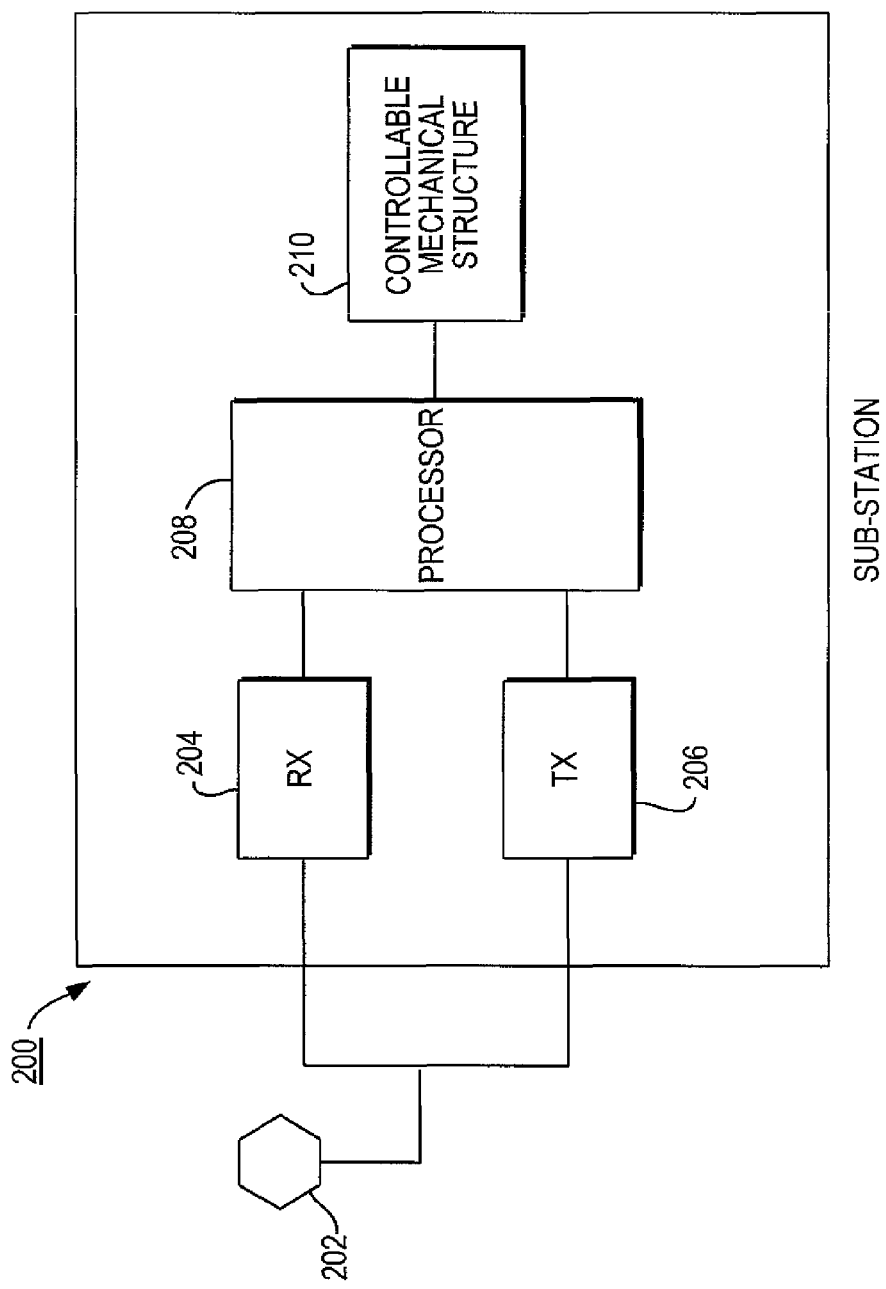
FIG. 2 shows a block diagram of a substation of the system of the present invention.

Referring to FIG. 2, there is shown a block diagram of a substation which can be made part of the system of the present invention to perform the method of the present invention. Substation 200 comprises receiver 204, transmitter 206, processor 208, controllable mechanical structure 210 and signal propagation device 202. The propagation device 202 is coupled to both transmitter 206 and receiver 204 both of which are coupled to processor 208 which is coupled to mechanical structure 210. Signal propagation device 202 receives signals (e.g., radio signal, laser beam) from a Master station, and said signals are transferred to processor 208 for processing. The propagation device 202 may also transmit signals to a Master station or to other substations. The signals may contain one or more commands that are processed by processor 208 to control mechanical structure 210 to perform a task. Substation 200 can be constructed with different module to create different types of substations. For example, there may be substations without processors and transmitter that are used simply to reflect laser beams from one or more Master stations during a study or layout procedure.

I. Various Examples of Master Station modules, Master Station Assemblies, and Substations and their Components 1. Leveling Communications Laser The Leveling Communications Laser comprises pulse modulated spinning laser mechanisms that can be mounted atop a Master station module (see FIGS. 4A and 4B). The device provides visible horizontal and vertical reference laser lines. This device is capable of reading barcode information printed on objects within its line of sight. Additionally these lasers are pulse modulated and are capable of transmitting data to a device that can receive the information transmitted.

Sensors are also in place, thus enabling reading or receiving of information sent from a pulse modulated transmitter. The Leveling Communications Laser can communicate with other similarly equipped Master stations, Substations, Vehicular or Fixed Reference Stations. Further, the Leveling Communications Laser is mechanized for self leveling.

Figure 4A:
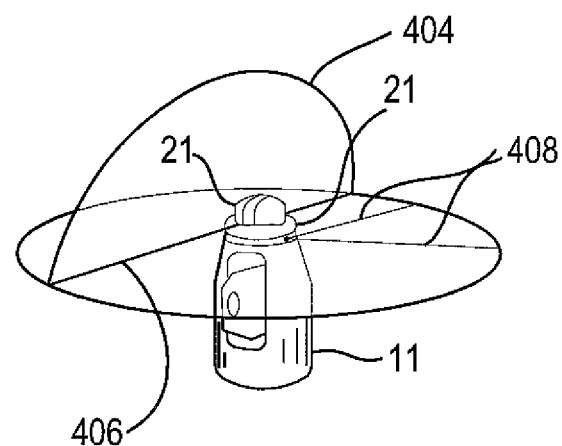
FIGS. 4A-B show a Leveling Communications Laser that can be part of a Master station of the system of the present invention.
Figure 4B:
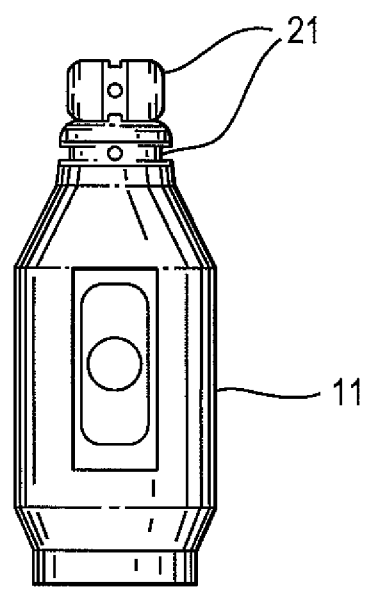

FIG. 4(A) is an isometric view of the device. The blanketing effect of the spinning lasers is shown. FIG. 4(B) is a front plan view of the device. The positioning of the horizontal and vertical spinning lasers 21 on a robotic Master station 11 is shown. The blanketing effect is to produce a level horizontal plane and a vertical plane of laser light which emanate from the top of the Master station 11.

2. Instrument Height Distance Meter

Figure 5:
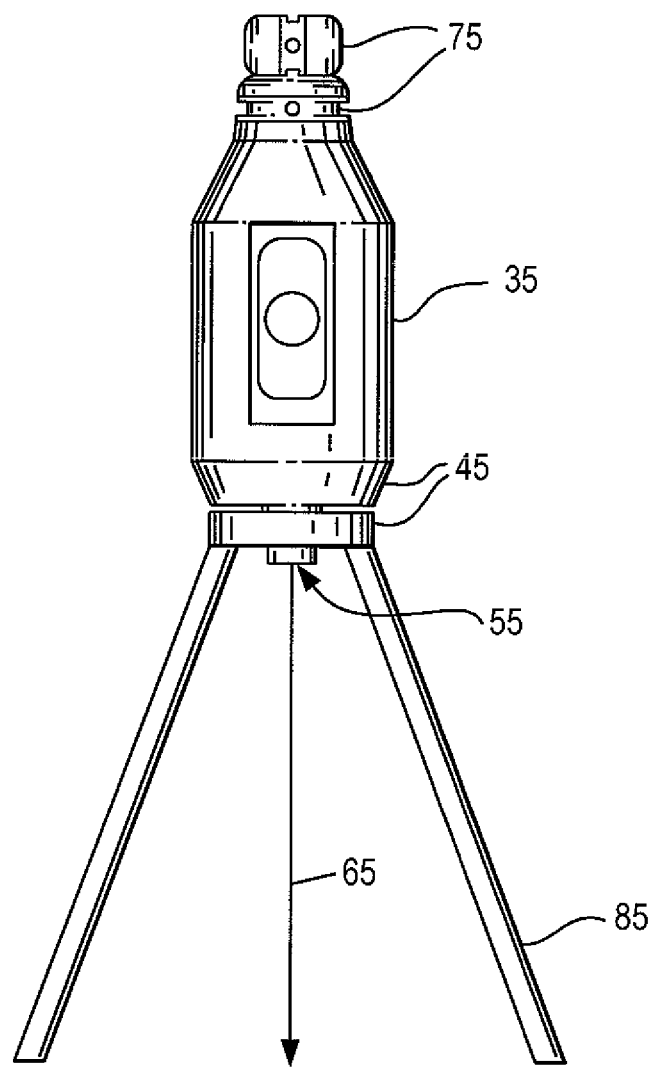
FIG. 5 shows a front elevational view of a Master station module of the system of the present invention having a laser plumb.

Referring to FIG. 5, the Instrument Height Distance Meter is a device that furnishes a method of measuring the distance from the device to the ground via a laser distance measurement device. Handheld laser based distance measurement devices possess a compact form factor and are available as state-of-the-art technology. This device incorporates similar compact electronics for laser distance measurement onto the base of an existing Master station housing 35 for the purpose of acquiring an accurate instrument height measurement from the floor or ground. The electronics comprise automatic leveling apparatus 45 and a laser 55 along with distance measurement electronics. The laser emits a visible laser beam 65 along the vertical axis which is used to measure the distance to the floor or ground. Because this device shown in FIG. 5 is a Master station, the housing 35 further comprises vertical and horizontal spinning lasers 75. The lasers 75 can enable automatic, autonomous orientation of the Master station in relation to the space (or CAD or digitized drawings) in which it is placed; this is done by searching for and measuring the distance to any number of fixed reference stations or to other Master stations or substations. The Master station is mounted on a tripod 85.

3. System with Mounted Camera for Remote Targeting

Figure 6A:
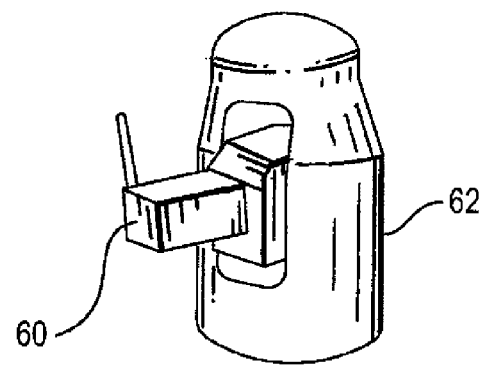
FIGS. 6A-C show a Master station module with a Camera Mounting.
Figure 6B:
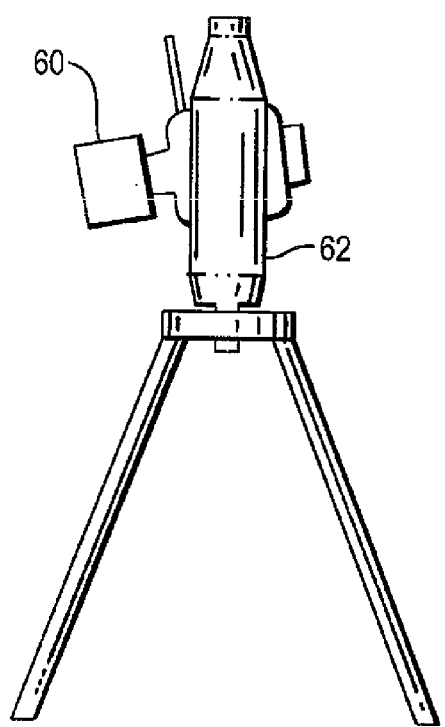
Figure 6C:
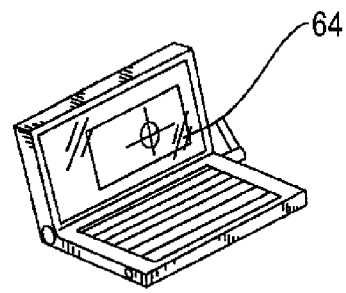

This device incorporates a camera 60 mounted inside the Master station 62 coupled with the optics of the Master station to provide a reflex view of the target. FIG. 6A shows an isometric view of this device while FIG. 6B shows a left side elevational view. This device permits a user to target the Master station remotely by viewing a pop-up window on a computer screen 64 shown in FIG. 6C. Thus, the user could be a very large distance away from the device, and using wireless communications, be able to target a point that he is standing next to and see the cross-hair focused on his target on the screen 64.

4. Visible Laser Cross-Hair Optics

Figure 7:
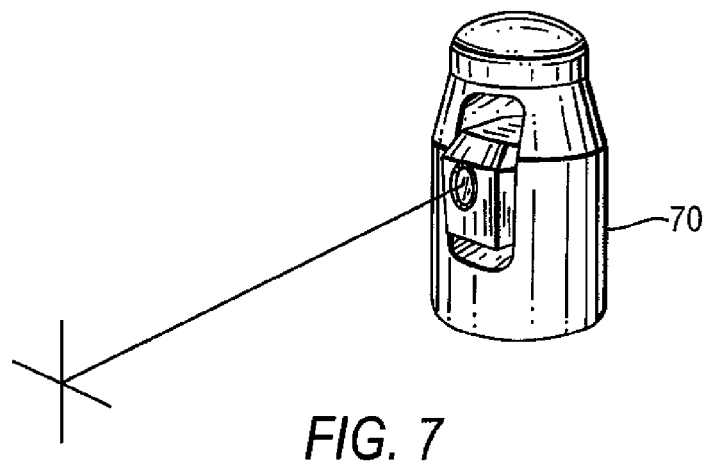
FIG. 7 is an isometric view of a Master station module focusing a laser beam cross-hair on a target.

Referring to FIG. 7, optics to focus a laser beam cross-hair onto a target are incorporated into the optics of a Master station 70. This aids the user to visually locate the target.

5. Visible Laser Plummet Cross-Hair Optics

Figure 8:
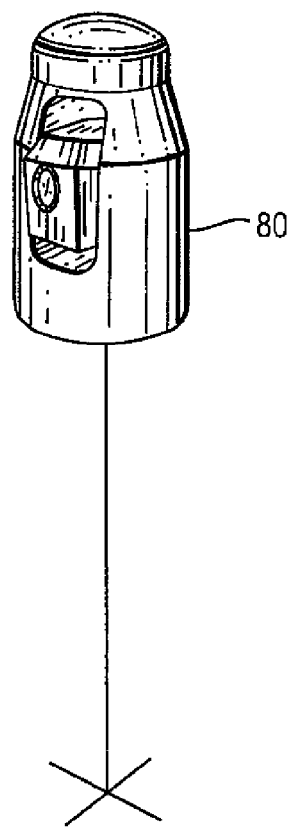
FIG. 8 is an isometric view of a Master station module focusing a laser beam cross-hair on the ground or floor.

Referring to FIG. 8, mounting cross-hair optics on a bottom mount of a Master station 80 provides greater visibility of the point on the ground or floor from which the height of the Master station is being measured (see FIG. 5). Often users wish to physically locate such a point which could be a great distance away from the Master station.

6. Multiple Leveling Laser Station

Figure 9A:
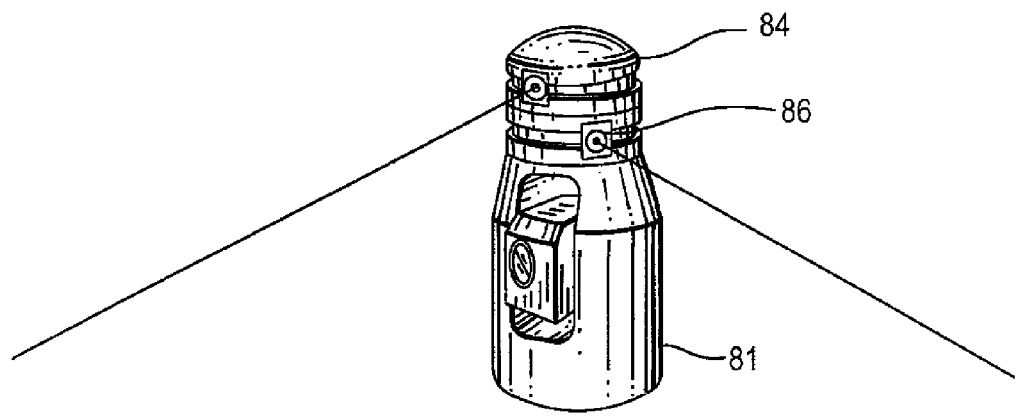
FIG. 9A shows an isometric view of a Master station module having two horizontal spinning lasers.
Figure 9B:
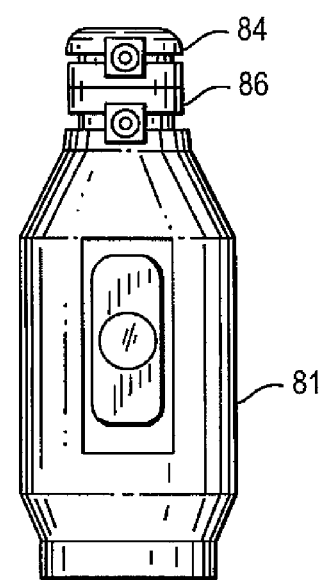
FIG. 9B is a front elevational view of FIG. 9A.

FIG. 4A shows a Master station having a single horizontal spinning laser for the purpose of establishing a horizontal plane to be used in leveling the Master station. FIGS. 9A-B show a Master station 81 having two horizontal spinning lasers 84 and 86. FIG. 9A is an isometric view while FIG. 9B is a front elevational view. The use of a plurality of spinning lasers (i.e., more than 1) is for auto-leveling. Any desired number of spinning lasers may be employed for this purpose. A Master station with this feature will warn the user of any shifting by the floor or construction site and automatically corrects for measurement deviations.

7. The Substation

The relationship between a Master station and a Prism is hereinafter defined as a "Master-to-substation" Relationship.

8. The Master-Substation System

Figure 10:
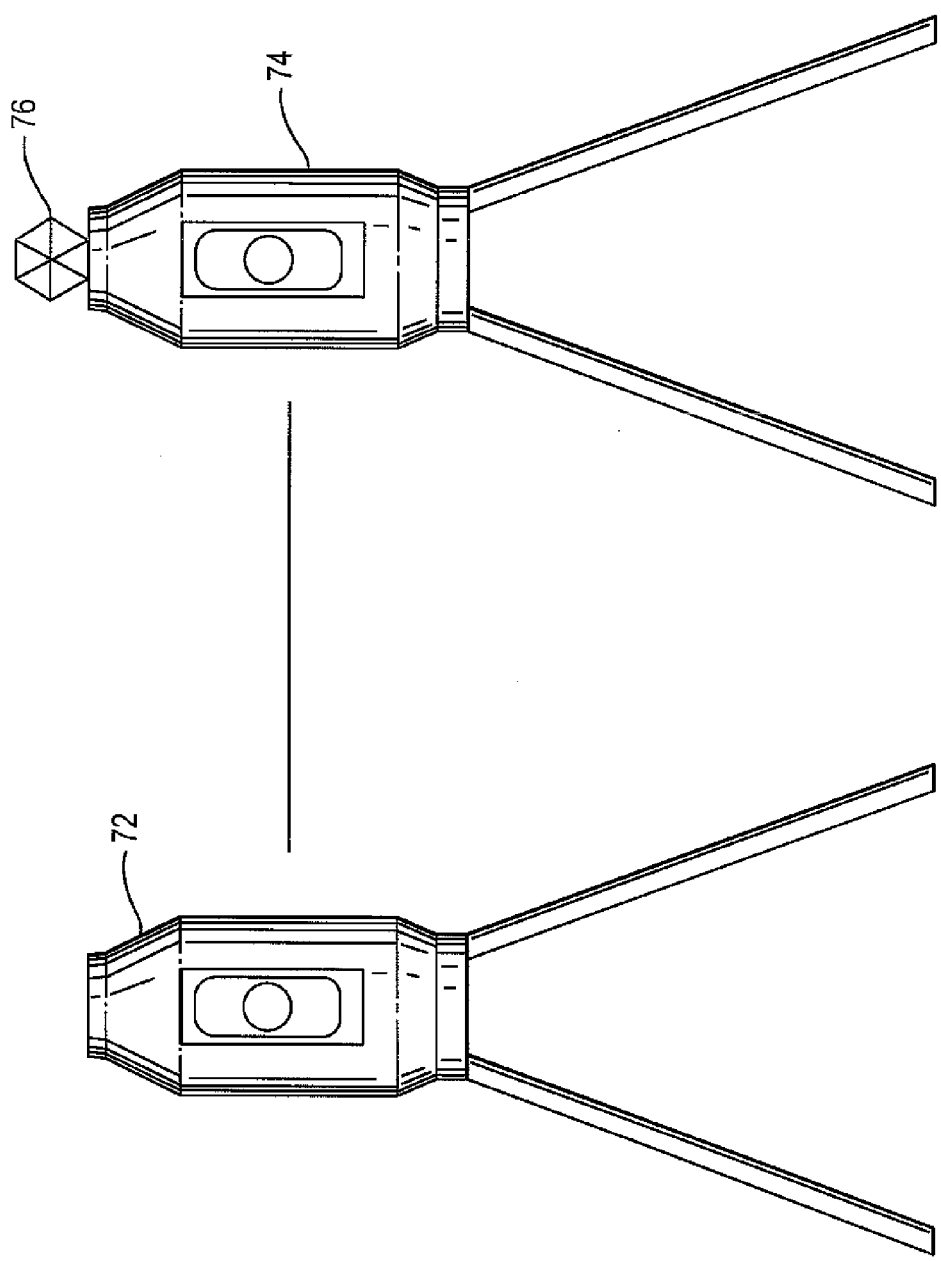
FIG. 10 shows a Master Station-Substation System.

The Master station-Substation System comprises a Master station and a Substation module with a Prism mounted (typically on top of the Substation). A Prism (see FIG. 20) is a multiple corner-cube reflective system substantially similar to those shown in FIGS. 13A, 13B and 20. The Prism is capable of reflecting an image (or beam) back along several lines-of-sight depending upon the number of corner-cubes incorporated into the Prism and their relative angles of mounting within the Prism. FIG. 10 provides an example of such a system. The Master station 72 sights the Substation's prism 76, measures the distance and angle between the two devices, and automatically triangulates the position of the Substation 74 in relation to the worksite, Worksite Drawings and the Master Station's position. A Substation is meant to be readily carried and moved around a worksite and is a solution for pinpointing coordinates not within line of sight of the Master station. The process of triangulating the position of a Substation is repeated each time it is moved on the worksite. The process of triangulation of the Substation position can be an automatic Master station function (i.e., performed without a direct command). Once the Master station has determined the position of the Substation, commands can be sent to the Substation to perform various work functions.

Example of Function:

A position is selected on the CAD display.

The selected position is beyond the line of sight of the Master Station.

The Master Station commands the Substation to target a visible laser onto the selected position or navigate a prism to that position.

Thus this system actively monitors the location of the Substation or actively monitoring the position of the Master station relative to coordinates provided to it by the Substation (for targets not in line-of-sight to the Master Station).

Figure 11:
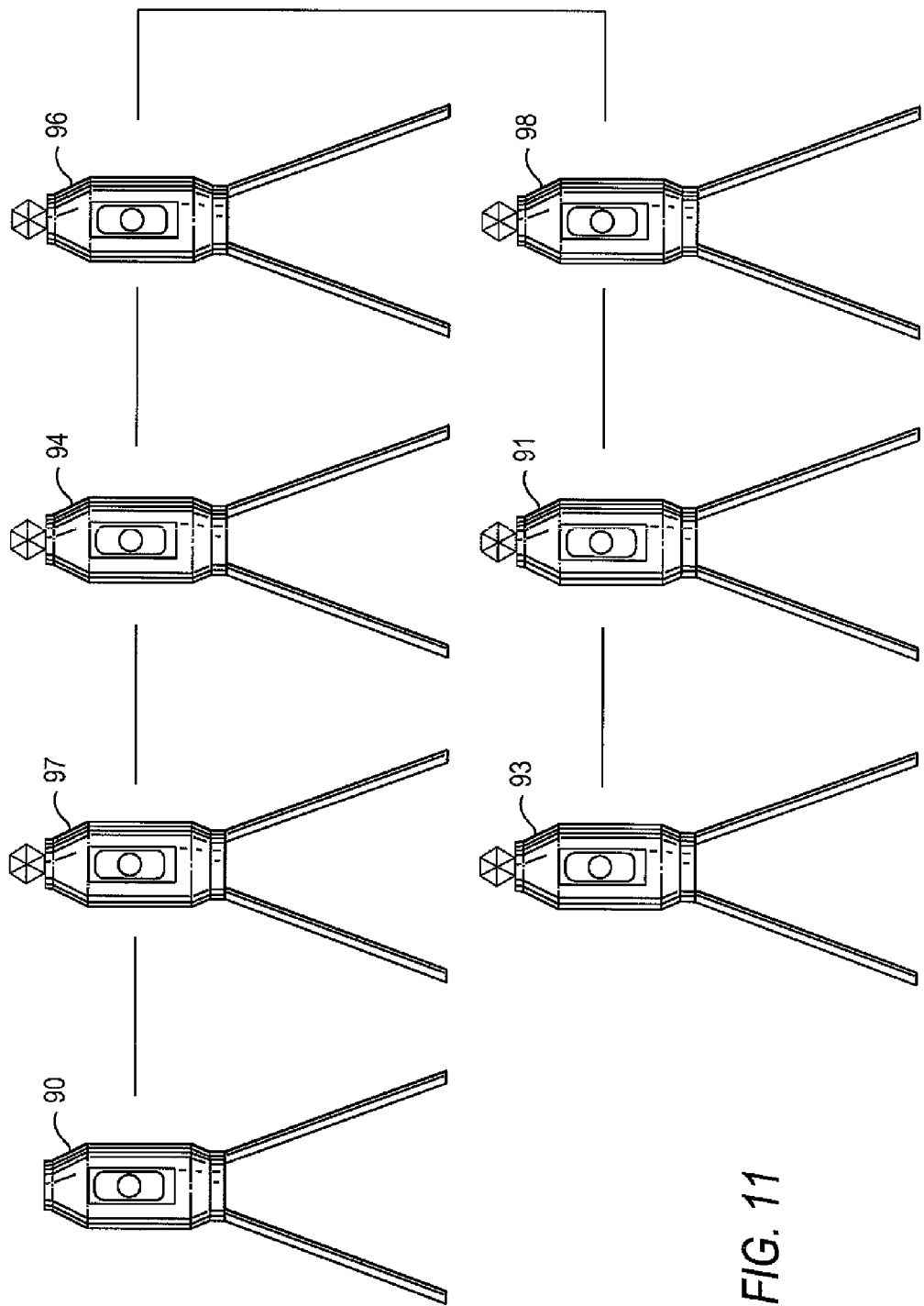
FIG. 11 shows a Master Station module interconnected with a plurality of daisy chained Substations.

Referring to FIG. 11, multiple Substations (97, 94, 96, 98, 91, 93) can be "daisy chained" or "star chained." Single or multiple Substations may be utilized independently with a single Master station 90 or many in concert with a Master station.

9. Transportable Sub-Station

Referring to FIG. 12, a Transportable Substation comprises a simplified motorized module 920 that is capable of measuring distance and angle, and of aiming a visible laser at a specified location. Mounted to this device is a telescoping pole 1200, atop which a Prism 1120 is mounted along with a method of wireless communication. The Transportable Substation is meant to be readily carried and moved about a worksite and is a solution for pinpointing locations not within the line-of-sight of a Master station. The Transportable Substation, once repositioned, is mechanized for self-leveling. The Transportable substation is mounted on tripod.

10. Transportable Tool Platform Slave Station

The Transportable Tool Platform Substation comprises a multi-axis computer controlled tool arm 1300 with two Prisms 1302, 1304 mounted at the end of the tool arm. This is shown in FIG. 13A in isometric view. The two Prisms affixed to the end of the tool arm are used to facilitate orientation of the tool and alignment of selected tooling. The Transportable Tool Platform Sub-Station is meant to be readily carried and moved around a worksite and is a solution for pinpointing locations not within line of sight of the Master Station. The Transportable Tool Platform Sub-Station, once repositioned, is mechanized for self leveling. A bar with two Prisms is used to determine the direction in which the bar is pointing.

FIG. 13B shows a similar tool in isometric view having three Prisms 1308, 1310, 1312 mounted on a triangular platform 1306. The three prisms should preferably not be collinear. They can form, for example, a triangle.

A key component of the Transportable Tool Platform Sub-Station is a Leveling Communications Laser System as previously described supra and comprises pulse modulated spinning lasers mounted atop the Substation enclosure. The device is meant to provide visible horizontal and vertical reference laser lines. This device is capable of reading barcode information printed on objects within its line of sight. Additionally, these lasers are pulse modulated, and are capable of transmitting data to a device that can receive the information transmitted.

Sensors are also in place, thus enabling reading or receiving of information sent from a pulse modulated transmitter. The Leveling Communications Laser communicates with other similarly equipped Master, Substation, Vehicular or Fixed Reference Stations. Lastly, the Leveling Communications Laser is mechanized for self leveling.

The Transportable Tool Platform Sub-Station's primary tool is a visible laser distance meter affixed at the end of the tool arm this device which is used to point to or measure the distance to selected locations.

11. Handheld Computer Having an Attached Prism

Figure 14A:
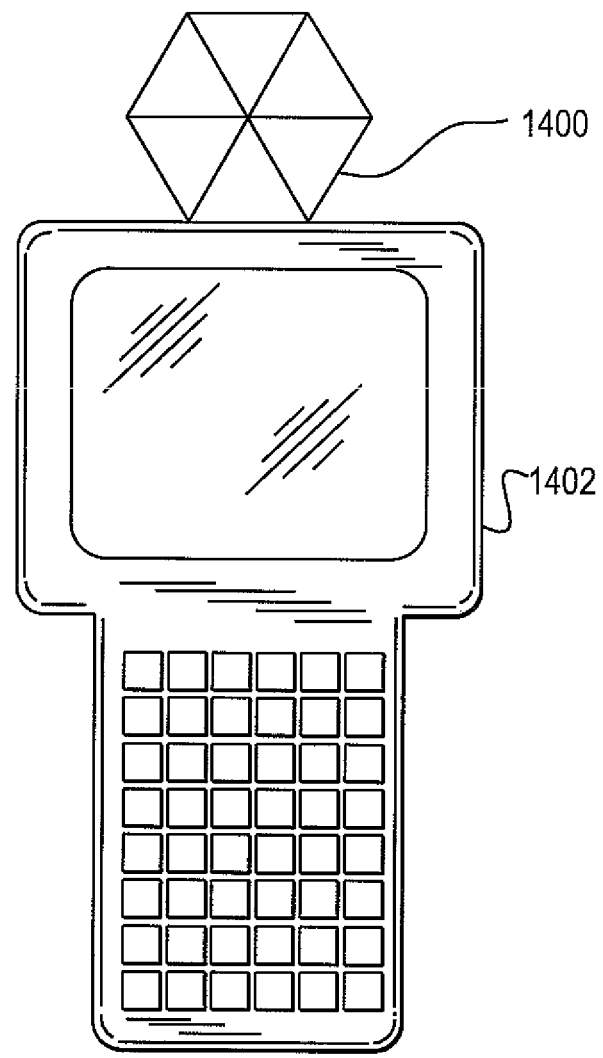
FIG. 14A shows a handheld computer station having a Prism mounted thereupon.
Figure 14C:
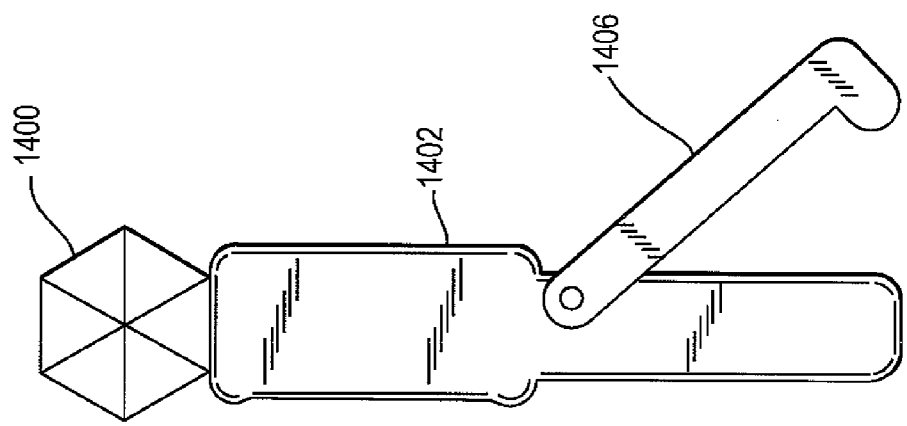
FIG. 14C is a side elevational view of the computer of FIG. 14A with a prism attached thereto.
Figure 14B:
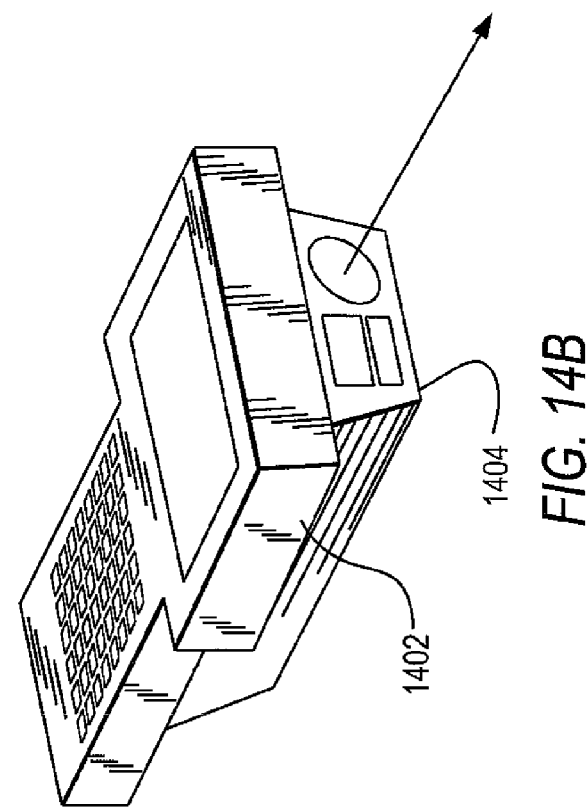
FIG. 14B is an isometric view of the computer of FIG. 14A with a laser distance measurement device built-in or attached.

FIG. 14A is a top plan schematic view of a handheld computer station 1402 having a Prism 1400 (e.g., 360° corner cube prism) mounted above the display. FIG. 14B shows an isometric view of the handheld computer 1402 with a laser distance measurement device 1404 built-in or attached. Mapping information appears on the computer screen. The computer will typically be held by a user. The function of the Prism is to serve as a location device. FIG. 14C is a side elevational view of the handheld device of FIG. 14A. In FIG. 14C the computer is made to stand up using a built-in support 1406; the view of FIG. 14A shows a front elevational view. The Master Station (or Substation) locates the Prism as discussed above. Once located, the entire system knows the location (in XYZ space) of the user holding the computer 1402. Also, the user knows his own location relative to the Master Station, Substations, and fixed reference points. Now, as the user moves through the site, the system is aware of his movements. The handheld computer may be used as a navigation tool in much the same way a GPS system is used in an automobile.

12. Vehicular Stations

Refer to FIGS. 15 through 18. In addition to the presence of a Master station module, a computer display, software and worksite drawings, the system of the present invention may additionally comprise a Vehicular Robot 1500 with at least one Prism 1502 mounted on it. This Vehicular Robot can have two Prisms mounted, or three or more non-collinear Prisms mounted.

The Vehicular Robot 1500 is either self powered, hardwired or plugged in. The Vehicular Robot's movement and activity can be controlled by the system software, or can be controlled manually via a control device such as a mouse, 3D mouse or spatial mouse, joystick, stylus, touchpad, touch keys, digitizer, gyro or inertial measurement unit control; wired or wirelessly. The Vehicular Robot 1500 can have an onboard control computer and software. The Vehicular Robot can have wheels, tracks, legs or be able to hover above the surface of the worksite and does not have to be physically carried by a human. The Vehicular Robot can be moved by a human. Several electronic compasses, inclinometers, accelerometers and an Inertial Measurement Unit are in place to aid the process of navigation and furnish orientation telemetry. The Vehicular Robot 1500 is able to communicate wirelessly to receive commands and send telemetry information. The Vehicular Robot is equipped with sensors to track and follow a laser line or to point to a specified location to perform work and/or to perform work along the way.

The Vehicular Robot 1500 is navigated about the worksite by a Master station and is a platform for a wide variety of tools and devices used to perform specified work functions. The Vehicular Robot is sighted and has its position triangulated by the Master station. The Master Station navigates the Vehicular Station directly from the Worksite Drawings.

Figure 15A:
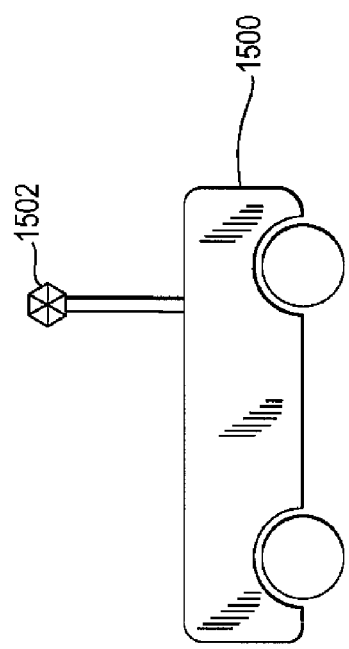
FIGS. 15A-D shows various transportable Substations.
Figure 15B:
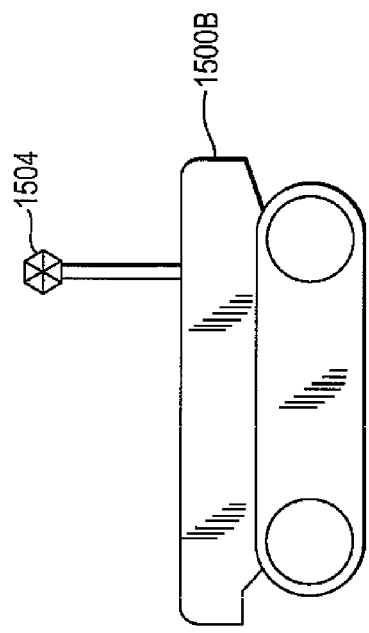
Figure 15C:
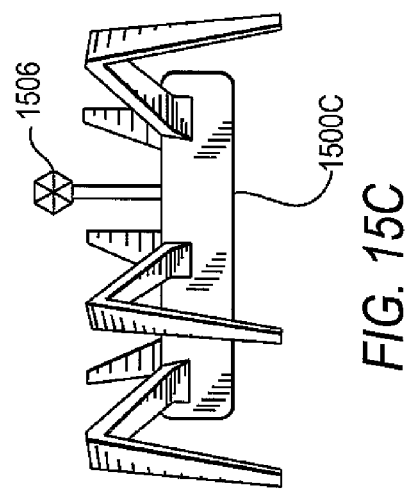
Figure 15D:
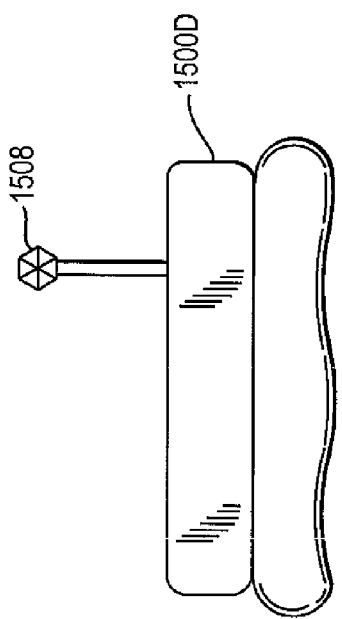

FIGS. 15A-D show four different types of Vehicular Stations. These are merely examples, and many other configurations are possible. FIG. 15A shows a Vehicular Station having three or four wheels. FIG. 15B shows a Vehicular Robot 1500B (with prism 1504) that uses tank-like movement. FIG. 15C shows a Vehicular Robot 1500C (with prism 1506) having insect or spider legs for movement. This type of Station would walk around a site to a specified location. FIG. 15D shows a hovering Vehicular Robot 1500D (with prism 1508) that moves over a surface much like a hydrofoil.

13. Vehicle Mounted Multi-Axis Computer Controlled Robot Arm Station

In addition to the presence of a Master station module, a Computer Display and worksite drawings, the Present Invention comprises Vehicular Robots having a Prism and multi-axis computer controlled robotic tool aim; (see FIGS. 35, 37 and 38). Particularly in FIG. 38, the various tools are shown:

robot arm with cutting tools 3802;
robot arm with printing or plotting tools 3804;
robot arm with plumb visible laser pointer 3806;
robot arm with CMM, laser scanner, or manual point reading tools 3808; and,
robot arm with drilling, engraving, or burning tools 3810.

Figure 16:
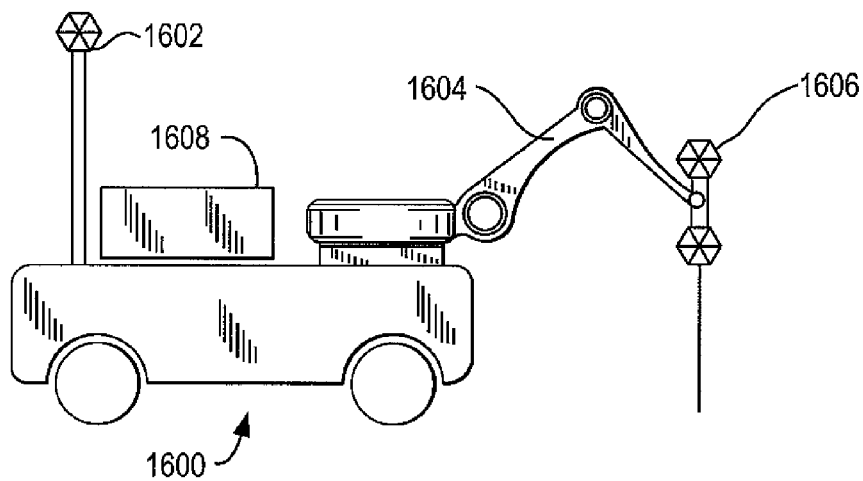
FIG. 16 shows a robotic Substation comprising a robotic arm and a tool.
Figure 17A:
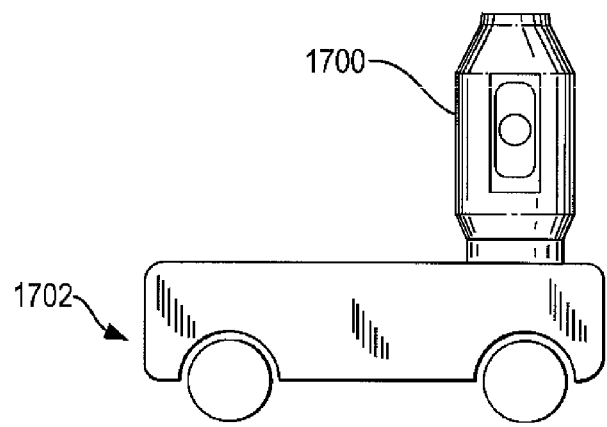
FIGS. 17A-B show a robotic Master Station module.
Figure 17B:
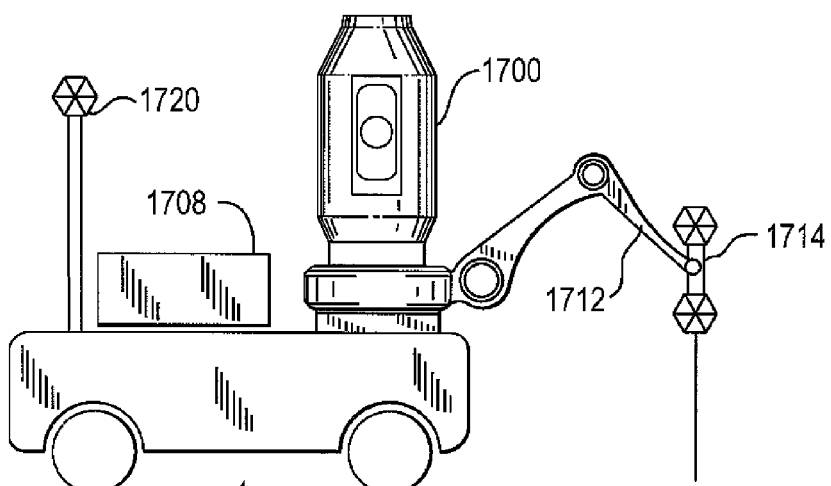

FIG. 16 of the system of the present invention shows the subject device 1600 comprising a locating Prism 1602 and further comprising a dual Prism device 1606 (shown in FIG. 16) affixed to the end of the robotic arm 1604. The device shown in the figure also comprises an Automatic Tool Box 1608 containing various tools (see FIGS. 35, 37, 38 and 46A-B) in which the robot arm can self-mount and dismount on command.

Master Station modules or assemblies depicted in FIGS. 15-18 are adapted to perform various tasks associated with on-site robotic fabrication 14. Vehicle Mounted Master Station Module Referring to FIG. 17A, a Master station 1700 module may be mounted upon a computer controlled movable electronic robot vehicle 1702. Now, the Master station module is not in a fixed position, but rather moves to known positions at the worksite. Referring to FIG. 17B, the Vehicle Mounted Master station assembly 1710 comprises a Computer Display (not shown), Software and Worksite Drawings stored in a container/tool box 1708 and additionally comprises a Vehicular Robot with a Master Station module 1700, a Prism 1720, and a Multi Axis Computer Controlled Tool Arm 1712 mounted on it equipped with a tool 1714 (e.g., double prism and laser pointer). The Vehicle Mounted Master station can be directed by the System Software via the Computer Display to perform specified functions or it can autonomously perform work functions such as, measurement and triangulation of position, navigation and communications.

The benefit of a vehicle mounted Master station is that it can be manually or remotely controlled or it can perform autonomous vehicle orientation and navigation in relation to the space in which it is placed and the worksite drawings. The vehicle mounted master station system utilizes the Master station module's ability to sight and track the movement of a Prism.

The Vehicle Mounted Master station assembly can via sighting, communication with, measurement and triangulation of the position of Fixed Reference Stations, Substations and or any other Master Stations or Vehicle Mounted Master Stations autonomously navigate around a worksite from a Worksite Drawing while in motion. This device can be directed to or can autonomously elect to move from its present location to a different location and once there can utilize a multi axis computer controlled tool arm to perform various work functions.

The multi axis computer controlled tool arm is capable of automatically changing work tooling to perform construction activities or operations as requested. The tools can be automatically interchanged directly from a multi tool holder or tool box (e.g., 1708) affixed to the Vehicular Station.

Figure 18:
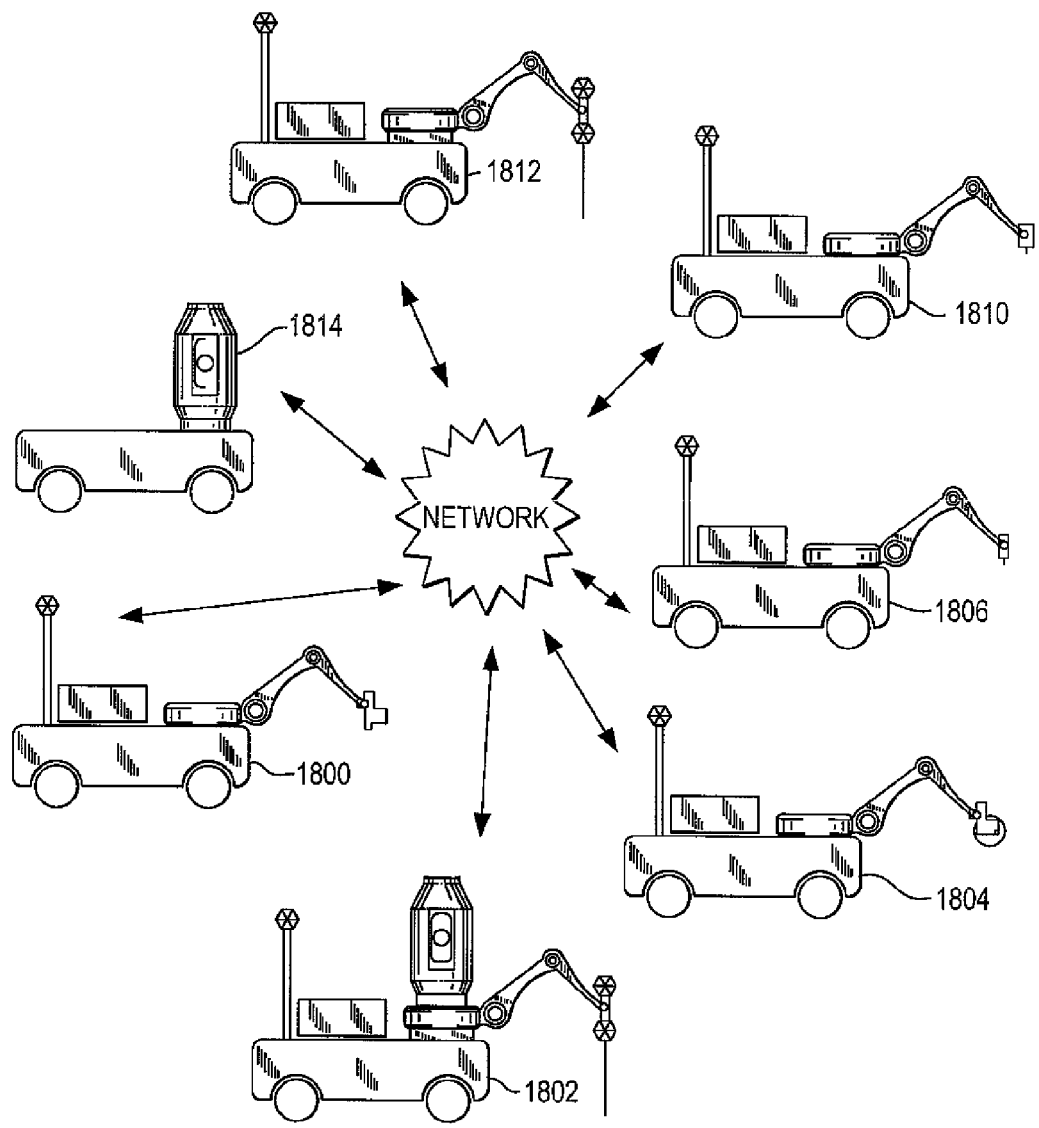
FIG. 18 shows various Master and Substations interconnected using a computer network.

FIG. 18 illustrates multiple devices working together with the use of a communication network. The various devices and robotic vehicles work together to perform work and navigate through a given worksite. Device 1814 may operate as a Master station with all the remaining devices (1800, 1802, 1804, 1806, 1808, 1810 and 1812) operating as substations that perform various construction tasks such as those described with respect to FIGS. 38A-38E.

15. Fixed Reference Station System

The fixed reference stations can be selected from among many devices that provide a readable fixed reference. The fixed reference stations may be passive devices. However, they can also be intelligent devices capable of transmitting information to receivers, or they can optically respond to specific messages.

They are fastened or planted in a concrete slab or fastened to a permanent location.

They are mounted in monuments in known locations which are addressable and identifiable.

Monuments allow for automatic and autonomous device orientation in relation to the space in which these devices have been placed or to the CAD drawings.

The methods whereby a master station module or assembly can identify reference stations (i.e., a type of substation) are inter alia, electromagnetic (e.g., light, colored light, infra-red, RFID, X-rays, bar code, etc.), ultrasound, digital compass, cybernetics information theory and coded information.

The purpose for a fixed reference substation system is to provide fixed reference points for automatic, autonomous device orientation and navigation in relation to the space in which they are placed or according to CAD or digitized drawings. These devices do this by continuously searching for, measuring and re-measuring the distance to any number of other fixed reference substations located in the same space. The ultimate goal is to achieve greater measurement accuracy and to navigate autonomously or through a remote controlled vehicle, a humanoid robot, an android, or other robots or robotic vehicles, tools or systems indoors or outdoors from a CAD drawing.

The Fixed Reference Station System comprises at least one Master station and at least 2 "Monuments." The simplest form of a Monument (another type of substation) essentially consists of a device that is a passive reflector or prism permanently or temporarily mounted within a worksite. The purpose of a Monument is to provide an ideal reference from which a Master Station module or assembly, Substation or other device can measure and triangulate its position from anywhere within line of sight. A Monument provides an opportunity for automatic or autonomous Master station orientation within the space in which it is placed and with reference to the CAD drawings or digitized drawings.

A Master station module or assembly is placed within a worksite; two monuments are mounted within the space. The positions of these monuments are known and also identified within the CAD or digitized drawings. The Master Station sights the Monuments, and is able, based on the angle and distance measurement to triangulate its own position relative to the Monuments and the worksite drawings. The process of self triangulation of position can be an automatic Master station function; i.e., performed without a direct command when placed within a site that has Fixed Reference Stations. A Fixed Reference Station System can enable autonomous navigation of vehicular, humanoid, android or other mobile robotic vehicles, tools or systems indoors or out doors from a drawing. Master station, substation or Vehicular Stations can also function as Monuments. Monuments can be addressable each having a unique identification.

Figure 19:
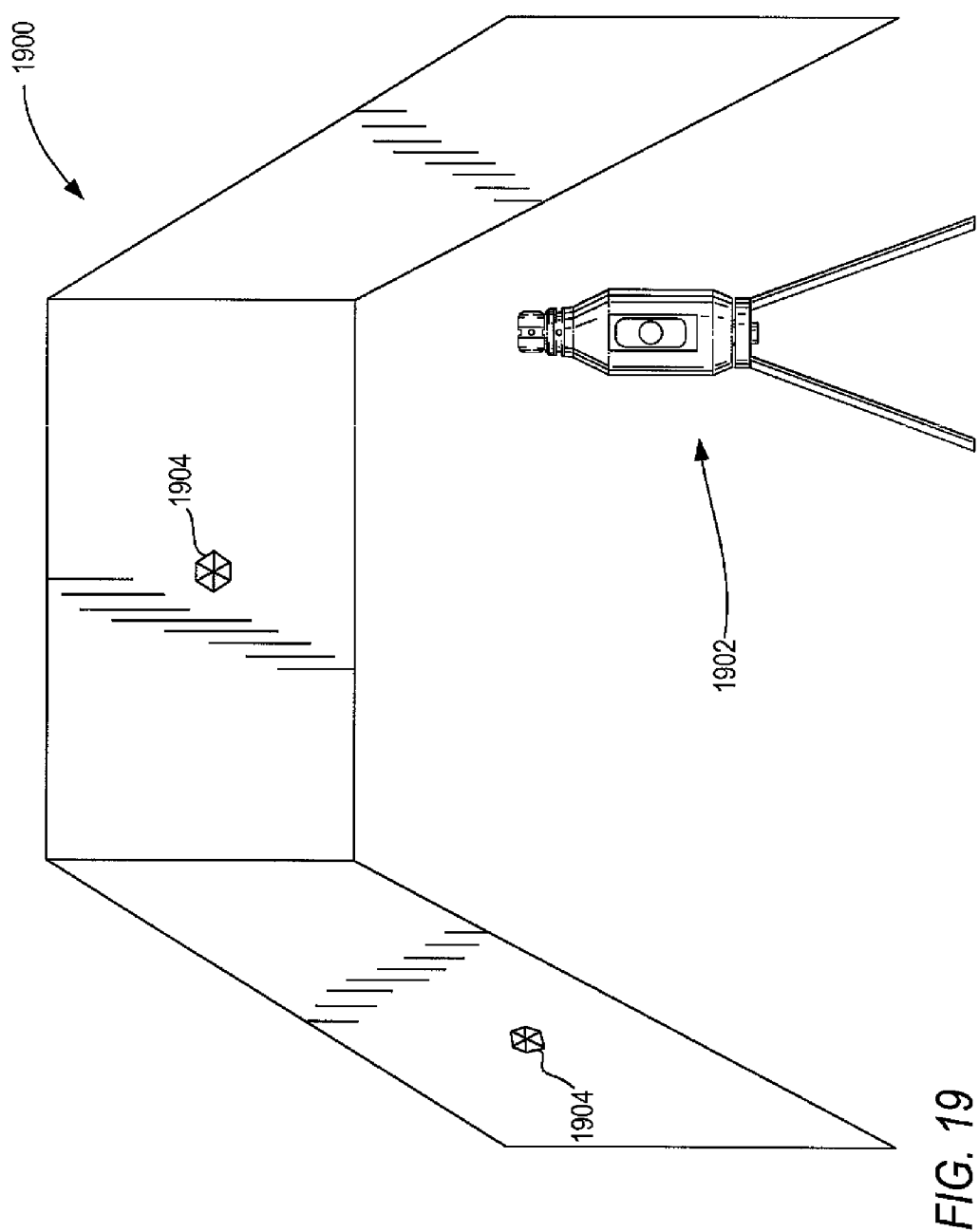
FIG. 19 shows a Master Station module (or Substation) inside an enclosure capable of reading Fixed Reference Stations.

FIG. 19 illustrates a Master station 1902 contained within an enclosure 1900 having Fixed Reference Stations (Monuments) 1904. This is the minimum configuration of the Fixed Reference Station System.

Figure 20:
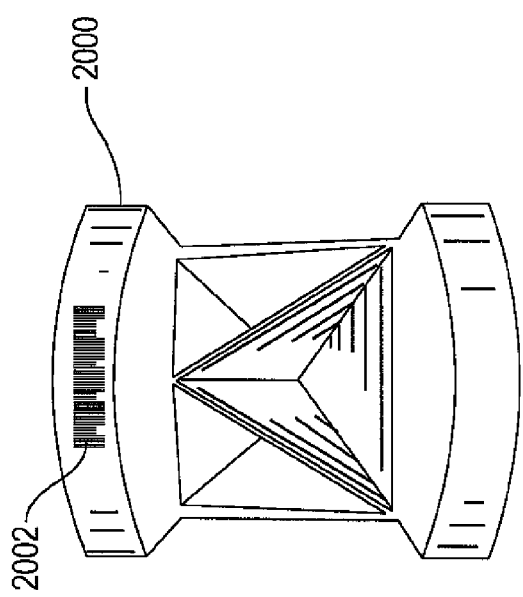
FIG. 20 shows a 360 degree corner cube Prism having a bar code printed thereupon.

Monuments may be passive or intelligent. Passive Monuments may comprise a Prism or Reflector, a printed bar code or graphic, cross-hair targets or even nails. An example of a Passive Monument is shown in FIG. 20 as a Prism 2000 having an imprinted bar code 2002 which can be read by a Master station through RFID (Radio Frequency Identification) technology for example.

Figure 21A:
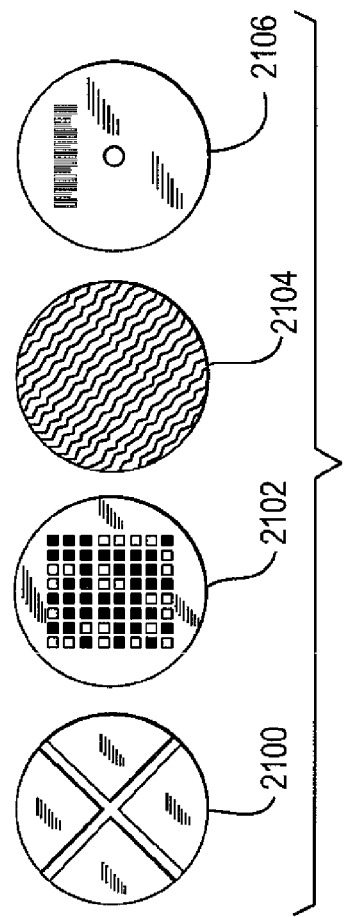
FIGS. 21A-C show various Intelligent Monuments.
Figure 21C:
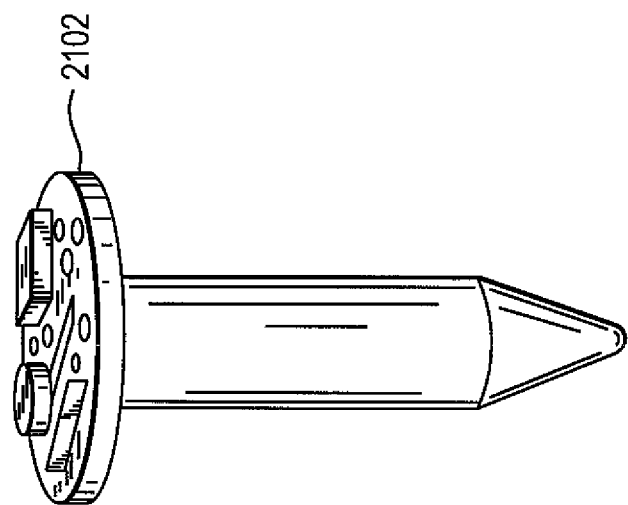
Figure 21B:
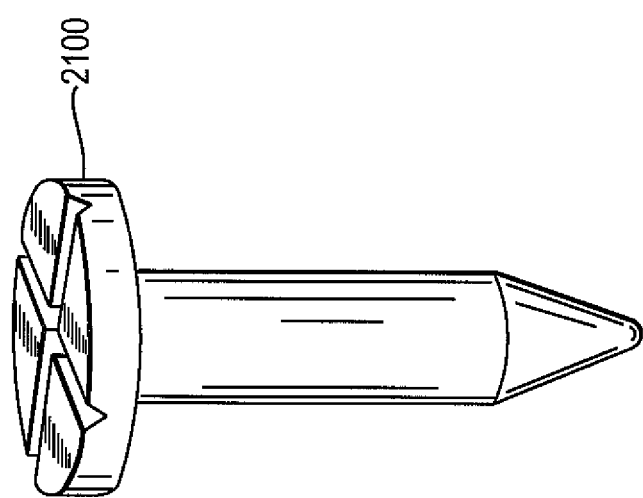

Referring to FIGS. 21A-C, Intelligent Monuments have electronics associated with them. They may also have the visual indicia possessed by the Passive Monuments whose top views are shown in FIG. 21A. Monuments in FIG. 21A may represent passive substations having particular patterns (crosshairs in 2100, dot pattern in 2101, wave pattern in 2104 and bar code pattern in 2106) that can be used in an RFID system, for example, to reflect (or passively convey) information to a Master station. The electronics may be embedded within the Monument as shown in FIG. 21B and FIG. 21C. Top perspective views of Monuments 2100 and 2102 are shown in FIGS. 21B and 21C respectively.

Acting as Intelligent Monuments that know their position in relation to other similar devices or via communication with a Master station or substation (Vehicular or non-Vehicular) these devices can network with one another, receive and transmit information or redirect data, light, and ultra sonic signals. Intelligent Monuments typically comprise a variety of electronic sensors, transmitters and receivers, and have reflectors or visual graphics in place to facilitate distance measure and communication. Some of the intended modes are Radio Frequency, Sonic Communication and Distance Measure, Steerable Laser or Passive Laser Communications. These devices are able to send, receive, and redirect any electromagnetic signal, data, light, or ultrasonic signals.

16. Colorized Multi-Prism Recognition System

Figure 22B:
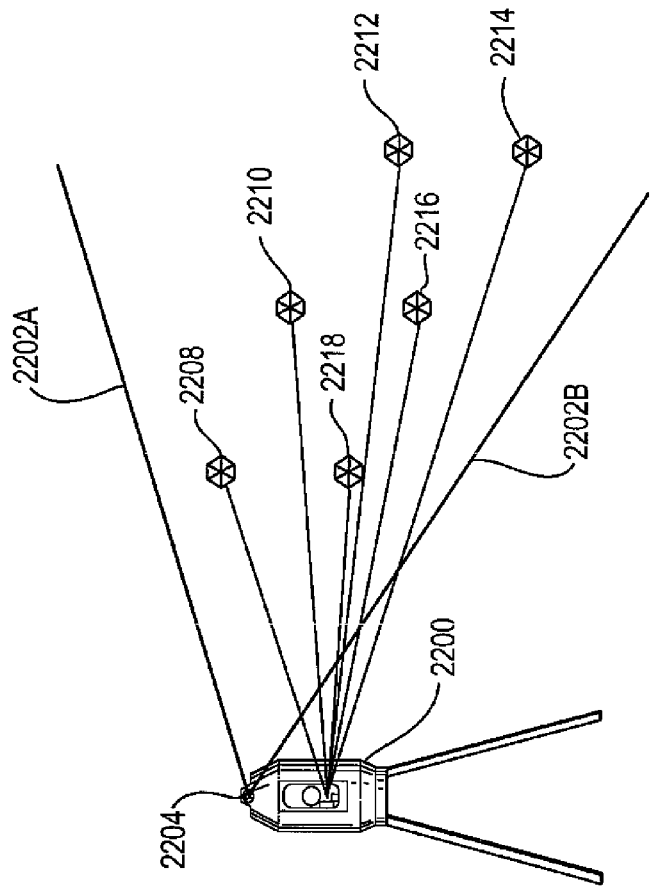
FIGS. 22A-B illustrate detection of colorized Prisms using a Master station module.
Figure 22A:
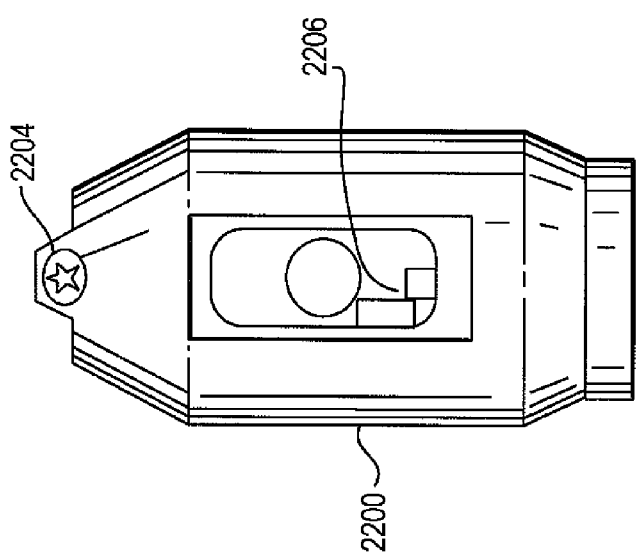

Referring to FIGS. 22A-B, a multiple prisms assembly and identification system, where each prism can function as an individual monument, is shown. This is done using infra red light as well as color recognition. In FIG. 22B, there are multiple prisms where each functions as an individual monument. Each prism returns light of a different color. In FIG. 22A mounted on the top of the Master station 2200 is an infrared strobe 2204. A color CCD (Charge Coupled Device) chip 2206 is installed in the receiver of the Master station. In FIG. 22B, the infra red strobe flashes, and the infra red light bounces back from the various colored prisms 2208, 2210, 2212, 2214, 2216 and 2218. The beam 2202A and 2202B is fanned out toward the multiple prisms so that there can be simultaneous identification of the plurality of prisms in the field of view.

The Colorized Prism Recognition System is capable of delivering rapid Multi-Prism identification and individual prism recognition. When compared to an existing Master station—Prism Relationship the Colorized Multi-Prism Recognition System is comprised of three distinct functional features:

Each individual prism is constructed out of a different colored dichroic glass.

The black and white CCD camera chip presently in place in Master station modules that utilize a spread beam infrared laser as a method of rapidly searching for a prism within the Master station modules field of view with a color CCD chip 2206. Replacement of the black and white camera chip with a color CCD chip will enable the Master station module to differentiate between colors, thus making each prism individually identifiable or addressable. Presently an infrared laser is utilized in a fanning pass to search for a Prism within the Master Station module's field of view; this method can only identify one prism at a time.

An infrared strobe 2204 or flash can be utilized to serve as a means of identifying the quantity and position of multiple prisms simultaneously within the Master station's field of view.

Referring to FIG. 22B, the six Prisms are within the field of view of the Master Station. The Master station emits an infrared strobe light. Instantly, the position of each and every Prism is known based upon the unique color of the Prism.

17. Spinning Master Station-Spinning Substation

Figure 23A:
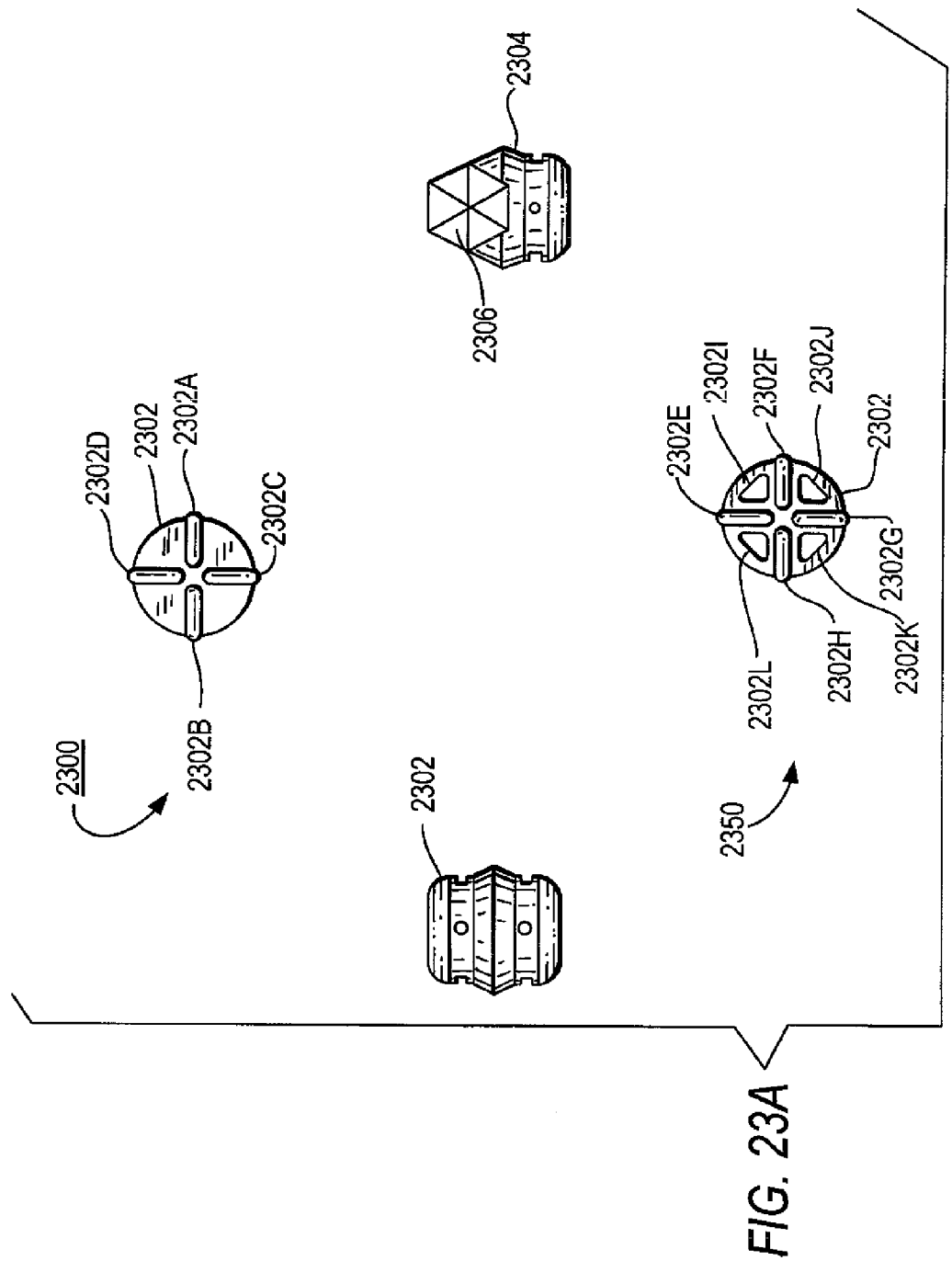
FIGS. 23A-B illustrate the interaction of a Master station module and Substations using spinning lasers.
Figure 23B:
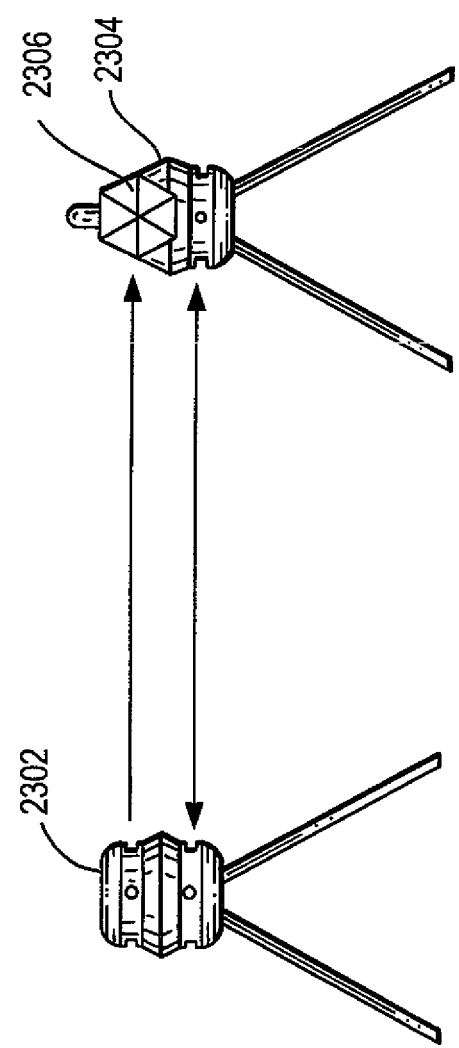

FIGS. 23A-B illustrate the use of the combined Master Station 2302 with spinning lasers and Substation 2304 with spinning lasers. The advantages and functionality of this combination are described therein. This system is intended for use independent of or in place of a Master station module as a means of measuring distance and navigation about a worksite. The Spinning Master Station can deliver XYZ coordinate measurement and position triangulation data to wireless computer devices for the purpose of navigation and measurement on a worksite from a CAD drawing or digitized drawing.

Referring to FIG. 23A, the Spinning Master Station 2302 is a reader and measurement device comprising two Distance Measuring Lasers 2302A, 2302B and two Prism Sighting lasers 2302C, 2302D (see top view 2300) all mounted within the upper section of the device enclosure. This element of the device is capable of reading barcode information printed on objects within its line of sight. Mounted within the bottom section of the device is an arrangement of four pulse modulated laser transmitters 2302E, 2302F, 2302G, 2302H and four laser data receiver sensors 23021, 2302J, 2302K, 2302L (see bottom view 2350). These lasers are capable of transmitting data to a device that can receive the information transmitted. The sensors enable reading or receiving information sent from a pulse modulated transmitter. The Spinning Master Station 2302 can communicate with other similarly equipped Master stations or substations or fixed references. The Spinning Master Station mechanism can be adapted for self leveling.

The Spinning Substation 2304 has a 360 degree corner cube prism 2306 mounted in the upper section of the device enclosure. Mounted within the bottom section (not shown) of the device is an arrangement of four pulse modulated laser transmitters and four laser data receiver sensors. The mechanism of the Spinning Substation can be adapted for self leveling.

The Spinning Master Station 2302 and the Spinning Substation 2304 communicate with one another via their pulse modulated lasers and receiver sensors. They exchange identification, telemetry and commands.

FIG. 23A illustrates the structure of a continuously spinning Master station with a prism transmitter and receiver array. This system replaces a robotic Master station module. By adapting presently available spinning laser levels, the device can deliver X, Y, Z coordinate measurements and position triangulation to wireless computer devices for navigation and measurement on a construction site or other from a CAD drawing. The reader, measurer comprises two prisms sighting laser beams 2302A, 2302B, two distance measuring laser beams on the top array 2302C, 2302D. The reader, writer comprises four data transmission lasers, 2302E, 2302F, 2302G, 230214, four laser data receiving sensors 23021, 2302J, 2302K, 2302L on the bottom section of each device. This station has the following features:
a. self-leveling visible lasers;
b. able to send data via a laser beam;
c. able to receive data via a laser beam;
d. able to measure distance to multiple prisms;
e. able to differentiate between prisms based on return signal; and,
f. able to transmit information wirelessly.

FIG. 23B shows the basic function of the spinning Master Station.

Given: Height of each device is established during setup, and thus is known:
a. Master Station 2302 sights prism 2306;
b. Master Station 2302 measures distance to prism 2306;
c. Master Station 2302 requests unit ID from substation 2304;
d. substation 2304 responds with unit ID; and,
e. Master station 2302 delivers X, Y, Z coordinates of the substation 2304 to the substation.

18. Photographic Environmental Modeler

Figure 24A:
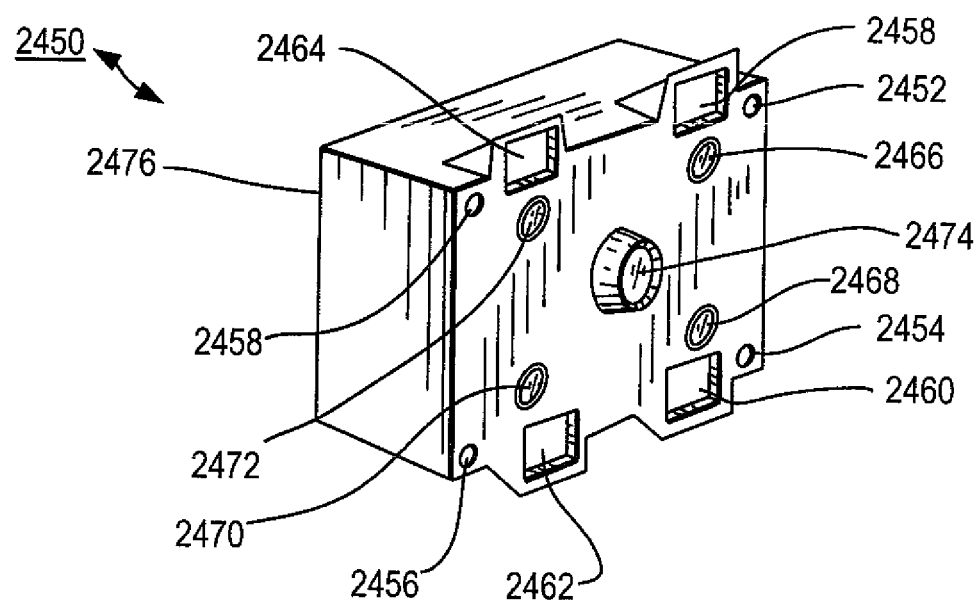
FIGS. 24A-C show the Photographic Environmental Modeler.
Figure 24B:
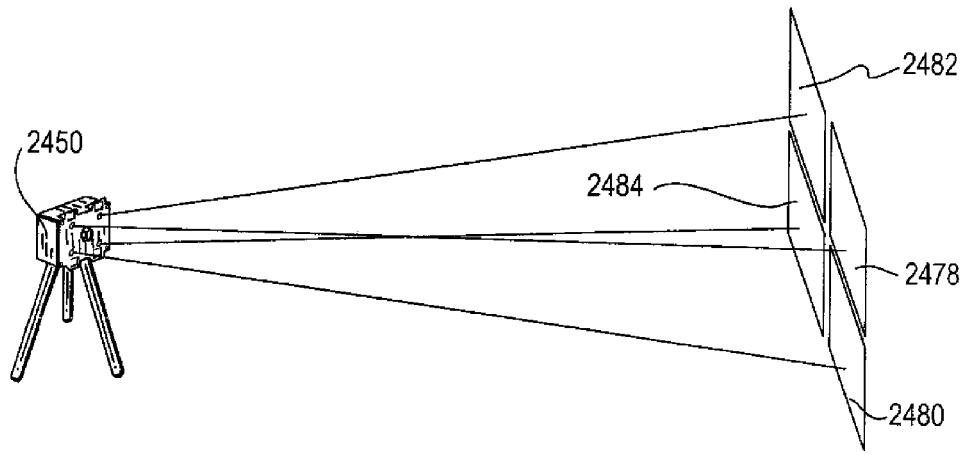
Figure 24C:
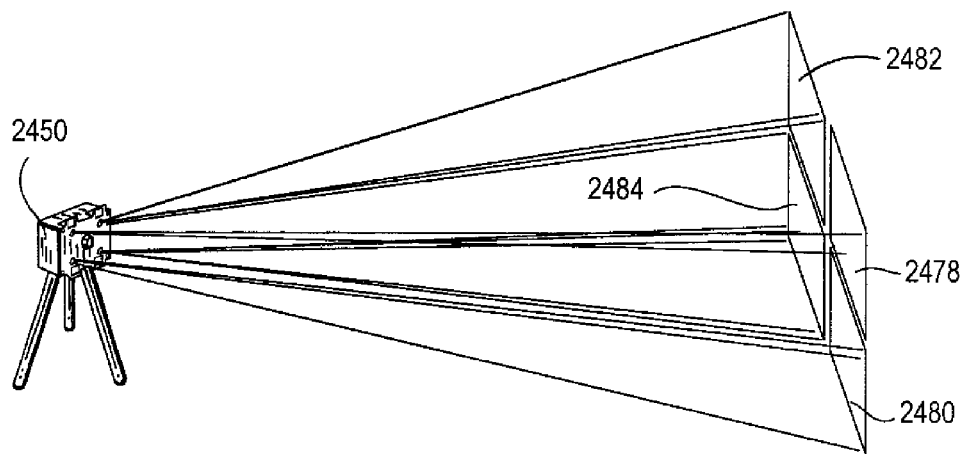

Referring to FIGS. 24A-C, the Photographic Environment Modeler 2450 comprises four distance measuring lasers 2452, 2454, 2456, 2458, four digital camera chips 2460, 2462, 2464, 2466, four strobes 2466, 2468, 2470, 2472, and a center eyepiece 2474 all mounted within the same housing 2476. FIG. 24A is an isometric view of the four-lens camera used for this device. Each lens exposes all four photographs simultaneously, and delivers a file made up of four separate images 2478, 2480, 2482, 2484 (see FIGS. 24B and 24C) each associated with four distance measurements (See FIG. 24B). The file contains telemetry data from the four lasers along with the four images (e.g., in JPEG, TIFF, or other convenient format). The purpose of this system is too quickly generate a three-dimensional model of an interior space with accurate measurement data and associated images. There presently exists commercially available software in which one may take two or more photographs, and by identifying three or more common reference points, the computer will optically merge or stitch the photographs together while correcting for optical distortion. This type of software is normally used to create panoramic images from multiple images. There are also presently available procedures for use in 3-D graphic production where marker dots are placed on an item to be modeled. These procedures facilitate construction of three-dimensional models.

The Present Invention utilizes four known "dots" having a known distance from the device. These appear on all photographs taken, and by combining these two software methods of image processing, a three-dimensional model of the space may be generated.

19. Beacon Drone Triangulation System

Figure 25A:
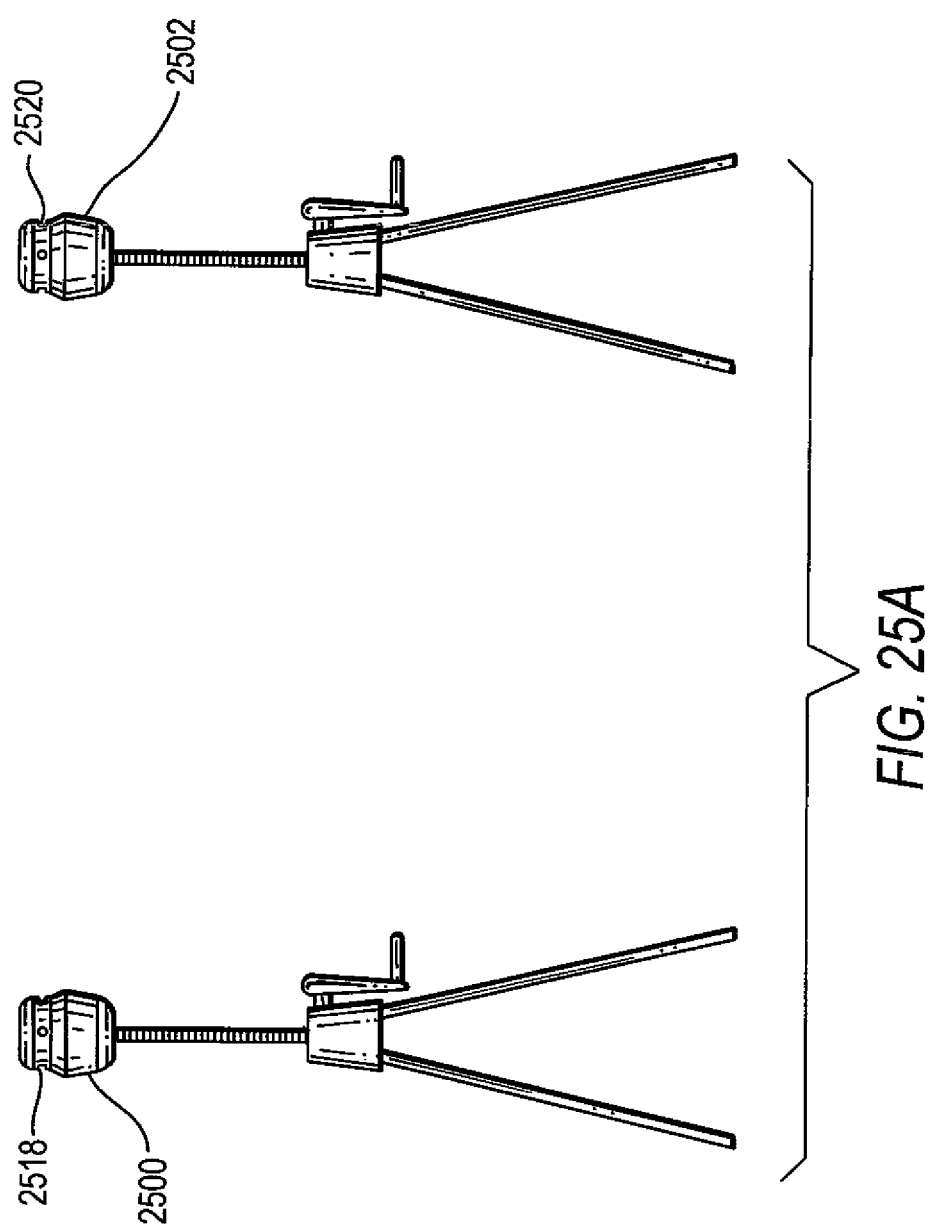
FIGS. 25A-B show Beacon Drones and their interaction with a Receiver Pole.
Figure 25B:
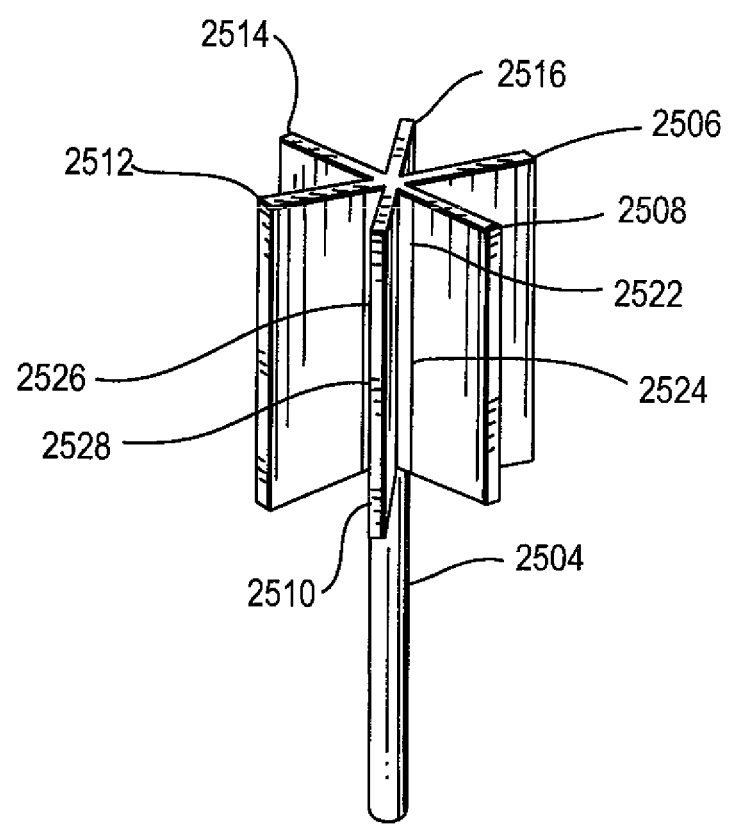
Figure 26A:
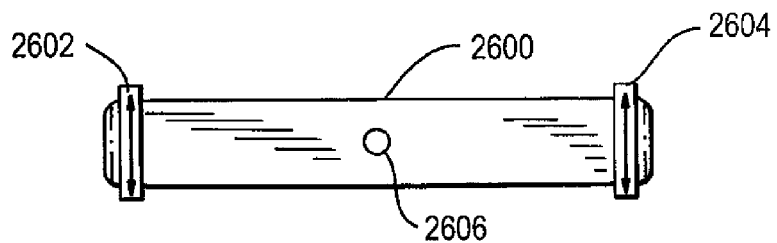
FIGS. 26A-D show the Angular Momentum Measurement Device with no moving parts.
Figure 26B:
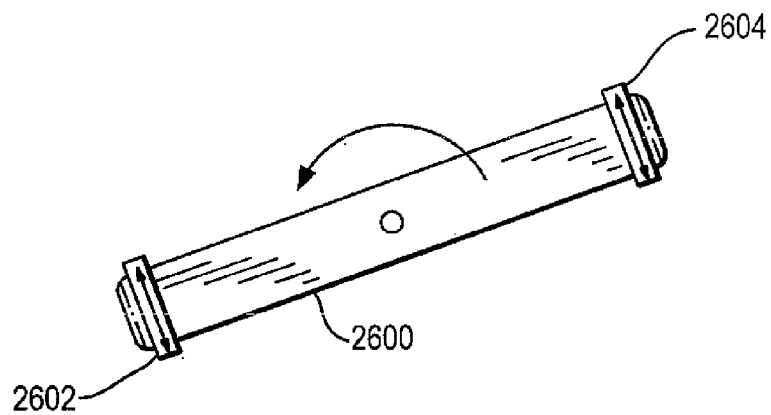
Figure 26C:
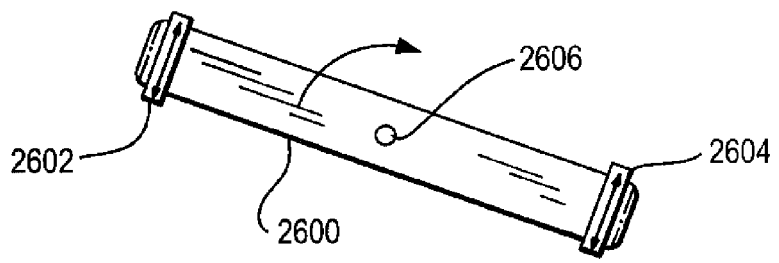
Figure 26D:
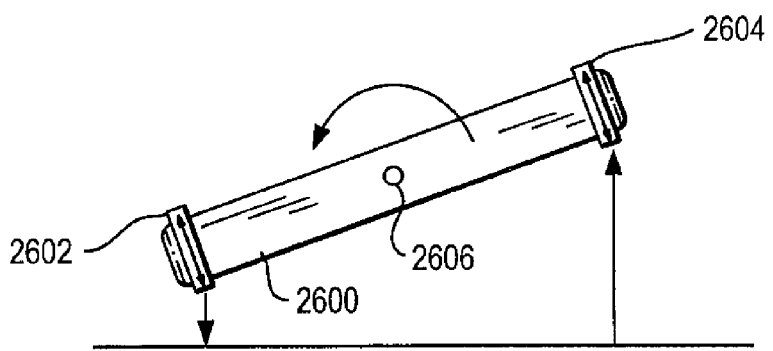

Refer to FIGS. 25A-B. The Beacon Drone Triangulation System comprises three Beacon Drone Stations and at least one position sensing Receiver Pole 2504 (see FIG. 25B).

Note, only two Beacon Drone stations are shown in FIG. 25A. A Beacon Drone Station (e.g., 2500, 2502) comprises a pulse modulated horizontal spinning visible self leveling laser (e.g., 2518, 2520) that is assigned a unique electronic identification. This device transmits laser angle data and the device identification data within its laser beam at every incremental degree at which it is assigned to transmit. Each Beacon Drone Station is mounted upon a telescoping tripod that can be adjusted vertically. FIG. 25A shows two Beacon Drone Stations communicating with each other.

A Receiver Pole (see FIG. 25B) is a device with a plurality of photo sensors (e.g., 2522, 2524, 2526, 2528) positioned around the pole 2504 separated by mechanical shading louvers 2506, 2508, 2510, 2512, 2514, 2516. These sensors receive light on the same plane that the Beacon Drone Stations transmit their angle and identification data. FIG. 25B is an isometric view of the sensor end of a Receiver Pole.

This device is also comprised of a Navigation Computer (not shown) that receives the telemetry from each of the sensor zones and uses this data to triangulate position. The Navigation Computer can be attached to the Receiver Pole or can be independent of the Receiver pole. The Receiver Pole can have limited Navigation Computer and button controls built-in or on-board independent of a handheld Navigation Computer. To achieve triangulation the user needs to capture telemetry from at least two Beacon Drones. To defeat any line-of-sight issue, at least two Beacon Drones must be visible from the user's location. The following procedure can be followed for achieving triangulation:

20. Setup Procedure
    Place the Drones within the worksite.
    Turn the first Drone on, and elevate to an elevation of least obstruction.
    Set the next beacon Drone up in a similar manner at a new location. Affix at the same elevation as the first (Either by visual mechanical mark or via a positioning sensor). Alignment is required.
    Setup additional Beacon Drones following the procedure of previous step.
    A total of at least two Beacon Drones are required for operation.

21. Calibration of Receiver Pole System
    Two points of a known distance are required for calibration of the Beacon Drones relative to themselves.
    Two worksite established points shown in the associated drawings for the site are required to orient and map the plurality of planar Beacon Drones to the worksite drawings.

22. Direction Orientation
    In order to navigate about the worksite, one would need to plot the targets and the route the user wants to take prior to using the Receiver Pole. That information is downloaded to the Receiver Pole and stored within the Receiver Pole. The Receiver Pole further comprises a measurement command button (not shown) to initiate measurement by the Drone Station and a reset button (not shown) to be pressed when the user is ready to travel to the next location.

23. Use of the Triangulation System Using Target Points
    Select desired location(s) within the worksite drawing.
    If the Navigational Computer is independent of the Receiver Pole, download the route to the Pole.
    Move the Receiving Pole within the worksite and press the measurement command button to acquire the present location of the Pole.
    Once the user has successfully reached and marked the first target, press the reset button to initiate transit to the next target 24. Angular Momentum Measurement Device with No Moving Parts
    Referring to FIGS. 26A-D, a system is shown for measuring distance and direction traveled with no moving parts. The ultimate purpose of this device is to measure distance traveled and rate traveled and to determine position. Using accelerometers 2602, 2604 (well known devices used to measure the velocity of an object), the accelerometer with the greatest acceleration in any given direction indicates the direction of travel and the rate of travel. Two variable capacitance accelerometers 2602, 2604 are placed at each end of a structure 2600, with a central pivot point 2606. FIGS. 26A-D demonstrate the use of this system.

The device 2600 is a distance measurement and position triangulation apparatus that functions independently of other line-of-site solutions. The electronics that constitute this technology can be installed in or fastened to any handheld computer, PC, mobile phone or communications system, any existing navigation system or devices, and any known vehicle type land, sea or air.

The two accelerometers must be parallel to each another and be attached to the structure 2600 (e.g., bar, stick) at a known distance. Accelerometers can only read forward and backward motion, and they only function in a single plane. By affixing two such accelerometers on a structure and orienting them in parallel tangent to the structure as if the structure were the diameter of a circle, if the apparatus is moved forward in the plane in which the two accelerometers are capable of measurement, one may compare the acceleration differential of each and extrapolate part of the rotational exchange. In order to measure other planes, a plurality of sticks each with two accelerometers mounted thereon are necessary. A collection of paired accelerometer units each oriented in a different plane (axis) comprise an accelerometer cluster capable of delivering X, Y, and Z rotational and linear acceleration measurements.

Figure 27A:
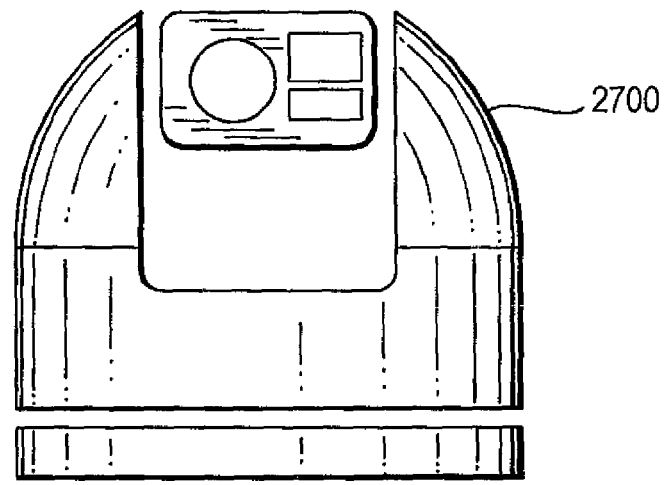
FIGS. 27A-B show a handheld meter pan and tilt gantry for a laser or sonic distance meter.
Figure 27B:
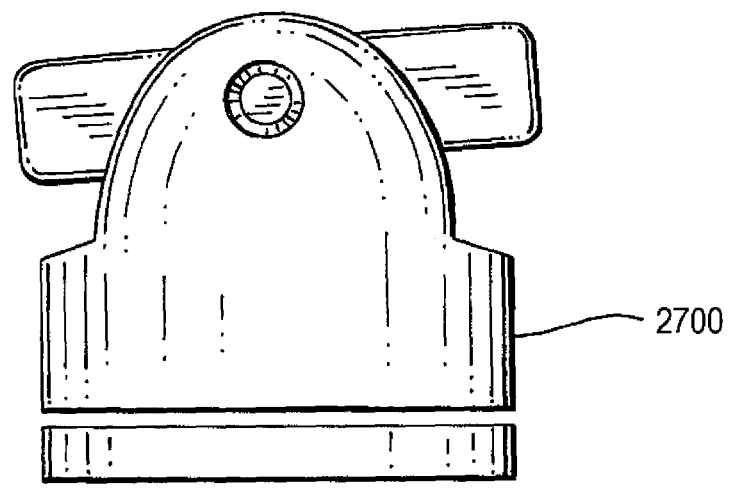

25. Handheld Meter Pan and Tilt Gantry Laser or Sonic Distance Meter
    FIG. 27A represents a front elevational view of the device 2700 while FIG. 27B represents a left side elevational view of the device. This is a motorized and remotely controlled pan and tilt mount for an electronic distance measurement device. Movement of the gantry can be controlled by System Software or by a computer's joystick, mouse, touchpad, keys, stylus, digitizer, gyroscope, or inertial measurement unit input. The camera mount shown is a motorized and remotely controlled pan and tilt mount. It can also function as a non-motorized manual jig. It affords the ability to precisely read distance, barcodes, or graphics, and to precisely point to a specified location. Device 2700 can be a Master station or a substation.

Figure 28A:
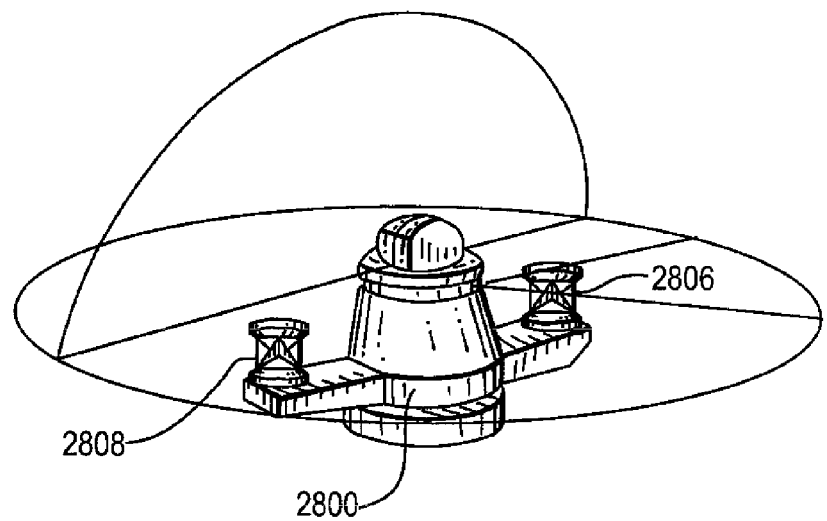
FIGS. 28A-B show an Auto-Leveling Spinning Laser.
Figure 28B:
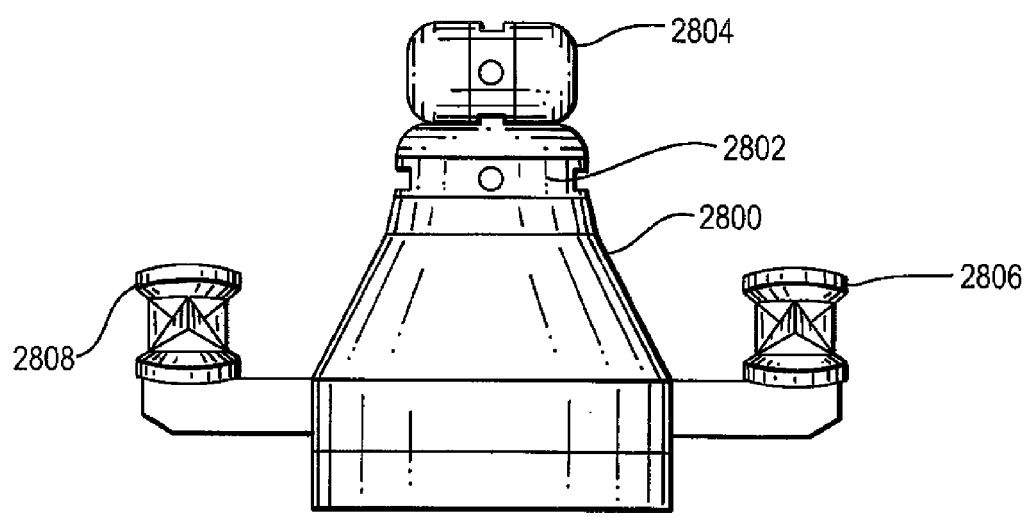

26. Auto-Leveling Spinning Laser
    FIG. 28A is an isometric view of the device while FIG. 28B is a front elevational view of the device. Auto-leveling is based upon Fixed Reference Stations. As the level 2800 spins, it reads the Fixed Reference Stations, and the Master station is auto-leveled relative to the Fixed Reference Stations. The device 2800 shown in FIG. 28B can be a Master Station with two corner cube prisms (see FIG. 20) 2806, 2808, a vertically rotating laser 2804 and horizontally rotating laser 2802.

Figure 29:
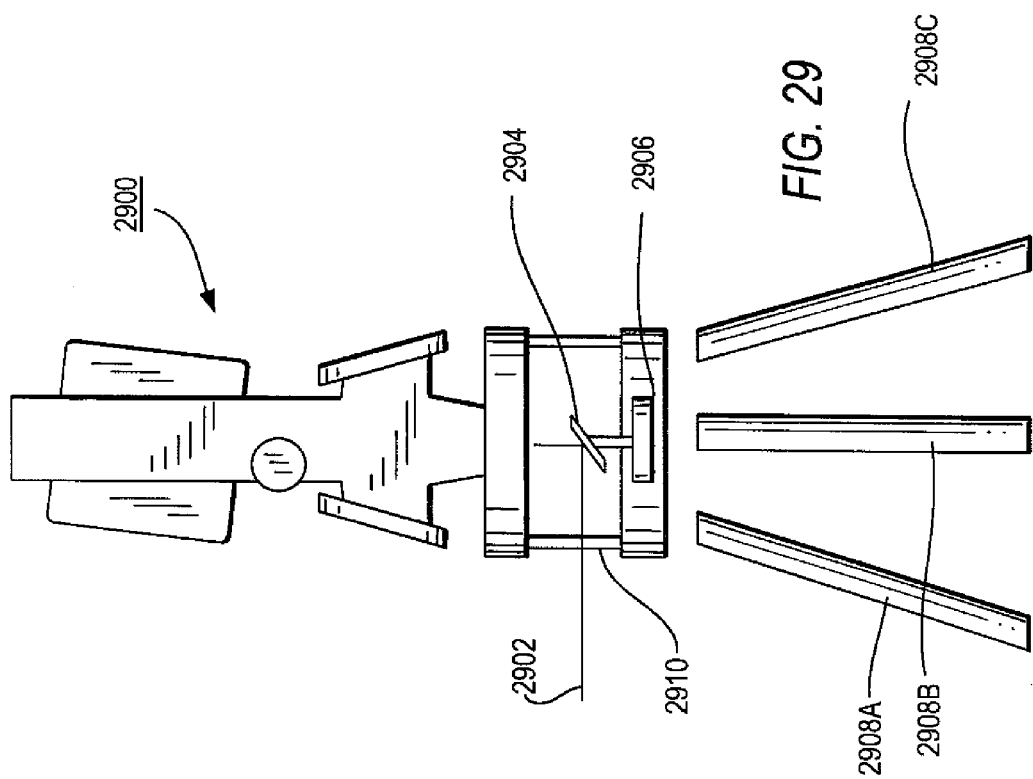
FIG. 29 shows a Self-Leveling Spinning Laser Tracker.

27. Self-Leveling Spinning Laser Tracker
    FIG. 29 shows a Master Station 2900 having a rotating laser 2910 mounted at its lower portion. The rotating laser reads bar codes or any electronic or mechanical signal. The spinning laser can determine the distance to target, and the system can activate an alarm if a change is detected. Laser beam 2902 impinges upon a rotating mirror 2904 that is at 45 degrees to both vertical and horizontal planes. Thus, a horizontal rotating laser beam is emitted by the device.

The speed of rotation is determined by stepper motor 2906. Three glass pegs 2908A, 2908B, 2908C are used to provide a transparent gap between the Master station module and the stepper motor assembly.

28. Station Having Fixed Laser Pointers

Figure 30:
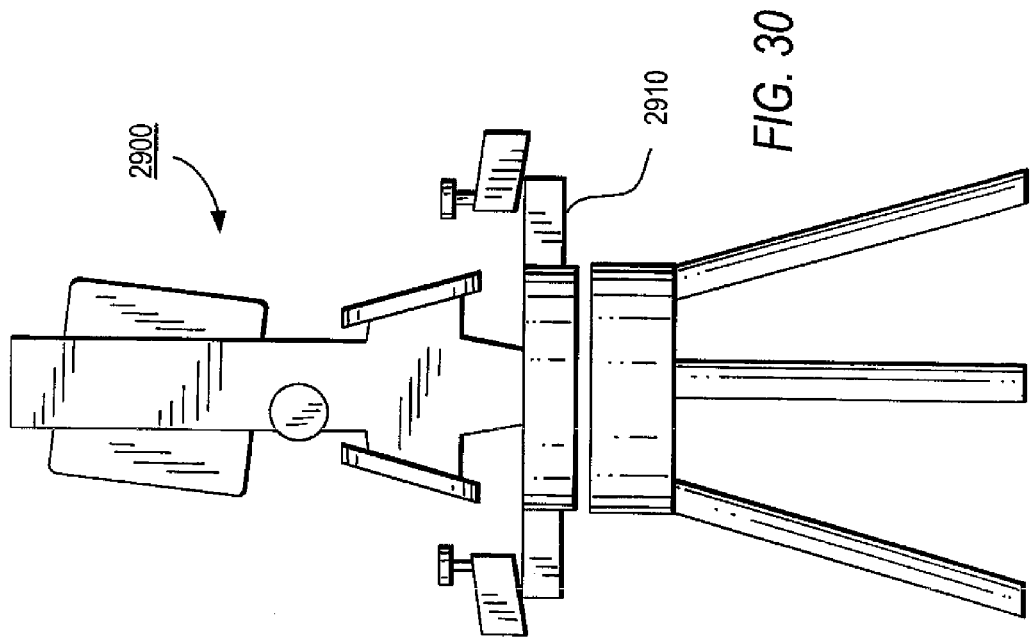
FIGS. 30A-B show auto-leveling fixed laser pointers.
Figure 30B:
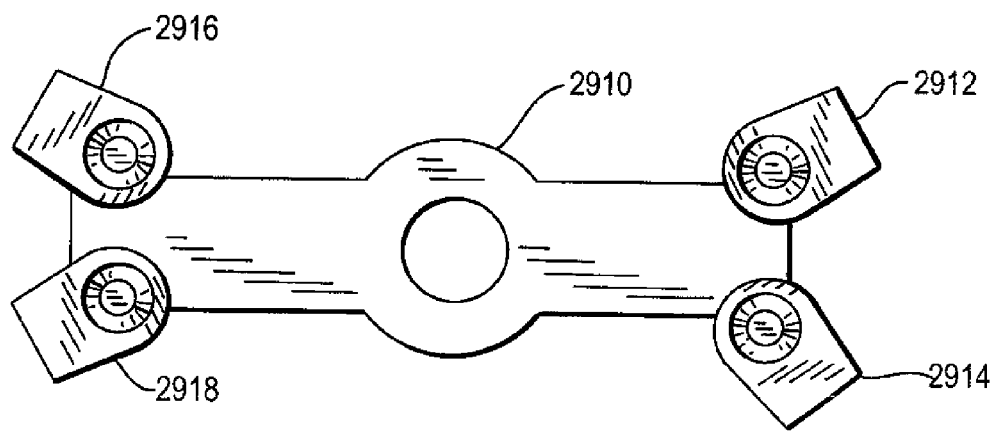

FIG. 30B is a top plan view of a platform 2910 shown in FIG. 30A mounted onto station 2900 with four fixed laser pointers 2912, 2914, 2916, 2918. The four laser beams (not shown) can be aligned with or targeted onto Fixed Reference Stations or control points. This device can activate an alarm when the reference points move beyond the control measurement parameter. The lasers can be components in distance measurement devices. Not only are they targeted on the control, but they continually measure to the control points, alarming if and when the measurement exceeds allowable limits. This is done to insure the accuracy of all layout or measurements taken. Each laser may be independently tuned or precision aligned with the target.

29. Robotic Construction Security Station

Figure 31:
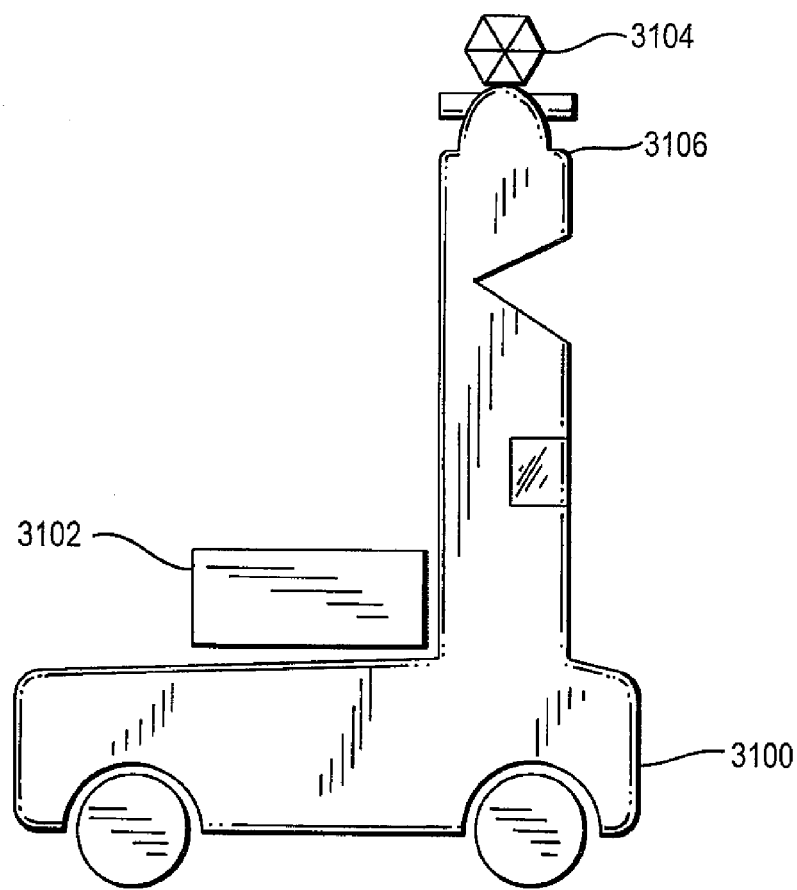
FIG. 31 shows a robotic construction security station.

This Station shown in FIG. 31 drives around a worksite documenting the work in progress and gathering as much data as it can from individuals. The system is able to verify the identity of individuals using biometric or key card ID. Biometric identification may include state-of-the-art devices, inter alia, ID reader, video surveillance, handprint or fingerprint reader, and eye or face recognition. Also, the Station can take attendance to keep track of time worked by specific workers.

The system comprises a vehicular robot 3100 with measuring device 3106 including prism 3104 and an integrated intelligent, event based surveillance system 3102 onboard. The device is able to access a remote database to compare data gathered with construction site records. The Station is autonomously navigated about the site, or it can be guided by a Master Station.

30. 360° Camera Station

FIG. 32A is an isometric view of a 360° Camera Station 3200. This is a system for delivering video and still pictures from precise elevations in an effort to view what a person would see from that particular vantage point upon completion of construction of a proposed office or apartment building. The unit 3200 comprises a parabolic mirror 3202 and lens 3204 attached to camera (video or still) 3206. The unit may also comprise a GPS, gyroscopes for stabilization (not shown), and gyroscopes with accelerometers (not shown) for determining elevation.

Figure 32C:
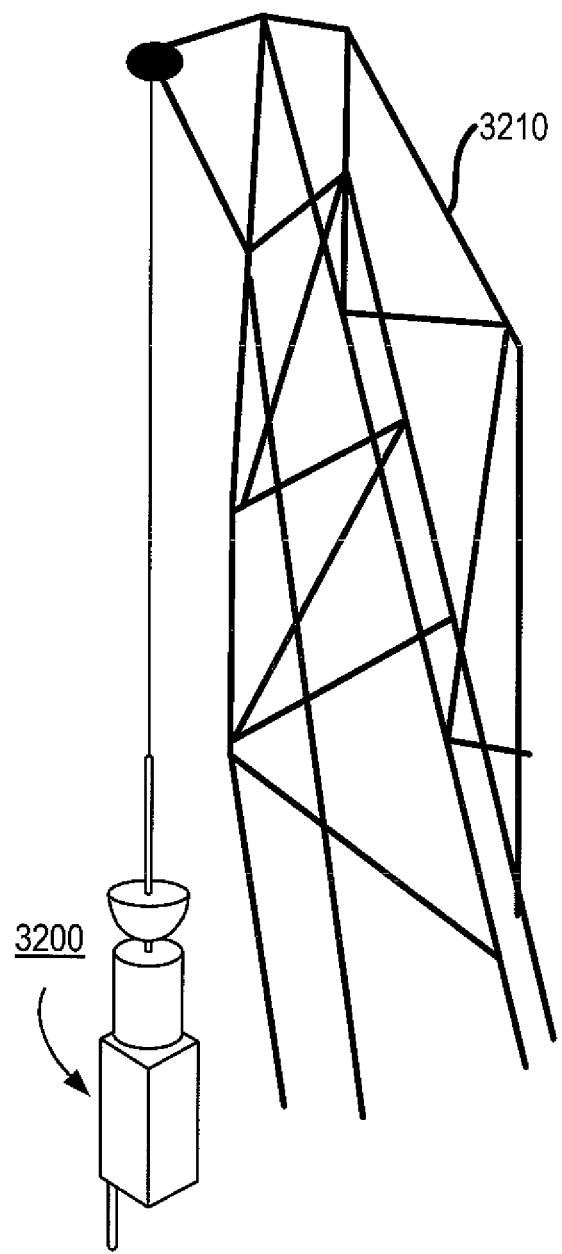

FIG. 32B shows the Camera Station 3200 mounted atop a telescoping pole 3208, and FIG. 32C shows the Camera Station 3200 dangling from a crane 3210.

31. Twisting Building Sensors

Tall buildings are constantly in motion. They sway and they twist in the wind. Consequently, the construction site is in a constant state of deformation. If a Master station aims a laser beam at a particular point that is not fixed and can shift from time to time, the resulting measurement would be inaccurate. The current system forms an extremely accurate and precise arrangement. To maintain accuracy and precision it is important that the Master and Substations know the precise location of every reference in three-dimensional space.

Figure 33:
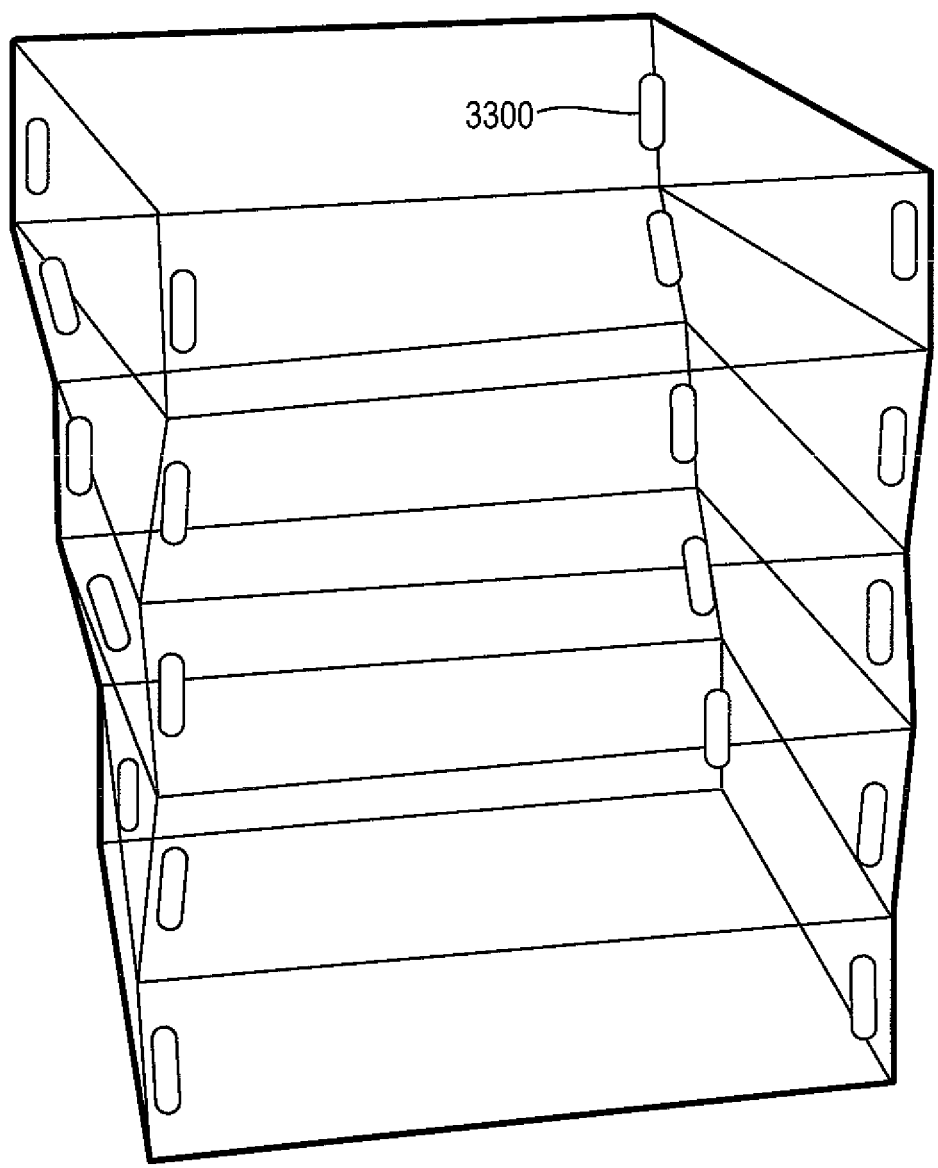
FIG. 33 shows twisting building sensors.

The problem is solved by installing a system of sensors, (one of which is identified as sensor 3300) that measures the attitude and the movement of the building or structure. This type of movement is shown in FIG. 33. The movement data is then used to maintain the accuracy within the System Software throughout the construction process. The sensor system comprises accelerometers, gyroscopes, and differential GPS measurements along with software to utilize the telemetry and to activate alarms based upon preset tolerances so as to allow or prevent measurements from being taken by the Master station. The system prevents measurements from being taken by the Master Station when the building alters the control point distance measurements such that an inaccurate measurement would be taken simply due to distortion of the building. The system monitors building attitude and documents this movement over time, thereby producing an independent deliverable.

32. Accelerometers

Figure 34A:
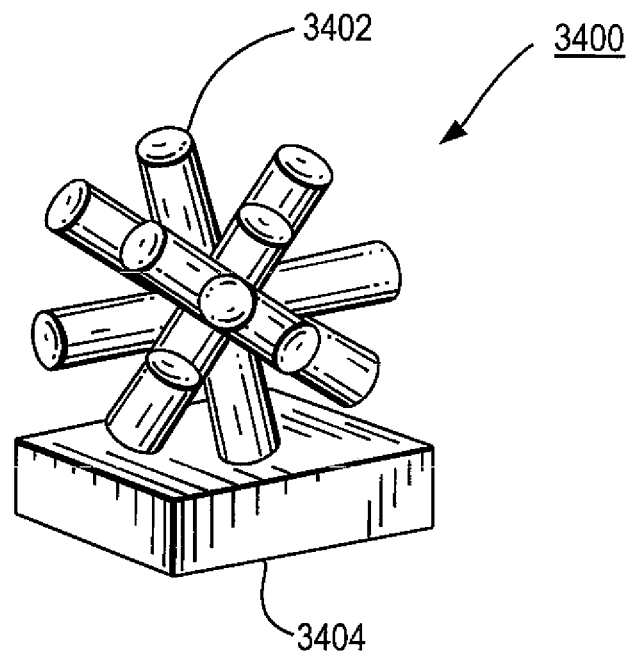
FIGS. 34A-B illustrate a device that detects movement of a mobile robot to determine its precise location.
Figure 34B:
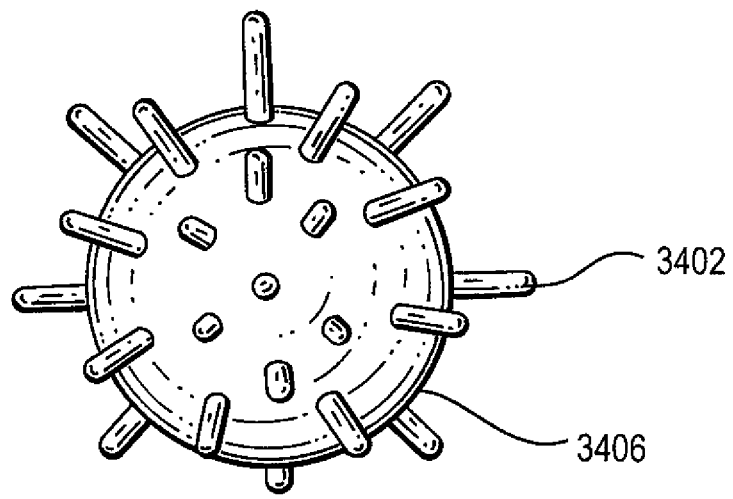

FIGS. 34A and 34B illustrate electronic distance measurement with an accelerometer cluster 3400 and electronics 3404. The device shown in FIG. 34A can be mounted on a moving vehicle. For the preferred embodiment of the system disclosed herein, the device is mounted on a remotely or computer controlled robotic rover (not shown). The rover is either controlled remotely, or is on auto pilot, or completely autonomous. The purpose for this device is to measure distance traveled and rate traveled to determine position. FIG. 34A shows the orientation of the particular accelerometers and FIG. 34B shows the external appearance of the device. The accelerometer cluster 3400 comprises a plurality of cylindrical shaped accelerometers 3402 coupled to a housing 3404 containing the proper supporting circuitry and mechanics for the cluster. An outer shell 3406 shown in FIG. 34B may be configured to mount onto the cluster resulting in a spherical shape device with cylindrical accelerometers emanating therefrom. The distance traveled and rate traveled are thus determined by measuring acceleration values from each accelerometer, and computing the resultant thereof for all of the accelerometers. FIG. 34A shows the orientation of the individual accelerometers, while FIG. 34B shows the external appearance of the device.

33. Transportable Arm Station

FIG. 35 shows a transportable substation 3500 comprising a mechanical enclosure or housing 3514 that further comprises a laser. The transportable arm station is a Substation rather than a Master station. Vertical and horizontal optical spinning lasers 3510, 3512 are mounted atop the housing 3514. Emerging from the top of the station is a pole 3518 upon which a 360° corner cube prism 3506 is mounted. Any light impinging upon prism 3506 from any direction is reflected along the same line of sight from which it came. The station is mounted on a tripod 3518 that maintains the station in a fixed position in space. Emerging from the side of the station housing 3514 is a movable robot arm 3520. At the end of the robot arm is a pole upon which a prism 3524 is mounted. Also at the end of robot arm 3520 are laser pointers 3522 and 3528 that can be used to measure distances and to read and write information in the form of reflected or transmitted optical signals. A laser pointer 3504 similar in operation to laser pointers 3522 and 3528 is located at the end of pole 3508. Substation 3500 can transmit laser beams 3502, 3526, 3530 in various directions from the different laser pointers:

a. plumb beam 3516 sent downward in the true vertical direction to determine height;

b. a vertical beam 3502 is sent upward to be redirected through the pole to act as a visible laser pointer and an electronic distance measurement reading and writing device.
c. a vertical beam sent upward is to be redirected through the vertical and horizontal optical spinning units; and,
d. a beam 3526 is sent through the robot arm to the robot arm pole to act as a visible laser pointer and electronic distance measurement reading and writing device.

The X, Y, and Z position in space of the transportable arm station as well as the position and orientation of the robot arm is always known by the Master station. Single or multiple substations may be utilized independently with a Master station or multiple substations may be daisy chained together with each other.

34. Transportable Substation

FIG. 36 shows a transportable substation 3600. This device is a simplified electronic distance measurement substation, and it is capable of emitting a visible laser beam so as to cause a spot to impinge upon a specified position. It is smaller, lighter, and less expensive to manufacture. There are spinning vertical and horizontal laser mechanisms 3606, 3608 mounted on top of the station housing 3610 which is mounted on tripod 3612. This spinning laser mechanism emits horizontal and vertical reference laser lines. The spinning lasers are able to act in a unit that receives, sends, reads, and writes coordinate telemetry. This is done by searching for and measuring the distance to any number of fixed reference stations, master stations, or other substations. The X, Y, and Z position is always known by the Master station. The device is meant to be readily carried and moved around a worksite and is a solution for pinpointing coordinates not within the line-of-sight of the Master station. However, it can be fastened to the ground or possibly to an I-beam. Once again, single or multiple transportable stations may be utilized independently with a master station or multiple substations may be daisy chained together with each other. That is, substation 3600 can measure distances to certain reference points, determine the location of these points within a multidimensional space and relay the position of these points to a Master station. A pole 3604, the end of which is a prism 3602 is mounted on and extends from the spinning lasers 3606, 3608 and station housing 3610.

35. Vehicle Mounted Master Station

FIG. 37 shows the placement of a Master station or Substation atop a robotic rover so that it is portable and does not need to be physically carried by a human along with a tripod. A Master station 3700 is shown in the figure. The device 3700 can operate as a substation that is substantially similar to the substation of FIG. 35. In addition to toolbox 3712 mounted on vehicle 3714, the equipment mounted on the vehicle includes a robotic measuring equipment such as a theodolite 3710 with robotic arm 3716 at the end of which is a prism 3718 and laser pointers 3720 and 3726. The laser pointers 3720, 3726 can be replaced by any one of the tools stored in toolbox 3712. Mounted on top of the Master station (or sub-station) are horizontal laser 3708, vertical laser 3706, pole 3722, prism 3704 and laser pointer 3702. The top portion 3724 of the Master station (or sub-station) can be replaced to allow the device to operate either as a substation or a Master Station. The vehicle mounted Master station device 3700 is a combination of a fully robotic active prism 3718, a tracking laser distance measurement Master station module that is fixed or fastened to a vehicular robot 3714 that can be manually, remotely controlled, or can autonomously navigate itself within a specified environment. These two devices are combined with a multi-axis computer guided robotic tool arm 3716 that is capable of automatically changing work tooling to perform construction activities in real time. The ultimate purpose of this Master station is to navigate and spatially orient the device in relation to the space in which it is placed or to CAD drawings. This is accomplished by automatically searching for and continually measuring and re-measuring the distance to any number of fixed reference points, substations or any other fixed or mobile Master stations. The device can move to selected positions on its own, and once there, can utilize a variety of specified tooling to perform various work functions. It can navigate according to self contained computer instructions, or can be made to navigate by other fixed or mobile Master stations. This Master station can mark, paint, point, burn, cut, weld, drill, engrave, measure, or read or write, and can send and receive telemetry in real time. To that extent, the tools on the robot arm are interchangeable, and can be retrieved from a tool box 3712 that is also mounted atop the vehicular robot, Of course, a substation (very much like that shown in FIG. 36) can also be mounted atop the vehicular robot 3714 rather than a master station. A 360° corner cube prism 3702 is mounted atop the pole 3722 emerging from the Master station module head. A similar prism 3718 can also be mounted at the end of the robot arm 3716, but this is not necessary in the preferred embodiment.

36. Robot Arm Tools

FIGS. 38A-E show the various interchangeable tools that can be placed upon the robot arm of the device of FIG. 37. Shown here is a complete tool solution where the robot has interchangeable tools and even entire robot arms. FIG. 38A shows the robot arm with a cutting tool. FIG. 38B shows the robot arm with a printing or plotting tool. FIG. 38C shows the robot arm with a plumb visible laser pointer. FIG. 38D shows the robot arm with a CMM, a laser scanner, or a manual point reading tool. FIG. 38E shows the robot arm with drilling, engraving and burning tools.

37. Master Station/Substation Kit

Figure 39:
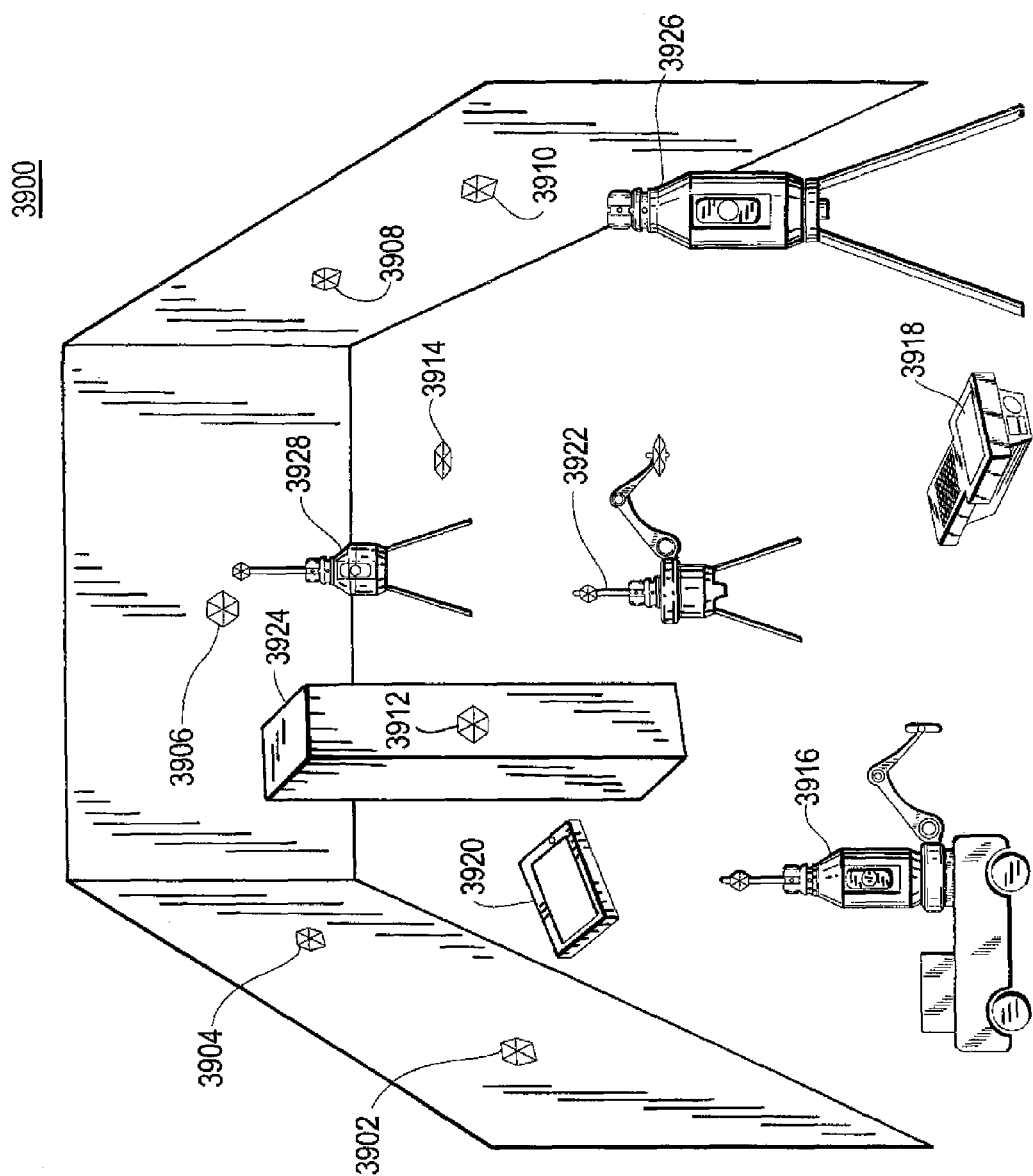
FIG. 39 illustrates a building enclosure configured to use the present invention. The system of the present invention is arranged in the figure as a kit. All of the components are shown in the figure. Specifically shown are fixed reference locations that are fastened onto permanent locations.

FIG. 39 illustrates a building enclosure configured to use the method and system of the present invention. A kit of the system of the present invention is provided. All of the components of the kit are shown in FIG. 39. The fixed reference stations 3902, 3904, 3906, 3908, 3910, 3912, and 3914 are shown in the figure as 360° corner cube prisms, but they can be selected from among many devices that provide a readable fixed reference. The fixed reference stations may be passive devices. However, they can also be intelligent devices capable of transmitting information to receivers, or they can optically respond to specific messages. The fixed reference stations can be located at various locations to allow a Master Station to identify specific points within the multi-dimensional space. For example, a fixed reference station can be fastened or planted on a concrete slab or fastened to a permanent location or mounted in monuments in a known location which is addressable and identifiable. Monuments allow for automatic and autonomous device orientation in relation to the space in which these devices have been placed or to the CAD drawings. The methods whereby a master station can identify reference stations are inter alia, electromagnetic (e.g., light, colored light, infrared, RFID, X-rays, bar code, etc.), ultrasound, digital compass, cybernetics information theory and coded information.

FIG. 39 shows five fixed reference stations (3902, 3904, 3906, 3908 and 3910) mounted on the walls, one (3914) mounted on the floor, and one (3912) mounted on a monument 3924. The kit further comprises devices that act upon information obtained regarding the fixed stations. These devices are Master station 3926, transportable station 3928, armed transportable station 3922, vehicular station 3916, handheld computers 3918 having built-in electronic distance measurement, and tablet or laptop computer 3920. The Master station 3926 can locate the references by itself or with the use of the substations 3916, 3922 and 3928. Handheld computer 3918 by itself or in combination with device 3926 can also operate as a Master station.

The purpose of this fixed reference station system is to provide fixed reference points for automatic, autonomous, device orientation and navigation in relation to the space in which they are placed according to CAD or digitized drawings. These devices orient themselves and navigate through the space by continuously searching for, measuring and re-measuring the distance to any number of fixed reference stations located in the same space. The ultimate goal is to achieve greater measurement accuracy and to navigate autonomously or through a remote controlled vehicle, a humanoid robot, an android, or other robots or robotic vehicles, tools or systems indoors or outdoors from a CAD drawing.

38. Station Sensor and Transmitter Array

Figure 40:
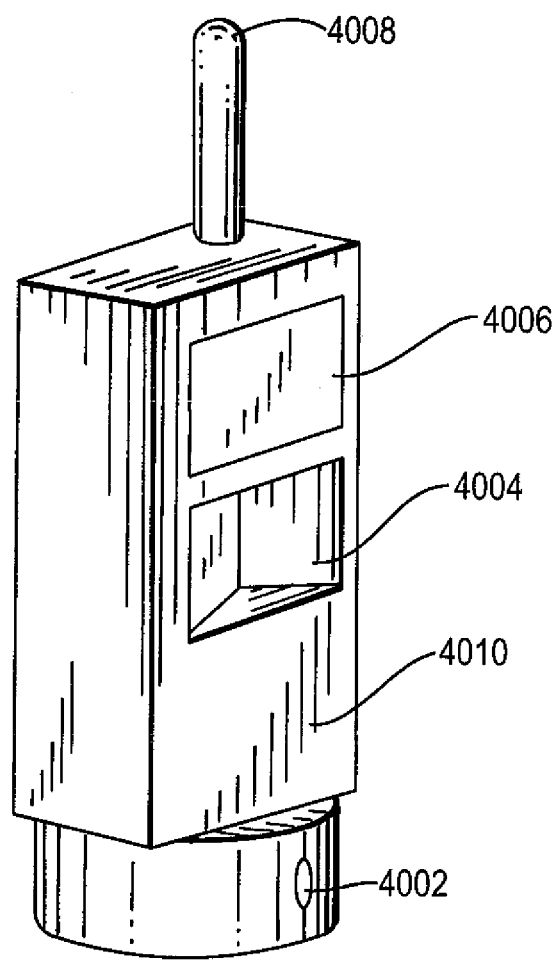
FIG. 40 is an isometric view showing a fixed reference station sensor and transmitter array.

FIG. 40 is an isometric view of an intelligent fixed reference station sensor and transmitter array 4000. Acting as an intelligent monument that knows its position, this device is able to network with other similar devices or tools, and can send, receive, and redirect any electromagnetic signal, data, light, or ultrasonic signals. The intelligent fixed reference station in FIG. 40 comprises horizontal spinning laser 4002, that is used as a sighting and a reading device; or a bar code or graphic reader. In addition, the fixed reference station of FIG. 40 further comprises a dynamic reflector 4004, a corner cube prism (not shown), a movable prism (not shown), a holographic optical element, or a graphic device (not shown), and in addition a sensor receiver 4006 and a wireless communications receiver and transmitter 4008. Finally, the intelligent fixed reference comprises a housing 4010 to contain the electronics and to hold the device together.

39. Handheld Computer Display

Figure 41:
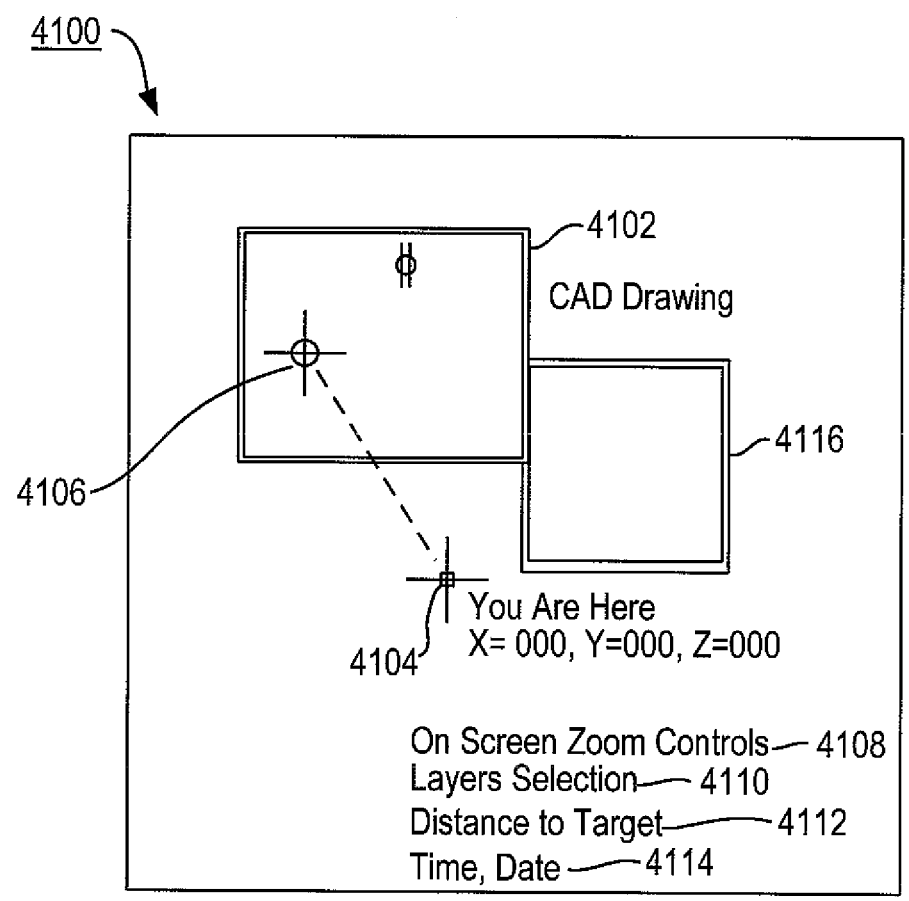
FIG. 41 is a schematic representation of the display of the handheld computer of FIGS. 14A-C.

FIG. 41 is an illustration of the display 4100 of the handheld computer of FIGS. 14A, 14B, and 14C. A CAD drawing (or map) 4102 is overlaid with a marker 4104 showing the position of the user. Alongside that marker, the coordinates (e.g., X-Y-Z coordinates) of the user's present position are shown immediately below the words, "You Are Here". Also, a user may select a target position 4106 which will also appear on the screen. Upon command from the user, the handheld computer will direct the user to the target position (e.g., by issuing voice commands in a similar manner to an automobile GPS). As the user moves toward or away from the target, the CAD map moves also, and the "You Are Here" indicator always shows the user's present position on the map. There are on-screen zoom controls 4108. In addition, the user is permitted to select various layers (using layer selection 4110) of the map (e.g., 4116 showing plumbing or electrical work). The display also shows the current distance (distance selection 4112) to the selected target. The positions of the reference stations are indicated. The date and time 4114 are also displayed. All of this is accomplished using software which is a component of the present invention.

The robotic laser distance measurement Master station control software is located within a handheld, laptop, tablet or desktop computer with the ability to communicate with (sends commands and/or receive commands) Master stations, Substations and other equipment of the system of the present invention. The software operatively sends commands and receives telemetry back from the Master station. The software sends commands to the Master station's firmware telling the Master station to perform specific tasks (e.g., turn in a specified direction, move up or down to a particular angular position, turn the visible laser pointer on or off, measure distance or angle etc.). The Master station responds by executing the requested functions and then sends performance or measurement telemetry back to the software.

The software has a graphical user interface purpose built for use within the construction and architectural marketplace. The software is geared to performing specific reading and writing construction tasks rapidly. The software mimics the look and feel of GPS systems that are utilized in automobiles or other vehicles for navigation. The user navigates within a CAD drawing that represents the building under construction. The software is used in conjunction with the Master Station to create as built studies of existing architecture in the form of 2D or 3D CAD drawings in real time. The software is used to navigate to and layout construction work from 2D or 3D CAD drawings in real time. Features of the software include:

a. "YOU ARE HERE" is displayed on the screen.
b. In Prism Tracking Mode or Visible Laser Pointing Mode in the XYZ coordinates are displayed on the screen.
c. In "Active Laser Pointing Mode" or "3D Mouse in Space Mode": the laser follows or tracks to wherever the mouse moves in space.
d. Once a target or point in space is selected "Distance to Target" from present location is displayed on screen.
e. Transfer seamlessly between reflectorless mode and Prism Tracking mode.
f. Shoot a visible laser in prism tracking mode.
g. Position control and zoom control is "ghosted" (displayed over the drawing and somewhat transparent or diaphanous).
h. Access to alternate drawings or drawings layers is available.
i. Power Search or Call Master Station function is present (the Master station will follow a procedure to actively search for the prism location).

40. Tripod Prism Pole

Figure 42:
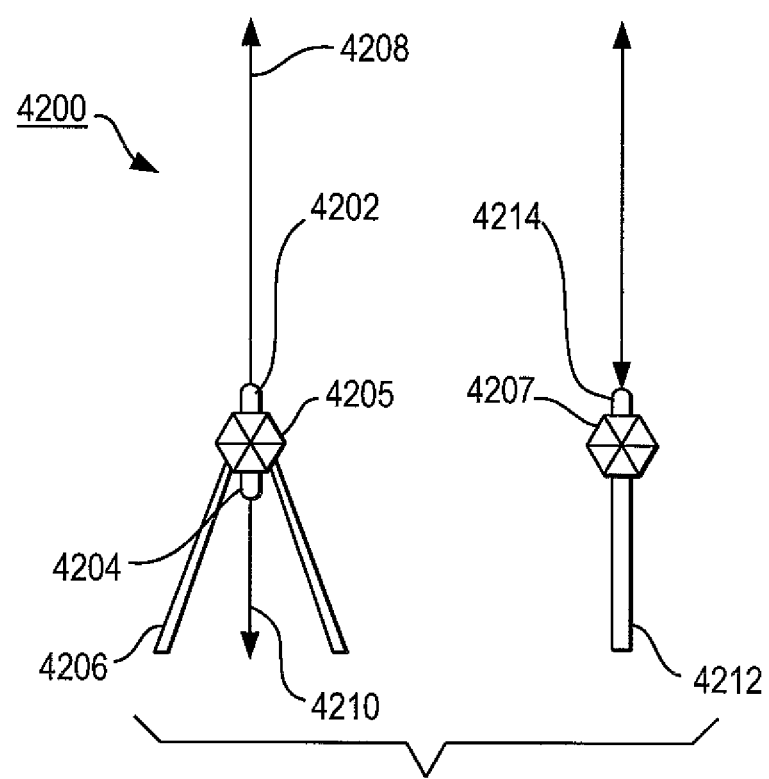
FIG. 42 is a schematic representation of a tripod prism pole with visible laser pointer up-and-down and with a built-in electronic distance measurement device.

FIG. 42 is a schematic illustration of a tripod mounted prism pole 4200 having a visible laser point 4202 that points vertically up and down (see laser beams 4208, 4210). The prism pole further comprises built-in electronic distance measurement device 4204 which can also serve as a laser pointer and is mounted on tripod 4206. From FIG. 42, it is apparent that the device 4200 is measuring distance to another prism pole 4212. The device 4200 emits a plumb laser beam 4210 to determine its height off the ground. The device 4200 has a prism 4205 and the pole 4212 has mounted thereon prism 4207 and laser pointer 4214. The two prisms 4205, 4207 are aligned, and the distance between the prisms is measured.

41. Robotic Master Station

Figure 43:
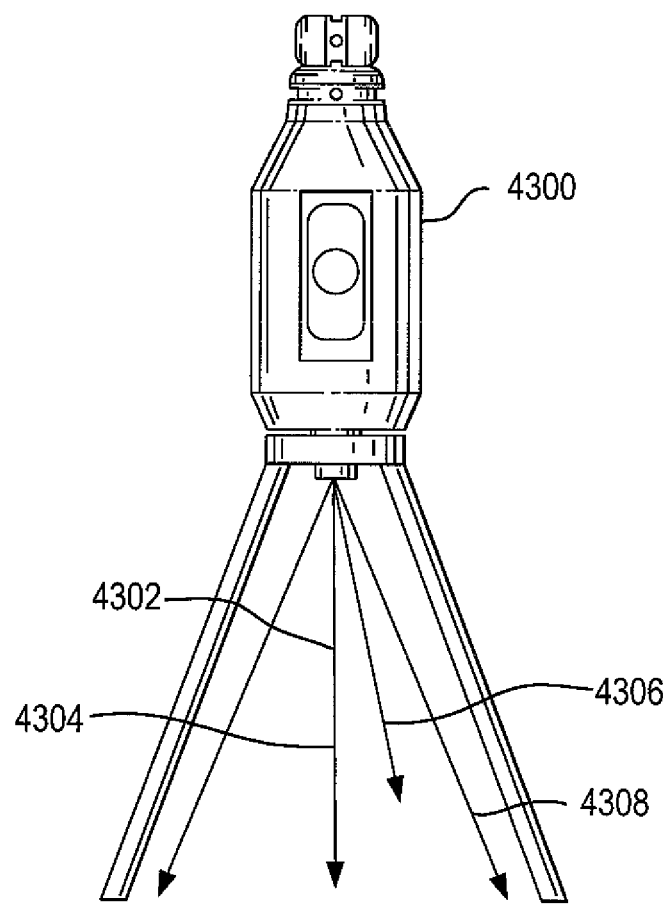
FIG. 43 shows a Master Station having a multi-beam distance measuring device which determines its height from the ground as well as its planar orientation.

FIG. 43 shows how a robotic Master station module device 4300 is able to determine its orientation and position from the ground where the ground is rough and not level. In order to do this, the instrument directs four laser beams 4302, 4304, 4307, 4308 toward the ground. Three of the laser beams 4302, 4306, 4308 are directed to the bases of the three tripod legs. The fourth laser beam 4304 is a plumb beam directed vertically downward. The three beams directed at the tripod leg bases determine the planar orientation of the device. The plumb beam 4304 determines the vertical distance of the instrument to the plane. From that point on the plane, the precise orientation and location of the instrument with respect to the ground is known.

42. Cable Driven or Rail Driven System

Figure 45:
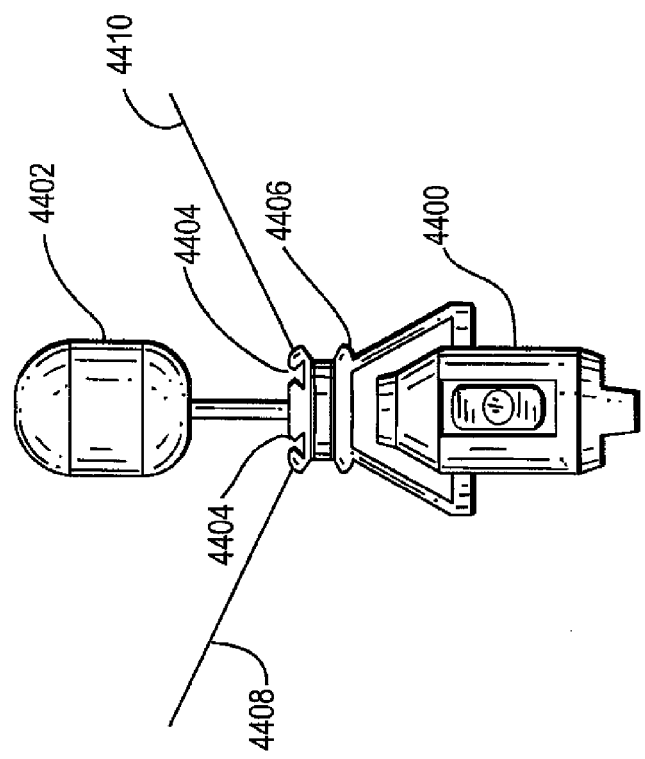
FIG. 45 shows how the gyroscopically stabilized cable driven suspended computerized transport system of FIGS. 44A-D would be used.

FIGS. 44A-D show how a station can be suspended above the ground and can traverse the construction site while measuring distances to fixed references and other devices from above. FIGS. 44A and 44B show a rail driven system. FIG. 44A is a Master station module 4400 which has a gyroscopic stabilization unit 4402 attached along with rail mounts 4404 to Master station module 4400 via a computer controlled driven gantry 4406; see also FIG. 45. FIG. 44B shows the rail mounting for Master Station 4418 with rail 4416 and rail slot 4414. FIGS. 44C and 44D show the cable driven and hover driven mounts for Master Stations 4420 and 4422, respectively. Master Station 4422 has stabilizers 4412. Master Station 4420 is attached to cables 4421, 4423, 4425 and 4427. FIG. 45 shows device 4400 adapted to a cable driven system using cables 4408 and 4410.

43. Prism Pole Marking System Heads

Figure 46B:
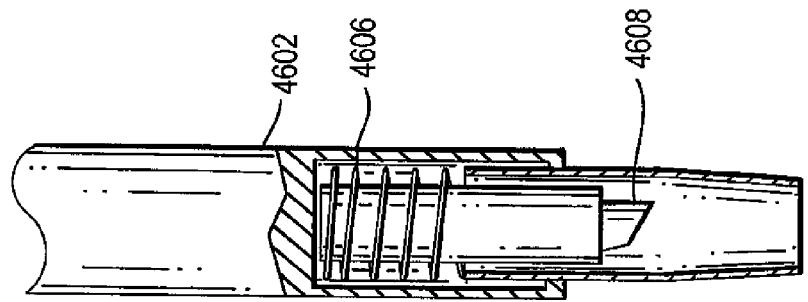
FIGS. 46A-B show illustrate the heads of two prism pole marking systems.
Figure 46A:
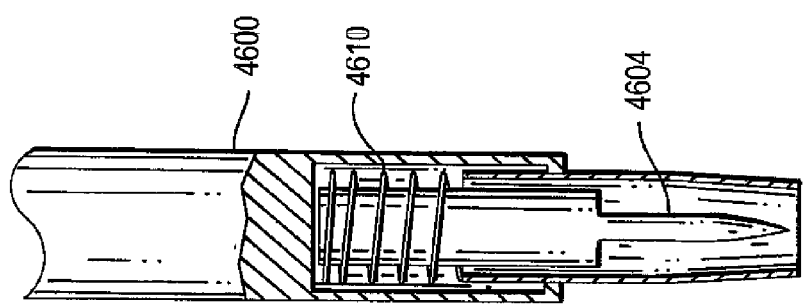

FIG. 46 shows tools such as spring loaded awl 4600 and spring loaded marker or paint stick 4602 that would be mounted to the bottom of a robotic vehicular station or to the robot arm. FIG. 46A shows the awl 4604 disposed in a cavity of a housing 4600 and engaged by spring 4610. FIG. 46B shows a marker or paint stick 4608 disposed in a cavity of housing 4602 and engaged by spring 4606. These devices would be used to mark a surface according to predetermined instructions.

Normally, a prism pole is handheld, and is therefore subject to movement when the holding person's hand shakes. Gyroscopic stabilization of the prism pole has already been discussed with respect to FIG. 44.

44. Viscously Damped Stabilized Prism Pole

Figure 47B:
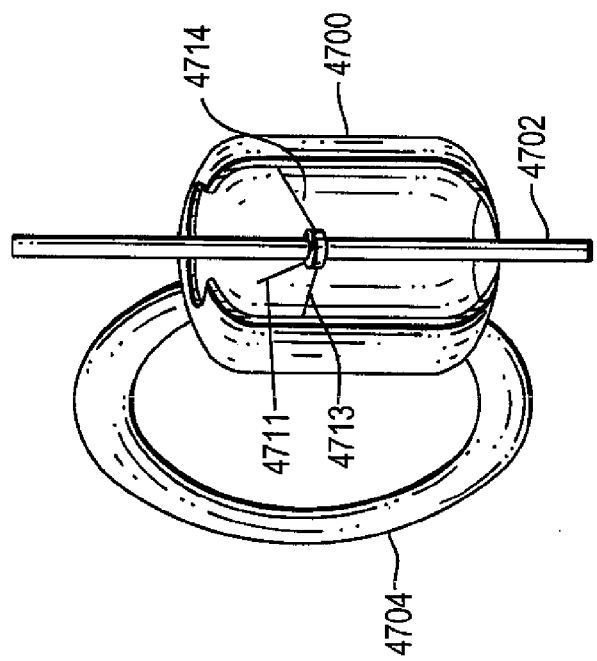
FIGS. 47A-B show illustrate a viscously damped stabilized prism pole.
Figure 47A:
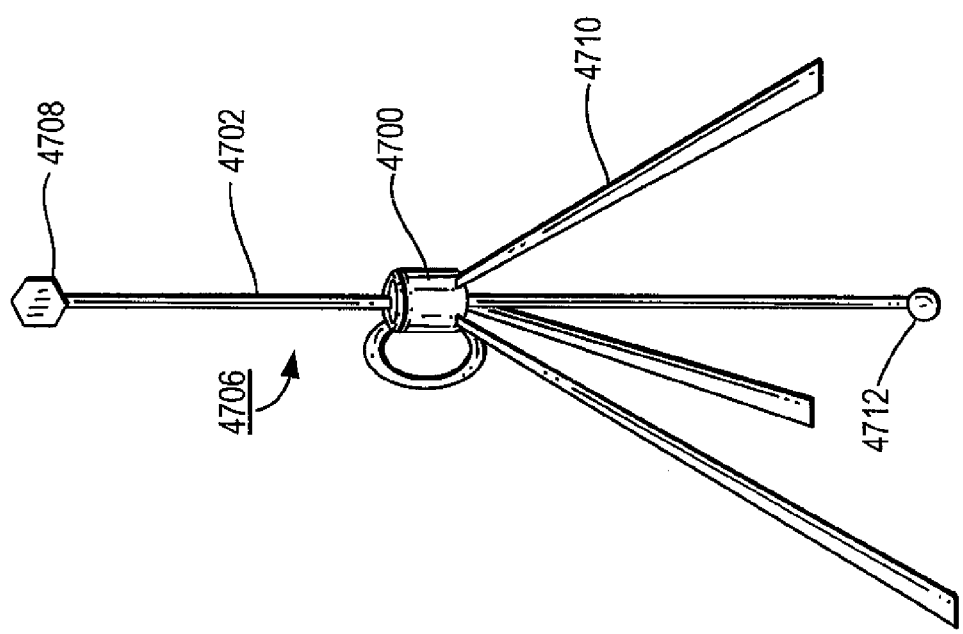

FIGS. 47A-B show an alternative stabilization device 4706 to the one shown in FIGS. 44 and 45. The entire pole 4702 shown in FIG. 47A with a prism 4708 mounted on top of the pole and attached or mechanically coupled to compartment 4700 used as a stabilization device and is shown in FIG. 47B. The pole and stabilizing device are mounted onto tripod 4710 as shown. Within the stabilizing device 4700 having arm or handle 4704, are strings 4714, 4711 and 4713, as shown, that help suspend pole 4702 which can also be suspended by the use of viscous liquid damping rods (not shown) similar to those used to slow the movement of doors. The damping rods must be critically damped in order to be effective. The pole is weighted at the bottom with weight 4712 so that it points toward the center of the earth. Therefore, the weight 4712 acts as a plumb bob.

45. Gyroscopically Stabilized Prism Pole

Figure 48B:
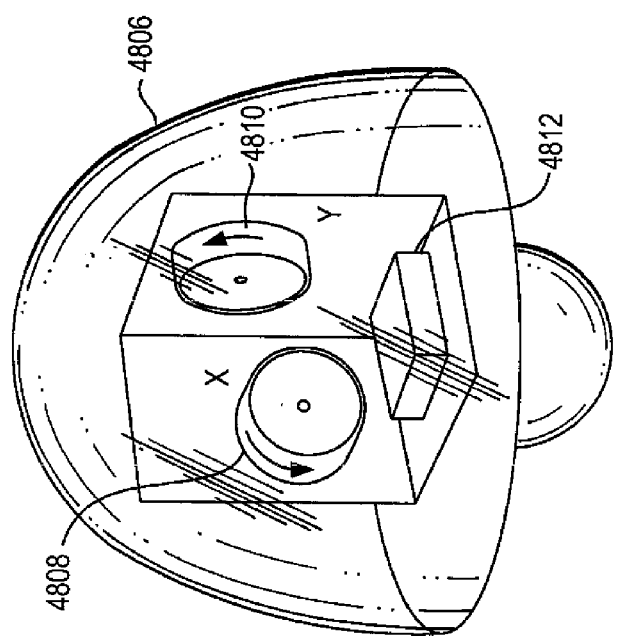
FIGS. 48A-B illustrate a gyroscopically stabilized prism pole. The stabilizers are paired with fuzzy logic electronic processors for stability maintenance.
Figure 48A:
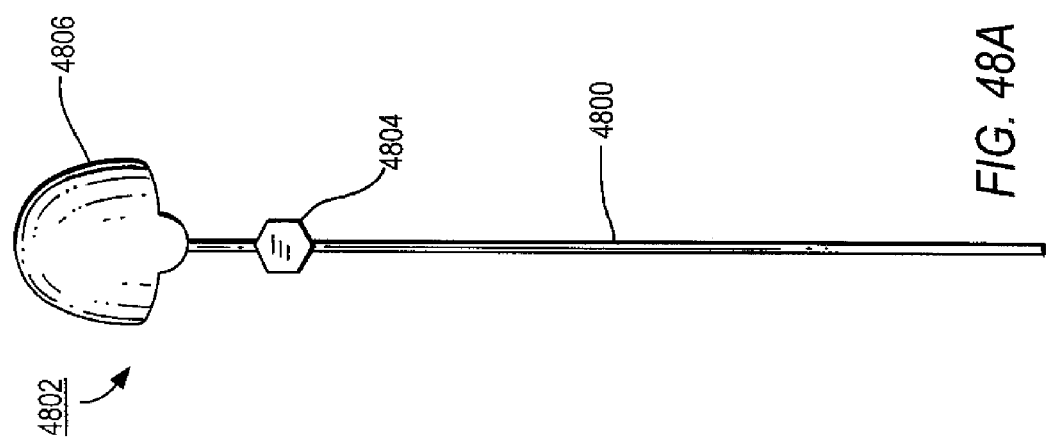

FIGS. 48A-B show an alternate stabilization mechanism 4802 for a pole 4800 with a stabilization head 4806 and a prism 4804 mounted below the head 4806; it is a modified gyroscopic mechanism. FIG. 48A shows the entire pole 4800 while FIG. 48B shows a schematic view of the stabilization head 4806. Within the head 4806 there are X and Y directional gyroscopes 4808 and 4810, and a fuzzy logic electronic processor 4812 is substituted for a Z-directional gyroscope. This device will defeat the vibration and inaccuracy caused by the user holding the pole. The Gyro stabilizer pole is meant to generate a more consistent and steadier platform for a prism. The electronics control the gyro rate of rotation in real time to increase pole stability.

46. Method for Accurately and Precisely Locating and Marking a Position in Space Using Wireless Communications (FIGS. 49-62)

Figure 49:
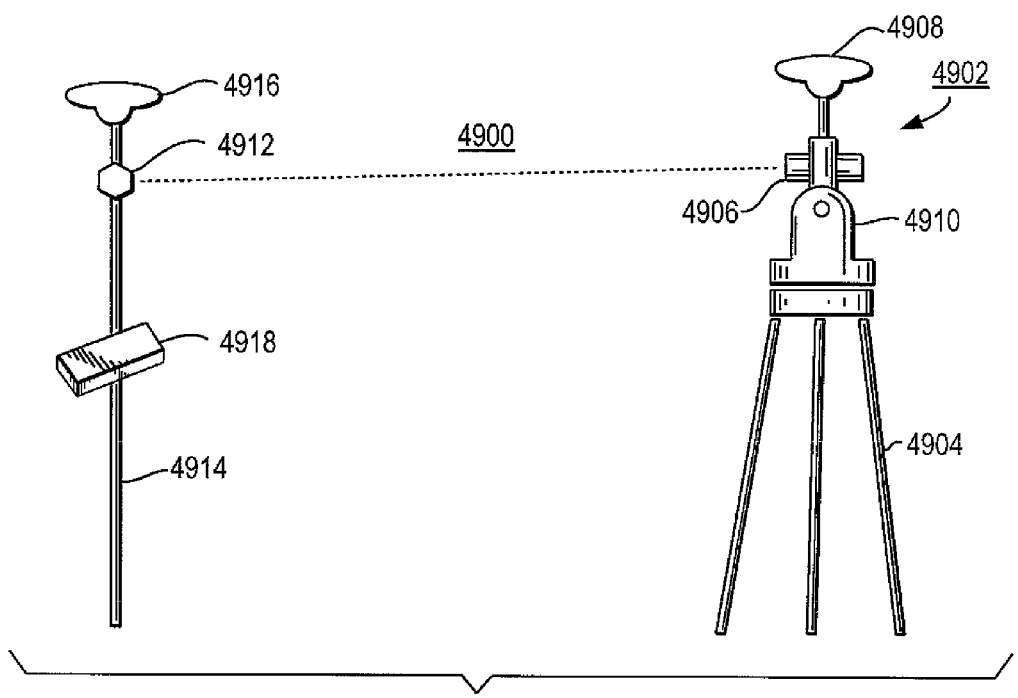
FIG. 49 shows a Master station module (or a robot with a wireless antenna) which measures the distance between it and a surveyor's pole having a prism and wireless antenna which, in turn, interfaces with a data collection handheld computer.

FIG. 49 shows a first embodiment of a system comprising a total station 4902 (which is a stationary robotic device) comprising a tripod 4904, a laser range finder 4906, a wireless communications device 4908 located on top, and a housing 4910 containing, inter alia, computer and user interface circuitry. The robotic device 4902 moves the laser 4906 to constantly track a prism 4912 located on a pole 4914 which is similar to a surveyor's pole, except that it too has a wireless communications device 4916 located on its top. The total station 4902 knows the location of the prism 4912, and that location is communicated to a handheld device 4918 (e.g., a laptop computer or other processor) by the pole 4914 and the total station 4902. Should communication of the location of the prism 4916 be interrupted, the total station 4902 would institute a search pattern program in order to find the prism 4916. Once the position of the pole 4914 is ascertained, the handheld device 4918 can then triangulate its position relative to the total station and the pole using wireless technology. The total station and the pole are both prior art devices. The handheld device, while mechanically prior art, is loaded with special software that perform at least some of the steps of the method of the present invention and displays modified CAD drawings of a site (both plan and elevational views), to form a virtual map of a construction site. Thus, the handheld device can now overlay its position on the virtual map. Communication devices 4916 and 4908 can be any type of wireless communication devices that are able to exchange information with each other in accordance with a protocol. A protocol is a set of rules that dictate how information is formatted, transmitted, received and interpreted by devices which transmit and/or receive information. The protocol may be a well known protocol or one designed by the manufacturer of the system of the present invention. Processor 4914 is shown as a portable processing device executing AutoCAD® and TheoCAD (SM) software that in combination with Auto-CAD® or other graphic software is able to perform at least some of the steps of the method of the present invention.

Figure 50:
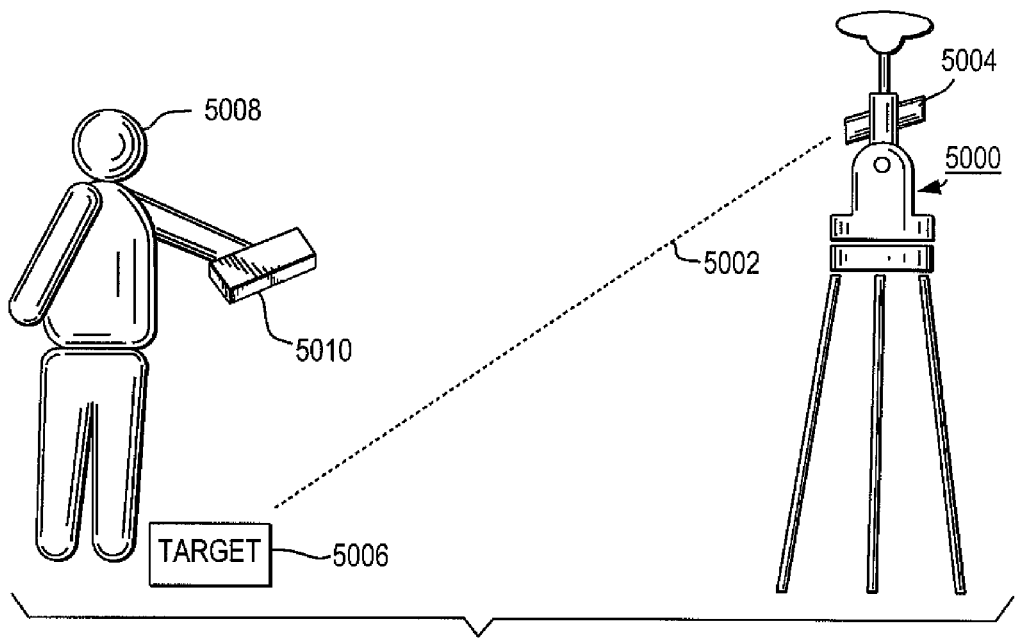
FIG. 50 shows the total station of FIG. 49 with a laser emanating in the visible spectrum which marks target locations based upon directions from the handheld computer.

FIG. 50 shows a second embodiment wherein the total station 5000 (substantially similar to the total station 4902 in FIG. 49) points its laser beam 5002 generated by laser range finder 5004 at a target 5006, the location of which is determined by a user 5008 inputting coordinates into a handheld device 5010, and the coordinates are communicated wirelessly to the total station 5000. The user tells the handheld device the position where it wants the laser to illuminate, and the total station's laser beam is directed to that position.

Figure 51:
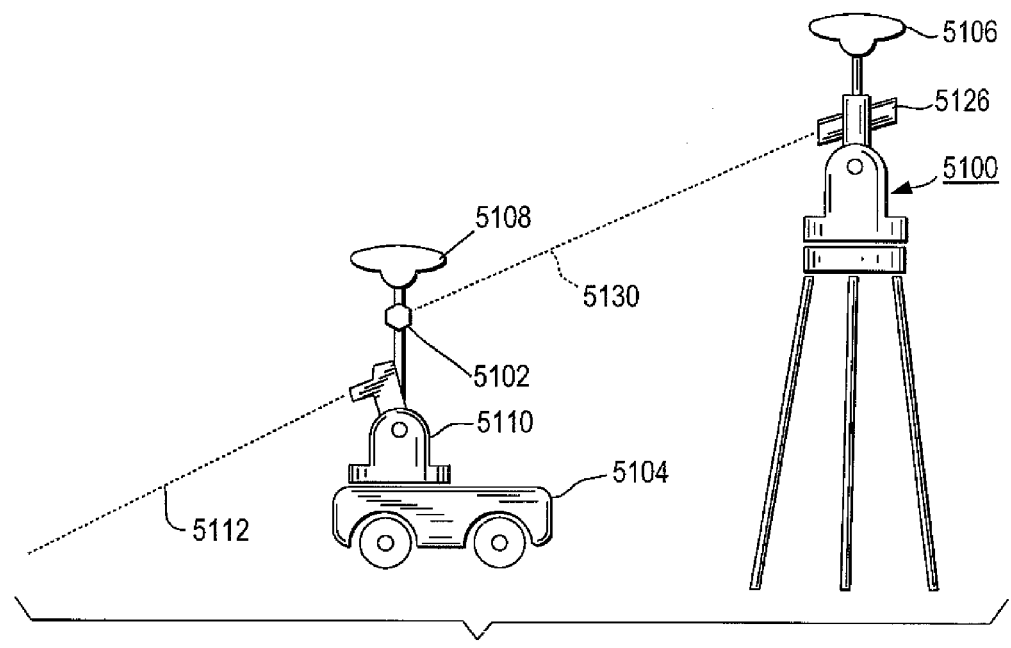
FIG. 51 shows the Master station module of FIG. 49 that directs a mobile robot to produce a visible target spot on a surface.

FIG. 51 shows a third embodiment wherein the total station 5100 (substantially similar to total station 4908 of FIG. 49) comprising laser range finder 5126, tripod 5128 and assorted electronics and devices, locates a prism 5102 physically located on a mobile robot 5104 using laser range finder 5126 with beam 5130. The total station comprises software that executes the method of the present invention and which can direct the mobile robot 5104 to a specific location via wireless communications (i.e., using communication devices 5106 and 5108). The mobile robot 5104 is "blind," but the total station 5100 navigates the robot 5104 to allow this mobile robot 5104 to perform directed movement. The mobile robot 5104 also comprises a wireless communications device 5108 and a laser 5110. The mobile robot's laser 5110 can then illuminate, with a laser beam 5112, any point location requested by the total station 5100. This is useful since the total station is stationary, and some locations are not available to the total station by line-of-sight.

Figure 52:
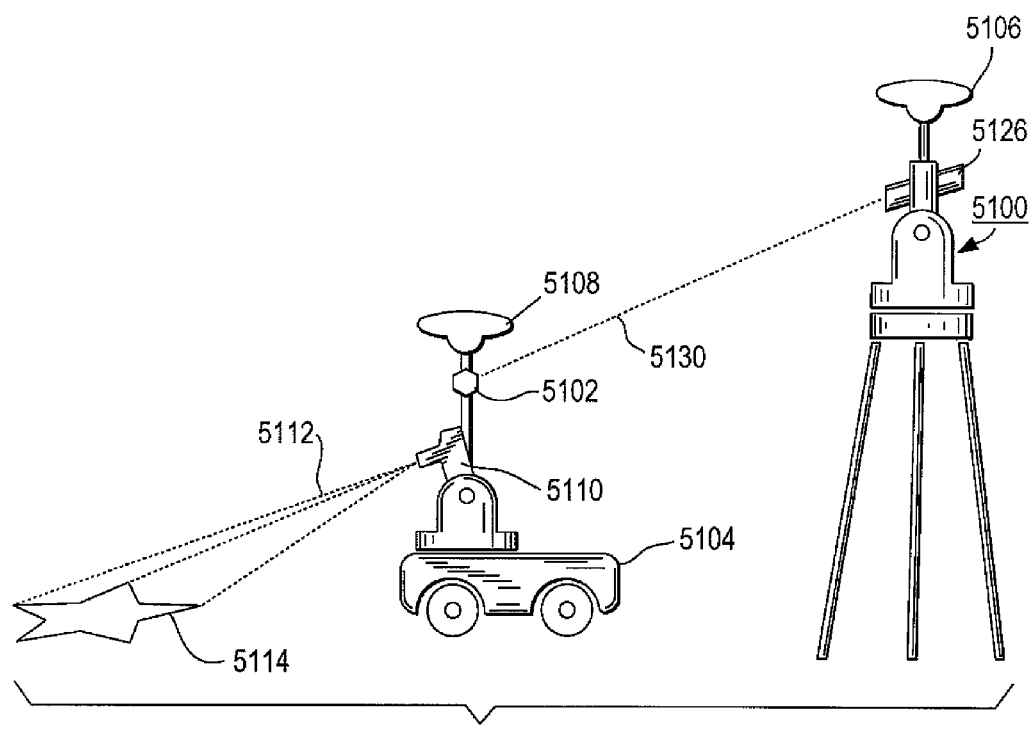
FIG. 52 is similar to the embodiment shown in FIG. 51 except that the marking is a projection vector overlay of a desired pattern.

FIG. 52 shows a fourth embodiment which is similar to the embodiment of FIG. 51, but wherein the mobile robot 5104 projects a graphic overlay on a surface by rapidly moving its laser beam 5112 according to a desired pattern 5114 to perform automatic layout as per the method of the present invention. This is useful where it is desired to indicate to construction workers where to place structural materials. For example, if it were to be desired that 12-inch pipe be laid vertically, the mobile robot laser would project a 12-inch diameter circle on the floor or horizontal surface.

Figure 53:
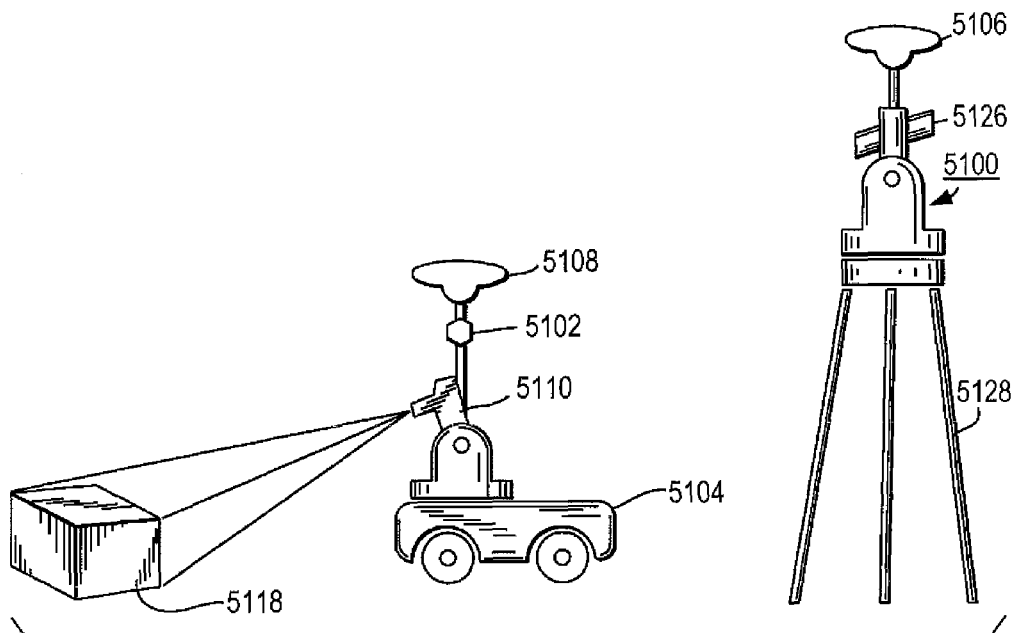
FIG. 53 is a fourth embodiment of the system of FIG. 49 wherein the pattern is a two-dimensional representation of a three-dimensional pattern.

FIG. 53 also shows the fourth embodiment similar to the embodiment described above in FIG. 51, where the pattern 5118 displayed is a two-dimensional projection of a three-dimensional overlay.

Figure 54:
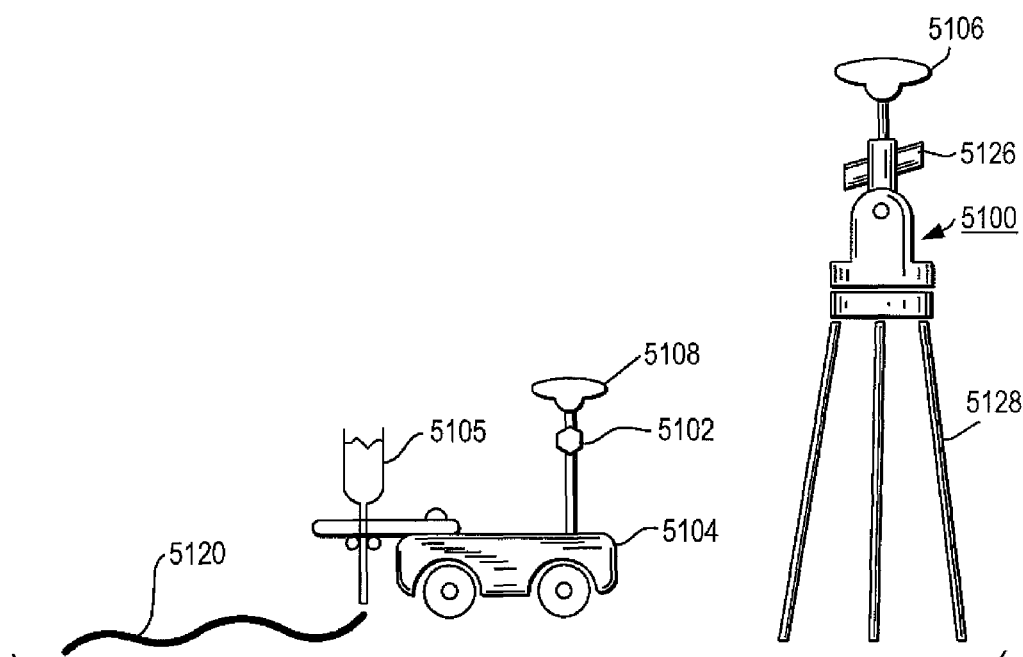
FIG. 54 is a fifth embodiment of the system of FIG. 49 wherein the Master Station module directs the mobile robot to use paint to mark positions on the ground.

FIG. 54 shows a fifth embodiment (substantially similar to that of FIG. 51) wherein the mobile robot 5104 armed with a paint tool arrangement 5105 is directed to specific position coordinates, and is directed to mark the floor with paint or dye 5120. For example, the entire plan view of a CAD drawing can be painted on the floor in this way.

Figure 55:
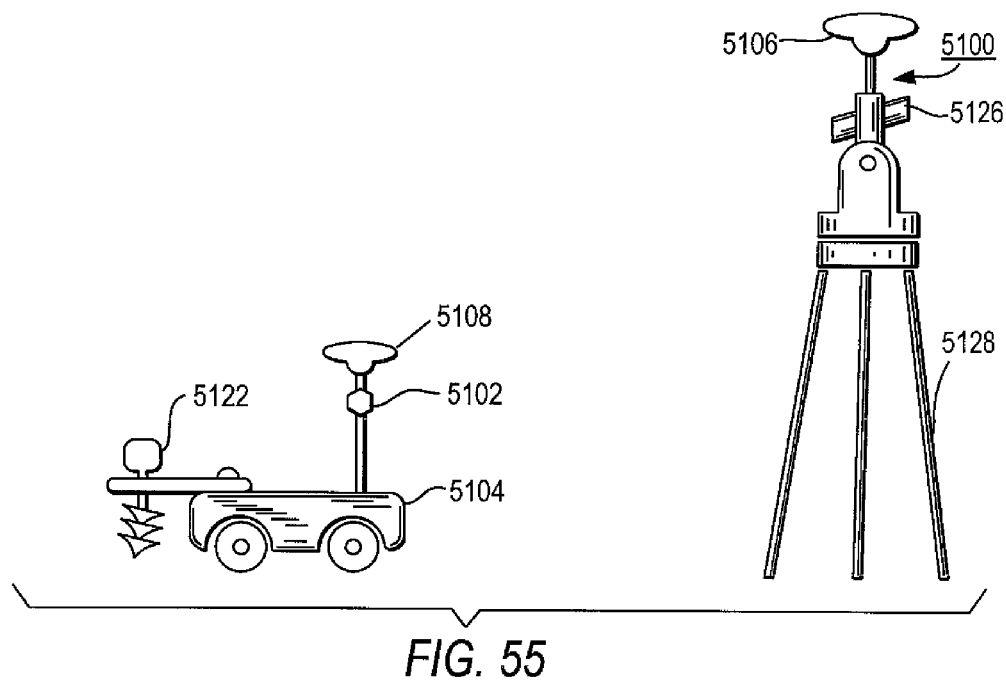
FIG. 55 is a sixth embodiment of the system of FIG. 49 wherein the Master station module directs the mobile robot to a location to perform a tooling operation (such as drilling)

FIG. 55 shows a sixth embodiment (substantially similar to that of FIG. 51) wherein the mobile robot 5104 is directed to specific position coordinates, and is directed to perform certain tooling operations such as drilling a hole in the floor with drilling tool 5122.

Figure 56:
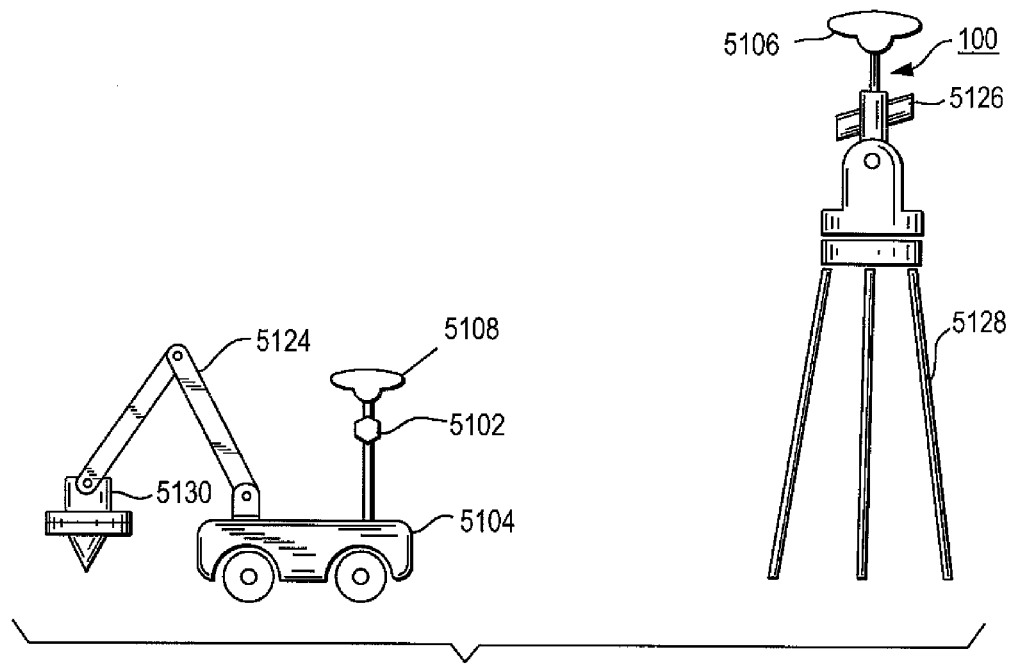
FIG. 56 is a seventh embodiment of the system of FIG. 49 wherein the Master station module directs the mobile robot to a location to perform metrology with a robot arm capable of measuring and marking a floor.

FIG. 56 shows a seventh embodiment wherein the mobile robot is directed to specific position coordinates to perform metrological measurements. The mobile robot has a mechanical arm 5124 to which a computerized measurement, pointing, or marking device 5130 is attached. The figure shows such metrology being performed.

Figure 57:
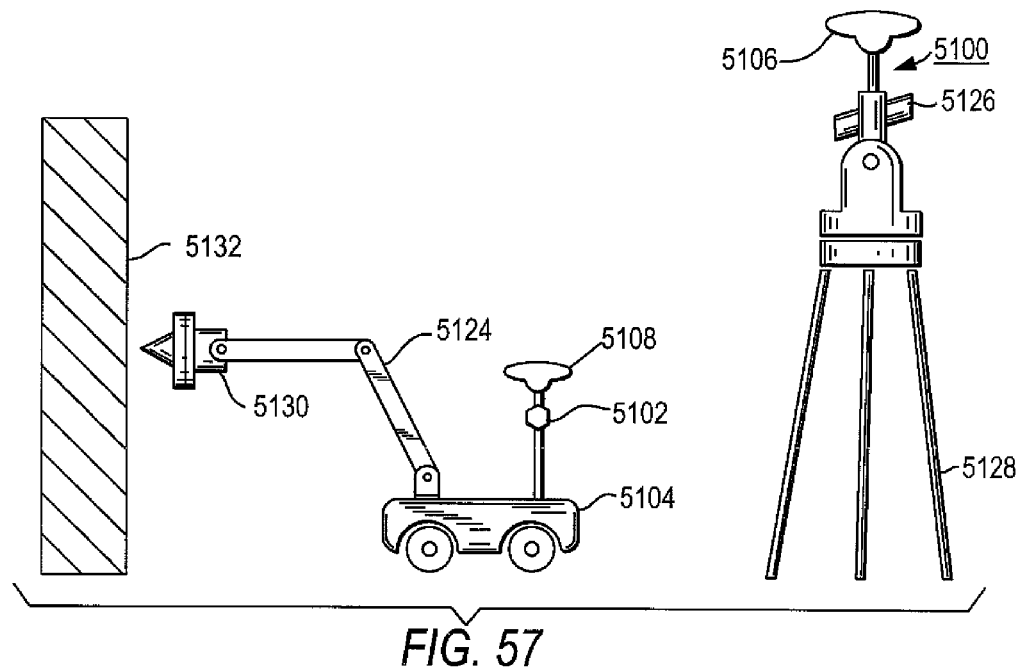
FIG. 57 is FIG. 56 wherein the measurement and marking take place on a wall.

FIG. 57 shows the seventh embodiment as described above, except that the metrology is being performed on a wall 5132.

Figure 58:
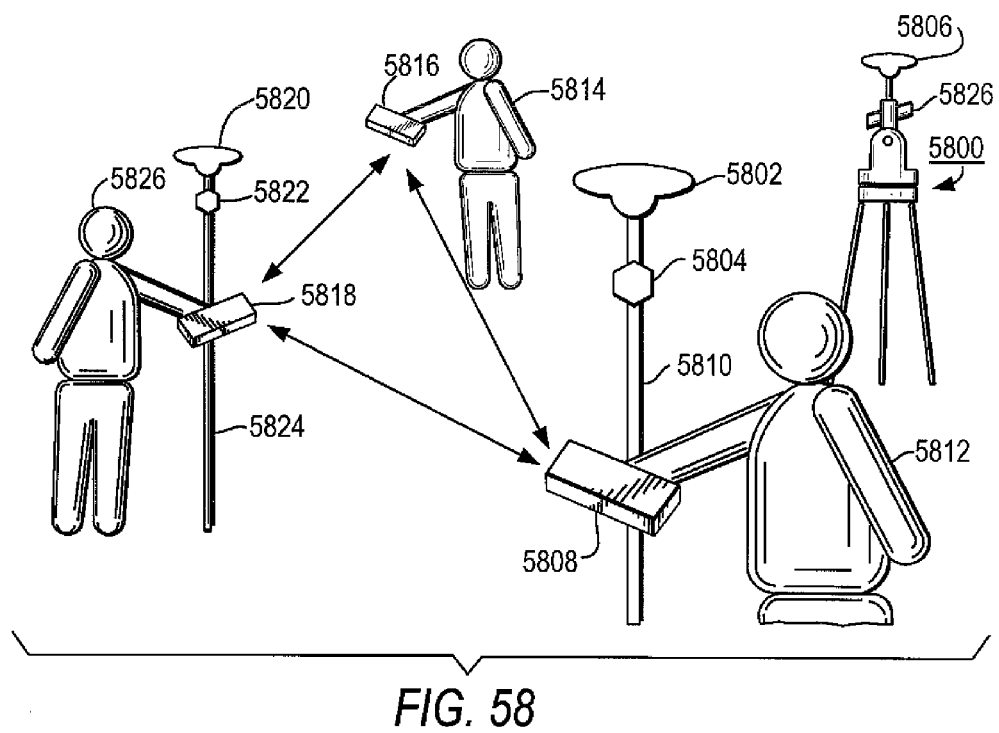
FIG. 58 is an eighth embodiment of the system of FIG. 49 except that the Master station module tracks multiple prisms, each communicating with a different handheld unit, and the handheld units communicate with each other.

FIG. 58. shows an eighth embodiment of the wherein the total station 5800 having laser range finder 5826, wireless communication device 5806 and assorted other equipment and electronics mounted on tripod 5828 communicates with a plurality of poles (e.g., 5810, 5824 having prisms 5804, 5822 respectively and wireless communication devices 5802, 5820 respectively). The handheld units 5808, 5816 and 5818 communicate with one another in a local area network (LAN). Also shown in the figure is a supervisor 5814 having a handheld unit 5816 that does not communicate with any of the poles but that communicates only with the other handheld units 5808, 5818 being used by users 5812 and 5826, respectively. The LAN can either have a client-server protocol or a peer-to-peer protocol. In any event, position coordinates of any handheld unit is known to every other handheld unit.

Figure 59A:
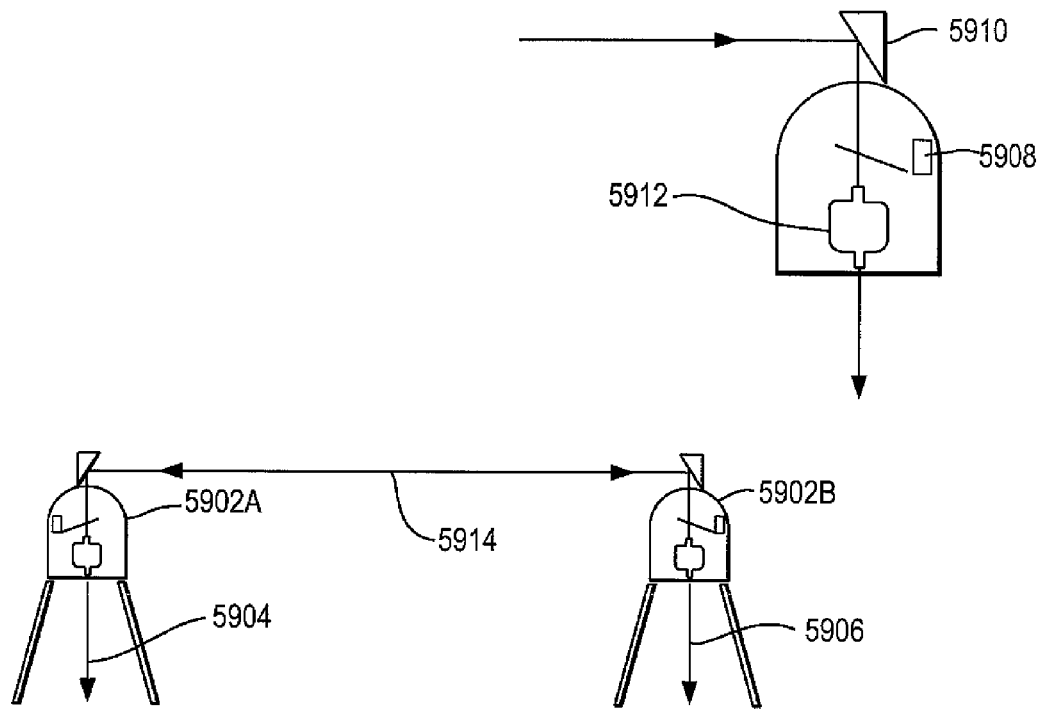
FIG. 59A shows an elevational view of two laser range finding units (viz., A and B) each capable of measuring both its vertical height as well as the horizontal distance to the other range finder.
Figure 60:
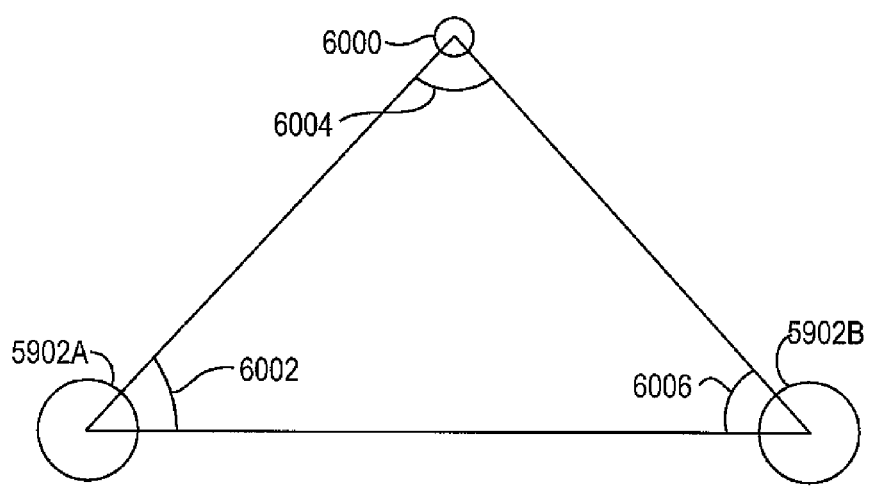
FIG. 60 shows a plan view of the configuration of FIG. 59 which additionally shows a target sensor for position triangulation.
Figure 61:
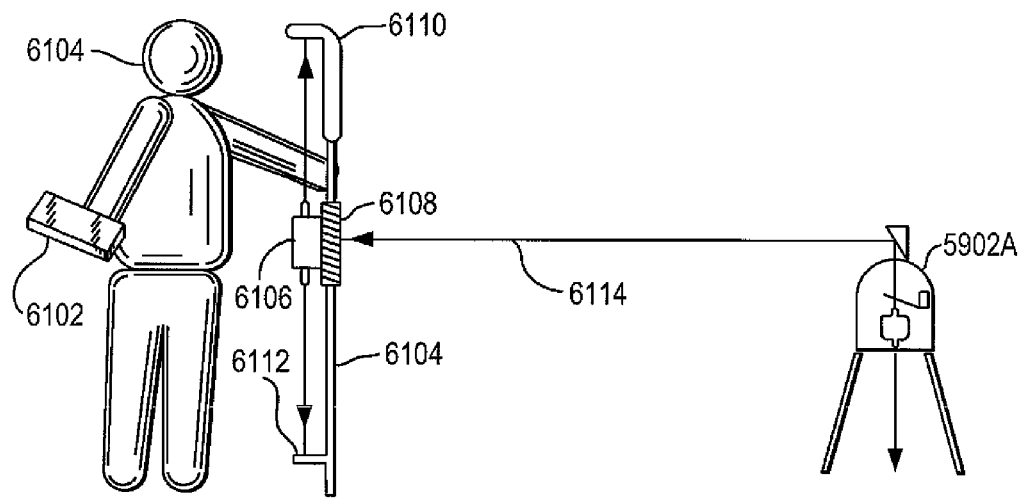
FIG. 61 shows a range finder that uses a special pole to provide distance and height measurement.

FIGS. 59-61 show a ninth embodiment. In this embodiment, in FIG. 59A, a total station is not employed. Instead, two stationary laser rangefinder units 5902A and 5902B connected to computers measure their vertical distance from the ground using laser beams 5904 and 5906 respectively and the distance separating them using beam 5914. As shown in FIG. 61, rangefinder 5902A is capable of communicating with to a Processor 6102 operated by user 6104. Details of a rangefinder unit are shown in FIG. 59B. Each rangefinder has a light sensor 5908, a rotating prism 5910, a laser 5912 and communication equipment(not shown). As shown in FIG. 60, the rangefinder units encode their own locations, and they send telemetric data to a target sensor 6000. The target sensor 6000 can read the distances to each of the rangefinder units 5902A, 5902B for triangulation as well as the angles 6004, 6002 and 6006 of the triangle formed. FIG. 61 shows an alternate method of accurately measuring the height of a rangefinder unit 5902A using a pole having a laser 6106 mounted on a movable unit 6104 with sensors 6108 along its height and mirrors 6110 and 6112 affixed at each end of the movable unit 6104. Once the sensor 6108 detects the rangefinder's laser beam 6114, the true height above a reference can be measured using the known position of the sensor array on the pole. The movable unit may also have communication devices (not shown) to transmit information to processor 6102 being operated by user 6104.

Figure 62B:
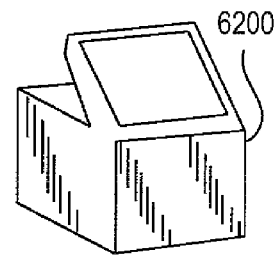
FIGS. 62A-B shows a handheld unit having an inertial measurement system comprising three gyroscopes and an accelerometer.
Figure 62A:
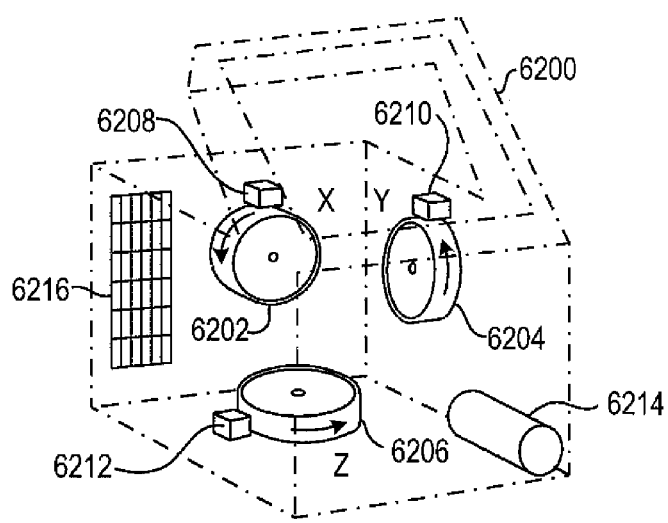

FIG. 62 shows a portable processor 6200 (see FIG. 62B showing external appearance) handheld unit that measures its position using three gyroscopes 6202, 6204, 6206 each having a sensor 6208, 6210, 6212 and the unit also uses an accelerometer 6214. The various devices within processor 6200 are shown in FIG. 62A. Communication of the handheld unit with other devices is performed using radio frequency signals with an RFID (Radio Frequency Identification) tag 6216 device. This portable processor can serve as part of an inertial guidance system using a multiplatform wireless handheld computer, PDA, laptop, tablet, etc. combined with inertial measurement hardware and or electronics and/or software that comprises one or more gyroscopes, a resonating ring to compensate for gyro drift and at least one highly accurate variable capacitance accelerometer. To initialize the unit the operator must first reference a control point in space.

II. Method of the Present Invention

The method of the present invention automates the processes associated with the creation of benchmarks, targets and/or provided references and other dimensional controls associated with the construction of a designed multi-dimensional space to perform an automatic study, an automatic layout or an automatic space verification or any combination of these three processes. Typically, prior to the commencement of the construction site, reference lines and benchmarks are provided by surveyors. These provided references are typically 2 lines perpendicular to each other forming a 2-dimensional plane representing an x-y coordinate system (perpendicular lines one of which is an x-axis and the other is a y-axis) established by surveyors as the lines from which measurements for positioning and/or orienting objects and structures by the tradesmen (e.g., carpenters, plumbers, electricians) at the construction site. Furthermore, surveyors, may also provide "benchmarks" which are specific points in the construction site measured from the provided reference lines to further enable tradesman to orient objects and/or structures within the construction site. Benchmarks are typically points offset from anywhere along reference lines and identified on existing structures (e.g., column) within the construction site. Thus, for example, if the reference lines for a 2-dimensional space are traced on the floor of the construction site, the benchmarks may be points measured from anywhere along either of the two reference lines where such point may lie within the x-y plane formed by the reference lines along a z-axis perpendicular to both the x and y axes, viz., a third dimension in a three dimensional space. Thus, the benchmarks are points of references that exist within an N-dimensional space where N is an integer equal to 2 or greater. A brief description of the different processes of the method of the present invention follows. A more detailed description of the overall method of the present invention then follows the brief descriptions.

A. Automatic Space Layout

In order to accurately lay out a construction site in the present invention, reference to the design data (i.e., virtual information) can be made. Accordingly, preferably in the present invention prior to the performance of an automatic layout, the virtual information (e.g., design drawings) are loaded into the Master station (i.e., in the Controller module); this step is depicted as step 6302 in FIG. 63. Next, the Master station can be oriented in the construction site with respect to the virtual information; that is, the Master station is to determine its location within the construction site based on virtual information for the construction site. In order to orient the Master station, the master station takes measurements of at least two separate known points (identified in the construction site and in the virtual space) to triangulate its precise position within the construction site. This triangulation step is depicted in FIG. 19 discussed above.

Referring temporarily to FIG. 19, a master station module 1902 is placed in a construction site 1900. In order to triangulate and calculate its precise position within the site 1900, measurements are taken by the master station module 1902 of its position in the construction site relative to reference points 1904. The positions of reference points 1904 are known with respect to the stored design drawings. Thus, once the distance of the master station module 1902 from the reference point is determined, the distances are compared to the known positions of reference stations 1904 in the virtual information and the position of the master station module is triangulated to determine it position in the construction site; this step is depicted as step 6304 of FIG. 63. Once the position of the master station within the construction site is determined, desired benchmarks (e.g., precise locations of objects, structures or reference points) from the virtual information (e.g., drawings) can be located marked or indicated by, for example, projections by a laser mounted on the master station module onto surfaces contained within the construction site. This step is depicted as step 6306 of FIG. 63. A virtual space representing the studied multi-dimensional space can then be generated and such a space can be displayed when desired.

B. Automatic Space Study

During study of a space, the method of the present invention comprises the following steps:
1. Orientation of the Master station within the space to be studied;
2. Measurement of benchmarks within the space being studied; and
3. Creation of a digital rendering of the space being studied.

The orientation of the master station during an automatic site study is accomplished by selecting at least two points within the construction site as benchmarks and measuring their distance from the master station; this step is shown as step 6402 of FIG. 64. Once the benchmarks are established and the master station is oriented, distances from the master station to locations of interest can be recorded by a laser on the master station; this is shown as step 6404 of FIG. 64. The recorded distances in conjunction with measurements of various objects and/or structures that may exist in the construction site are then used by the master station to automatically create, in real time, a virtual space representing the multi-dimensional space (e.g., graphical representation; for example, a drawing or other type of representation for a multi-dimensional space) of the construction site based on the measurements made in the multi-dimensional space; this step is shown as step 6406 of FIG. 64.

C. Automatic Space Verification

During verification of a space, the method of the present invention comprises the following steps:
1. Orientation of the Master station within the space to be verified;
2. Measurement of benchmarks within the space being verified;
3. Comparison of measured benchmark data with stored design data; and
4. Determining the degree of correspondence between measured benchmark data and stored design data.

During automatic space verification, the virtual information (e.g., design drawings) are retrieved and the master station module is oriented within the construction site as outlined with respect to the automatic layout step; these steps are depicted as steps 6502 and 6504 of FIG. 65. Once the master station is oriented within the construction site, distances between the master station and selected locations within the construction site are compared with distances to the same locations in the stored design drawings on the master station. This is described by step 6506, of FIG. 65 which may also include a mapping of points in the multi-dimensional space (construction site) to point in the virtual space. Following step 6506, any discrepancies between the measured distances and the distances from the virtual information are noted and displayed by the master station; this step is depicted as step 6508 of FIG. 65. In this manner, the master station can verify how accurately the construction site has been built relative to the virtual space which can be represented as design drawings.

D. Overall Description of the Method of the Present Invention

The present invention provides a system and method for the automatic generation of an N-dimensional graphical representation of a multidimensional space where N is an integer equal to 2 or greater. For ease of explanation and clarity of description, the system and method of the present invention will be described in the context of a construction project in which structures and/or objects are constructed, arranged, positioned and oriented with respect to each other in a multidimensional space whose specific physical characteristics are represented in a drawing such as a CAD (Computer Aided Design) drawing generated by an architect and/or engineer or other construction professional. It will be understood that the method and system of the present invention are not limited to automatic study and/or layout of a construction project, but encompasses the rearrangement of any multidimensional space using objects and/or structures already existing in the space or introduced into the space.

The method of performing an automatic study of a multi-dimensional space (e.g., a 3D space) using the system of the present invention involves the measurement of distances from system equipment to one or more selected points of reference within the multi-dimensional space and the measurement of distances from system equipment to various existing objects and structures within the multi-dimensional space. These measurements are used by the system of the invention to generate automatically, in real time, a drawing (which may be in digital format) or graphical representation of the multidimensional space based on the measurements made by the system equipment at least part of which is located within the multidimensional space. In general, the measurements can be made between any two identified points in the multidimensional space.

Moreover, in addition to creating a graphical representation, in real time, of the multi-dimensional space being studied, the system of the present invention can also show the position, in real time, of one of its components (e.g., a target) relative to the measured locations of the multi-dimensional space being studied. When such component is affixed to a user or is possessed by a user of the system, the method and system is thus able to display the location of the user within the space being studied or within a virtual space overlaid on the space being studied to guide the user through the spaces.

The automatic layout of the multidimensional space, (e.g., a construction site) in accordance with the method and system of the present invention involves using points of references such as benchmarks and targets to establish the location, position and orientation of one or more structures and/or objects designated to be disposed within the multi-dimensional space. Typically a design for the development of a multi-dimensional space is memorialized as one or more drawings (e.g., CAD or Computer Aided Design drawings) that precisely depict the spatial relationships between objects and/or structures of the multi-dimensional space to be constructed. The design, when depicted graphically, represents a virtual space having specific physical features. During the execution of the automatic layout of the multi-dimensional space by a user of the system of the present invention, the system, with reference to the design drawings, orients itself within the multi-dimensional space and then points out the precise location of selected objects and/or structures contained in the design drawings as they would translate to the multi-dimensional space. Thus, the present invention is able to guide the user within the multi-dimensional space to a single point (or area or volume or other higher dimensional region) enabling the user to make markings within the multi-dimensional space indicating the specific positioning, orientation and/or arrangement of objects and/or structures to be constructed at or within the boundaries of the multi-dimensional space. In one embodiment of the present invention, the user is able to control equipment of the system of the present invention to automatically make the markings for structures and/or objects specified in the design.

The system of the present invention comprises components including at least one Master station, a Processor, and one or more targets. The components of the system of the present invention are in communication with each other to allow the system to perform an automatic study and layout of a multidimensional space. During the study and/or layout of the multidimensional space, the system can guide a user within the multi-dimensional space by displaying the multi-dimensional space (e.g., a 3D graphics representation), including known or already studied objects and/or structures and the user's current physical location simultaneously effectively guiding the user within the multi-dimensional space and effectively indicating to the user where to make markings when the user is performing a layout of the multidimensional space. Further, the system of the present invention can display the virtual space as an overlay to the multi-dimensional space depiction. Thus, as the user physically moves within the multi-dimensional space, the system of the present invention is able to track the user's location and display said location within the graphical representation of the actual and/or virtual space in real time.

As will be clearly shown throughout this specification, a task is done 'automatically' when some or all of the steps needed to complete the task are performed by the system equipment of the present invention in accordance with the method of the present invention. Some or all of the final steps for the various tasks discussed herein are performed by the system equipment which may be directed by firmware and/or software embedded in such equipment; such tasks are thus performed automatically.

Virtual space is visual representation or mathematical representation of a multi-dimensional space that can be depicted based on information (e.g., graphical and/or textual) describing the boundaries, particular objects and or structures of a design for the construction site, the positioning and orientation of the objects and/or structures with respect to each other and with respect to designated established points of references in the multi-dimensional space and the actual physical dimensions of the defined objects and/or structures. Information memorializing the design is referred to as virtual information. One example of virtual information is a set of drawings (e.g., 2D or 3D CAD (Computer Aided Design) drawings) generated by an architect or engineer for a construction project. Hereinafter, the terms "construction site" and "multi-dimensional space" will be used interchangeably.

The term "study" as used herein refers to the process of a user (preferably an Architectural Navigator) using the system of the present invention in accordance with the method of the present invention to locate reference points and other specified locations (e.g., monuments, benchmarks) in a construction site, measure distances between these specified points, identify existing structures and/or objects within the construction site, measure the actual physical dimensions of the existing objects and/or structures and measure distances between existing objects and/or structures located within the construction site to automatically generate a representation (e.g., graphical—2D or 3D CAD drawing or other type of representation) of the construction site in real time, i.e., as the study is being done. The reference points are specifically defined points or locations within the construction site that are designated as points from which measurements are initially done. Reference points are usually identified in the virtual information by the designers (e.g., architects, engineers) and are usually marked at the multi-dimensional space by an on-site surveyor of the multi-dimensional space. The information generated from the study may become part of the virtual information.

The term "layout" as used herein refers to the process of automatically identifying, in real time, the precise location of specific point and/or the location, orientation and arrangement of objects and structures within a construction site based on reference points and virtual information generated from a design and/or study. The layout process may also involve the guiding of the user of the system within the multi-dimensional space being laid out to a precise location. The precise location can then be marked by the user or the user of the present invention can use the equipment that is part of the system of the present invention to automatically mark the locations of the objects and structures within the construction site.

The system and method of the present invention enable a user to execute a study and/or a layout of a construction site by performing a mapping between the construction site (i.e., multi-dimensional space) and the virtual space. A mapping refers to specifying a known point in one space and calculating or determining a corresponding point in another space where there is a well defined relationship (e.g., mathematical) between the two spaces. For example, as is done during the layout, a mapping from the virtual space to the multi-dimensional space occurs when the method of the present invention applies the well defined relationship to a point within the designer's drawings to determine or calculate the location of the corresponding point in the multi-dimensional space.

As discussed earlier in this specification and repeated here for ease of reading, the term "construction site" as used in this specification is understood to encompass any multidimensional space with defined boundaries within which construction of objects and structures and their positioning and orientation with respect to each other can be performed; the construction site also includes any multi-dimensional space in which part or all of the construction has been done. Thus, the terms "construction site" and "multidimensional space" will hereinafter be used interchangeably.

The method of the present invention automates the processes associated with using points of references such as benchmarks, targets and/or provided references to perform an automatic study or an automatic layout or both of a multidimensional space. Typically, prior to the commencement of construction at a construction site, reference lines and benchmarks are provided by surveyors. These provided references are typically 2 lines perpendicular to each other forming a 2-dimensional plane representing an x-y coordinate system (perpendicular lines one of which is an x axis and the other is a y axis) established by surveyors as the lines from which measurements for positioning and/or orienting objects and structures by the tradesmen (e.g., carpenters, plumbers, electricians) at the construction site. Furthermore, surveyors may also provide "benchmarks" which are specific points in the construction site measured from the provided reference lines to further enable tradesman to orient objects and/or structures within the construction site. Benchmarks are typically points offset from anywhere along the reference lines and identified on existing structures (e.g., column) within the construction site. Thus, for example, if the reference lines for a 2-dimensional space are traced on the floor of the construction site, the benchmarks may be points measured from anywhere along either of the two reference lines where such point may lie within the x-y plane formed by the reference lines of may lie along a z-axis perpendicular to both the x and y in a third dimension three dimensional space. Thus, the benchmarks are points of references that exist within an N-dimensional space where N is an integer equal to 2 or greater.

E. Specific Steps of the Method of the Present Invention

The method of the present invention allows a user to introduce targets, within the multidimensional space, which are additional points of references that are to be used during a study and/or layout of the multidimensional space. The targets differ from the benchmarks in that they are devices arbitrarily positioned throughout the multidimensional space that can receive and transmit (actively or passively) information to the system of the present invention to establish additional points of references. For example, a target may be a relatively small square shaped flat material having a reflective surface which can reflect infrared or other electromagnetic signal (light, radio signal, laser beam) to allow a point of reference within the multidimensional space to be established and documented by the system of the present invention. Such target can be affixed onto various surfaces within the multidimensional space by a user of the system of the present invention to allow for the automatic study and/or layout of the multidimensional space. Another example of a target is a prism located on a pole positioned within the construction space. Targets can be stationary or mobile. An active target may generate and transmit signals to other equipment of the system of the present invention to indicate its position within the multidimensional space. A passive target reflects energy it receives from other components or equipment of the system of the present invention to indicated its location within the multidimensional space.

Various embodiments of the system of the present invention are shown in FIGS. 1, 1A, 1B, 2 and 3. In the system embodiments shown the method of the present invention can be implemented as a software program residing in a Processor device (e.g., laptop computer). The processor device is any device on which software executes the steps of the method of the present invention as commands to various other components of the system to execute the automatic study and/or layout of the multidimensional space.

The System Software hereinafter referred to as Theocad (SM) can be implemented as a part of Computer Aided Design (CAD) software such as AutoCAD® software that allows a user to generate a graphical representation of a multidimensional space. The software also has a graphical user interface (GUI) built for ease of use within the construction and architectural marketplace. In this manner, Theocad (SM) is seamlessly integrated within AutoCAD® to take advantage of the graphic generating capabilities of such software. It should be noted that Theocad (SM) can be implemented as a standalone software package that can generate its own graphics. Theocad (SM) is geared to performing specific location, navigation, reading and writing construction tasks rapidly.

Theocad (SM) can be located within a handheld, laptop, tablet or desktop computer or other Processor with the ability to communicate with (send information to or receive information) a Master station module. The information can be commands and/or responses generated by the Master station module or the Processor. The Processor can be any microprocessor, microcontroller, microcomputer, mainframe computer, desktop computer or other processing device which can execute instructions in the form of a software program and which has a display for displaying graphics. The Master station module can be any well known device that can measure, distance, angle and otherwise location of reference lines, benchmarks and targets disposed within the multidimensional space. For example, the Master station module shown in FIG. 1A can be a device commonly referred to as a total station and one particular applicable total station can be, for example, a Leica Geosystems Series 1200 Model 3. The Leica 1200 total station is able to resolve a location at a 1000 feet distance with a precision of ±3/16 of an inch within a 3 second period. The Leica 1200 Series Model 3 total station is able to track a moving prism and thus track any mobile device to which measure distance to targets such as prisms and other reflective targets. The System Software thus can function as distance measurement, navigation and documentation control software. The System Software sends commands to and receives telemetry back from the Master Station. The System Software sends commands to the Master Station firmware telling it to perform specified tasks on demand (e.g., turn in a specified direction or move up or down to a particular angular position, turn the visible laser pointer on or off, measure distance or angle etc.). The Master Station responds by executing the requested functions and then sending performance or measurement telemetry back to the System Software. It should be noted that all of the Software (e.g., TheoCAD and AutoCAD) can be located in the Processor, in the Master Station or portions of the software can reside in both the Processor and the Master station.

Referring temporarily to FIG. 49, there is shown an embodiment of the system of the present invention comprising Master station module 4902 (shown as a stationary robotic device) having a tripod 4904), laser range finder 4906 a wireless communications device 4908 (including an antenna) located on top, and a computer and user interface 4910. The system further comprises Processor 4918 and at least one target such as prism 4912. Master station module, implemented as a total station is a robotic device that moves laser 4906 to constantly track prism 4912 located on pole 4914 which is similar to a surveyor's pole, except that it too has a wireless communications device 4916 located at one of its ends as shown. The total station knows the location of the prism, and that location is communicated to Processor 4918 through communication device 4916 by Master station module 4910. Communication device 4916 is coupled to Processor 4918 and is used by Processor 4918 to receive and/or transmit information to Master station module 4902 which has its own communication device 4908. Communication devices 4908 and 4916 can be any type of wireless communication devices that are able to exchange information with each other in accordance with a protocol. A protocol is a set of rules that dictate how information is formatted, transmitted, received and interpreted by devices which transmit and/or receive information. The protocol may be a well known protocol or one designed by the manufacturer of the system of the present invention. Should communication of the location of the prism be interrupted, Master station module 4902 would institute a search pattern program in order to find the prism. Because Processor 4918 is attached to pole 4914, the location of Processor 4918 within the construction site can be determined by Master station module 4902. More specifically, Master station module 4902 is able to determine its location within the construction site using the well known procedure of triangulation. Therefore, because Master station module 4902 knows its location and the relative location of Processor 4918, the location of Processor 4918 within the construction site can also be determined by Master station module 4902. Thus Processor 4918 is shown as a portable processing device executing AutoCAD® and TheoCAD (SM) software device is loaded with special software that displays modified CAD drawings of a site (both plan and elevational views), to form a virtual map of a construction site. So, the handheld device can now overlay its position on the virtual map.

In a first step of the method of the present invention, the communication devices (master station module substations such as targets, substations and other devices) establish communication with each other. The Master station module, targets, and Processor executing the method of the present invention in the form of a computer program may also have communication devices associated with them. Upon the initial activation of the system of the present invention (i.e., system is first turned ON), the various communication links between the different communication devices are established. The establishment of the communication link between any two devices entails confirming that the devices are ON and that the devices can communicate with each other. Further, the communication between the devices is such that they can correctly interpret each other's information. Typically a handshaking procedure between two devices is used to establish a link between the two devices. The link is thus the ability to effectively communicate in accordance with a protocol being followed by the system.

In the second step of the method of the present invention, the various points of references are identified and located. Surveyors typically provide reference lines and benchmarks. Additionally targets strategically positioned through the construction site are also located and identified. Furthermore, the Master station is positioned within the construction site with respect to the reference lines or the benchmarks or the targets. There may be occasions where there are no reference lines available at the construction site. In such occasions the targets are used as reference points with respect to which the Master station is positioned. The benchmarks and reference lines may be indicated in a CAD drawing of the multidimensional space where said drawing is stored in the Processor (e.g., processor that is part of a laptop or a handheld unit as shown in FIG. 1A or FIG. 49) of the system or can be downloaded into the Processor of the system. Targets are installed or affixed to various points within the construction site by the user and thus presumably their locations are known by the user. When a Leica model 1200 total station is used as a Master station, it can automatically locate certain types of targets such as a prism.

In the third step of the method of the present invention, the various points of reference are measured using the Leica Model 1200 total station (e.g., Master station 4902 of FIG. 49). In particular the distances from the points of reference to the Master station and the angles (vertical and horizontal) of the reference points with respect to the Master station are measured and stored in the total station. The total station transmits this information to the Processor (e.g., Processor 504 of FIG. 49). The Processor (such as Processor 504 of FIG. 49) which is under the control of TheoCAD (SM) using AutoCAD® as a platform is able to process said information to generate at least two specific types of information leading to the $4^{th}$ and $5^{th}$ steps of the method of the present invention. It should be noted that TheoCAD (SM) may be used as standalone software and use its own set of instructions to generate the information discussed in the $4^{th}$ and $5^{th}$ steps of the method of the present invention.

In the fourth step of the method of the present invention, the TheoCAD (SM) software calculates, though the well known process of triangulation, the location of the Master station within the multidimensional space being studied. At least two reference points are used to determine the location of the Master station. The TheoCAD and AutoCAD software residing in the Processor use at least two reference point locations to determine the actual location of the Master station and display said location in a display of the Processor. In construction sites where satellite signals are accessible, the method of the present invention can use the well known GPS (Global Positioning System) to determine the location of the Master station and thus the location of the Processor.

In the fifth step of the method of the present invention, the TheoCAD and AutoCAD software are able to generate 3-dimensional graphical representation of the construction site as the reference points are located, identified, measured, stored and processed as described above. Additionally, other reference points of the space that are not targets but are non-reflective surfaces can be used to help generate the 3-dimensional graphics. A stored CAD drawing of the construction site separately generated by an engineer or architect (not using the system of the present invention) can be downloaded onto the Processor and then aligned, through a mapping operation, with the 3-dimensional graphical representation of the construction site generated by the system of the present invention. The mapping operation is specifying a known point in one space and calculating or determining a corresponding point in another space where there is a well defined relationship (e.g., mathematical) between the two spaces. With the two spaces aligned, a user can readily see the discrepancies between the studied space and a space separately generated by an architect of the construction site. As each point is generated the connections between points are also generated allowing the system of the present invention to generate a 3-dimensional graphical representation of the construction site in real time. Further, the location of the Processor which may be held by a user and tracked by the Master station can also be displayed simultaneously with the space being generated and the overlaid space separately generated using AutoCAD, for example, by an architect. In this manner, the user of the system of the present invention can operate said system using the method of the present invention to navigate a virtual space and also to make markings in the actual space that represent the location of objects and/or structures of the virtual space. That is, the user of the system can be guided by said system in real time to perform a layout of the construction site.

The method of the present invention can thus perform the automatic study, layout and/or automatic verification of a multidimensional space as per the above steps. Some particular functions and features associated with these various processes of the method of the present invention and, in particular, with the measuring of distances, locating of targets, measuring of angles of targets, benchmarks, reference points, standard methods and techniques used for measurements that are specific to the construction industry follow.

1. Coordinate Systems—Added support for Great Britain (OSGB-36), Australia (GDA-MGA, AGD84-AMG, AGD84-ISG, AGD66-AMG, AGD66-ISG), New Zealand (NZGD2000, NZGD49), Puerto Rico State Plane 83 and France (NTF-GR3DF97A). There is also a new user-defined datum and projection method. The datum definition consists of a Helmert 7-parameter datum shift with lookup tables for ellipsoids and datum shift values. The ellipsoid can also be user-defined. The user-defined projection supports Transverse Mercator, Lambert Conformal Conic 1 SP/2 SP, Double Stereographic, Oblique Mercator and Oblique Stereographic.
2. Geoid Support—Added support for geoids of Great Britain (OSGM02), Australia (GDA94) and Canada (CGG2000, HT 2.0, HT 1.01).
3. Coordinate Order—Added the option whether coordinates are reported in northing-easting or easting-northing order.
4. Align Local Coordinates—For two point alignments, added the option for rotate-only where the first control point is used for translation and the second is used only for rotation. Added a report function to make a report of the localization control and GPS reference coordinates.
5. Multiple Measurements—The same point number can be measured multiple times and the program will average the coordinates for the point. Before accepting a new measurement, the program reports the statistics on how the new measurement effects the average.
6. Pitch Adjustment—For GPS, there is a new option to calculate the pitch based on the path of GPS positions. This pitch is then used to correct the position for below the antenna in Auto Points At Interval, Store Points, Track Position, Centerline Position and Elevation Difference. This option applies when mounting on a vehicle like an ATV.
7. Store Point Added a toggle for "No Elevation" to create the points at zero elevation. For GPS, there is a new option to automatically start this routine in continuous read mode.
8. Stakeout—The screen pick point option has been improved to allow you to select from different snaps before picking the point.
9. Field To Finish Added support for user-defined special codes such as start/stop and PC/PT. Also added support for split multiple codes for linework. In Store Point, there is a new toggle to Join linework to a previous point.
10. Centerline Position—Added an option to use a profile to report cut/fill. Also added an option to use an light bar for guiding arrows based on left/right offset.
11. Elevation Difference—Added the option to use road design and cross section files to define the surface. These files include centerline, profile, template, section, superelevation and template transition. The program will calculate the design elevation for your current position from the road or section files and report the cut/fill and station/offset.
12. Point Check By Robotic—This is a new command to automatically take a series of direct-reverse shots to known coordinates and generate a report of the difference between the known coordinates and the coordinates calculated from the measurements.
13. GPS Equipment Setup—A text file can be used for sending multiple commands to the receiver. ALTUS GPS & Partnership relations.
14. Ashtech—Added function to reset the RTK solution. Added a configuration option for whether to enable the receiver warning beep.
15. InnerSpace—Added support for the InnerSpace Tech depth sounder.
16. Leica GPS—Added support for using cell phones for the RTK messaging.
17. Sokkia Laser—Added support for the Sokkia Contour Laser. True Field-to-Finish!
18. Create a new drawing or update existing drawings directly in the field.
19. Stake points by point number or simply pick endpoints or intersections of entities to stakeout.
20. Cut & Fill automatically displayed for staked points with elevation or along any TIN or Grid terrain model.
21. Station and offset reporting instantly for GPS or for Total Station stored points along any centerline created and loaded in Carlson Survey.
22. Unlimited 6th field GIS smart prompting for direct storage to a MDB database table, form or report.
23. Carlson Field 2007, coupled with Carlson 2007's GIS Module, quickly becomes the true Data Link that Planning and GIS professionals need and demand.
24. Data Capture routines from SurvStar into AutoCAD MAP using our GIS Plus software entirely automate downloading, review/edit collected GIS info and create or update MDB GIS database tables.
25. All GIS point data is automatically drawn layerized, with specific corner symbols, sized with line work using Carlson Software's Field-to-Finish routine. GIS point data is linked to the database all in one step.
26. Carlson Field 2007 collects and stores points directly in the AutoCAD 2007 DWG format.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A system for measuring, mapping, and navigating within a multi-dimensional space comprising:
    a) a master station subsystem further comprising:
        1) a computing platform additionally comprising:
            I. a controller module having a computing processor and system software;
            II. a data storage module;

III. an input/output interface module;
IV. an actuator; and
V. a display;
wherein the controller module is coupled to the data storage module and the input/output interface module;
the input/output interface module is additionally coupled to the actuator and the display; and
the actuator is additionally coupled to the display;
2) a master station module, which further comprises:
I. at least one multi-channel transmitter;
II. at least one multi-channel receiver; and
III. at least one processor;
wherein the master station module is coupled to the controller module;
3) at least one robotic device coupled to the master station module; and
4) a first signal propagation device coupled to the master station module, wherein the first signal propagation device is capable of transmitting and receiving electromagnetic signals;
b) an external data source coupled to the data storage module; and
c) at least one substation not physically connected to the master station subsystem, wherein said substation further comprises:
I. a controllable robotic mechanism;
II. a computer processor coupled to the controllable robotic mechanism;
III. a receiver of electromagnetic signals coupled to the computer processor;
IV. a transmitter of electromagnetic signals also coupled to the computer processor; and
V. a second signal propagation device coupled to both the receiver and transmitter, wherein the second signal propagation device is capable of transmitting and receiving electromagnetic signals;
wherein the master station subsystem utilizes electromagnetic signals generated by the first signal propagation device to measure distances using triangulation and time-of-flight and to control the robotic movement of the at least one substation; and
wherein the system software performs an automatic site layout, study, and verification by:
d) loading a design layout into the data storage module to create a virtual model of the multi-dimensional space;
e) orienting the first signal propagation device several times to take measurements, thereby locating the position of the master station subsystem relative to the fixed reference points within the multidimensional space via triangulation,
wherein at least some of said measurements are taken from said transmitted and impinging laser beams from said lasers in first and second signal propagation devices; and wherein all of said robotic mechanisms in said one or more substations are autonomous vehicles and wherein said laser beams are received by a first prismatic target comprising one or more corner cube prisms on said first propagation device and wherein said laser beams are received by a second prismatic target comprising one or more corner cube prisms on said one or more second propagation devices and
wherein said measurements are taken after at least one master station subsystem has self leveled itself;
f) comparing the locations of the fixed reference points in the multidimensional space to their respective representations in the virtual model in order to make markings on the virtual model for a structure and/or objects specified in said design.

2. The system of claim 1 wherein the actuator of the master station subsystem computing platform is a keyboard, mouse, or joystick.

3. The system of claim 1 wherein the external data source is coupled to the data storage module using a wireless modem.

4. The system of claim 1 wherein the first signal propagation device comprises a laser, and the electromagnetic signal transmitted therefrom is a laser beam.

5. The system of claim 4 wherein the first signal propagation device comprises a sensor capable of receiving and processing an impinging laser beam.

6. The system of claim 4 wherein a user selects a destination point in the multi-dimensional space and inputs the location of that destination point within a computer representation of the multi-dimensional space using the actuator, thereby causing the first signal propagation device to point its laser at and illuminate said destination point with a laser beam.

7. The system of claim 4 further comprising a portable handheld measuring device comprising a plurality of corner cube prisms.

8. The system of claim 7 further comprising horizontal and vertical spinning lasers.

9. The system of claim 1 wherein the robotic device coupled to the master station module is a vehicle, the movement of which is controlled by the controller module.

10. The system of claim 9 wherein the movement of the vehicle is initiated by a user who inputs instructions to the controller module using the actuator via the input/output interface module.

11. The system of claim 1 further comprising a robotic tool to perform marking, fabrication or assembly, the movement of which is controlled by the controller module.

12. The system of claim 11 wherein the movement of the robotic tool is initiated by a user who inputs instructions to the controller module using the actuator via the input/output interface module.

13. The system of claim 1 wherein the at least one robotic device coupled to the master station module is capable of autonomous operation which is controlled by the controller module.

14. The system of claim 1 wherein the first signal propagation device further comprises optical elements.

15. The system of claim 14 wherein the first signal propagation device further comprises a camera coupled with the optical elements to provide a reflex view of a target.

16. The system of claim 15 wherein the image produced by the camera is presented on the display.

17. The system of claim 1 wherein the second signal propagation device comprises a laser, and the electromagnetic signal transmitted therefrom is a laser beam.

18. The system of claim 17 wherein the second signal propagation device comprises a sensor capable of receiving and processing an impinging laser beam.

19. The system of claim 17 wherein a user selects a destination point in the multi-dimensional space and inputs the location of that destination point within a computer representation of the multi-dimensional space using the actuator, thereby causing the second propagation device to point its laser at and illuminate said destination point with a laser beam.

20. The system of claim 1 wherein the first signal propagation device comprises a first prismatic target that further comprises a corner cube prism.

21. The system of claim 1 wherein the second signal propagation device comprises a second prismatic target that further comprises a corner cube prism.

22. The system of claim 1 further comprising at least one passive device that reflects signals from the first or second signal propagation device.

23. The system of claim 22 wherein the at least one passive device comprises a third prismatic target that further comprises a corner cube prism.

24. The system of claim 23 further comprising a laser that causes a laser beam to impinge on a ceiling or floor surface that is used to enable the at least one passive device to self-level.

25. The system of claim 24 wherein the at least one passive device is mounted on a tripod.

26. The system of claim 22 wherein the positions of the master station subsystem relative to fixed reference points and the position of the at least one passive device relative to the master station subsystem is presented on the display along with the positions of the fixed reference points.

27. The system of claim 22 wherein a user enters and moves about the multi-dimensional space holding the at least one passive device such that the master station subsystem or a substation tracks the location of the user via signals reflected from said at least one passive device.

28. The system of claim 27 wherein the user has a device that displays the user's location with the multi-dimensional space relative to the master station subsystem.

29. The system of claim 28 wherein the device that displays the user's location guides the user through the multi-dimensional space to a destination point previously selected by the user.

30. The system of claim 22 wherein the at least one passive device is able to uniquely identify itself to the master station subsystem or the at least one substation.

31. The system of claim 30 wherein said identification is done by reflection of electromagnetic radiation of a specific wavelength.

32. The system of claim 22 wherein the at least one passive device further comprises a camera at a desired elevation that is known to the master station subsystem.

33. The system of claim 22 wherein the at least one passive device further comprises gyroscopic stabilization.

34. The system of claim 1 wherein movement of the controllable robotic mechanism of the substation is controlled by the master station subsystem.

35. The system of claim 34 wherein the controllable robotic mechanism of the substation is a vehicle that transports the substation or a tool that performs marking, fabrication or assembly.

36. The system of claim 1 wherein the position of the master station subsystem relative to fixed reference points is presented on the display along with the positions of the fixed reference points.

37. The system of claim 36 wherein the position of the at least one substation relative to the master station is presented on the display.

38. The system of claim 1 further comprising a plurality of substations positioned such that the electromagnetic signals emitted from the second propagation devices of the plurality of substations are relayed from one substation of the plurality to other substations of the plurality ultimately to be received by the master station subsystem.

39. The system of claim 1 wherein the master station subsystem and the at least one substation are self-leveling.

40. The system of claim 1 wherein the master station subsystem and the at least one subsystem are controlled using a computer network, thereby allowing them to coordinate performance of various tasks.

41. The system of claim 1 further comprising at least three beacon drones and at least one position sensor receiver pole wherein:
 a) each beacon drone comprises a pulse modulated horizontal spinning visible self leveling laser that is assigned a unique electronic identification, such that the beacon drone transmits laser angle data and device identification at every incremental degree; and
 b) the at least one position sensor receiver pole comprises a plurality of photo sensors positioned around the pole separated by a plurality of mechanical shading louvers, such that the sensors receive light on the same plane that the beacon drones transmit their angle and device identification.

42. The system of claim 1 wherein the master station subsystem and the at least one substation constantly monitor the relative locations of a plurality of fixed reference points, and sound alarms if their positions relative to the fixed reference points drift by a designated amount.

43. The system of claim 1 further comprising transmitters at fixed reference points within the multi-dimensional space that transmit electromagnetic signals to the master station subsystem or to the at least one substation and also comprising compensating software in the controller module, wherein said electromagnetic signals indicate to the controller module any drift of the fixed reference points relative to one another, and wherein the compensating software corrects for error in horizontal and vertical angle measurement and distance measurement.

44. The system of claim 1 wherein the master station subsystem further comprises a gyroscope that enables said master station subsystem to be suspended over a work site with stability.

45. The system of claim 44 wherein said suspension utilizes a rail, a cable, or a low altitude flight system.

46. The system of claim 1, wherein the system software performs the automatic site layout, study, and verification by:
 a) measuring precise locations of objects, structures, or reference points in the multi-dimensional space; and
 b) recording said precise locations on the virtual model.

47. The system of claim 1, wherein the system software performs the automatic site layout, study, and verification by:
 a) selecting positions within the virtual model; and
 b) locating the selected positions accurately within the multi-dimensional space.

48. The system of claim 1 wherein the system software performs an automatic site layout, study, and verification by:
 a) selecting positions within the multi-dimensional space; and
 b) comparing said selected positions with their locations in the virtual model.

49. The system of claim 1 further comprising a robotic vehicle controlled by the master station subsystem, whereby said robotic vehicle traverses the multi-dimensional space, and identifies personnel, and enables the master station subsystem to document the work in progress and location of personnel.

* * * * *